United States Patent
Lipstone et al.

(10) Patent No.: US 11,838,385 B2
(45) Date of Patent: Dec. 5, 2023

(54) CONTROL IN A CONTENT DELIVERY NETWORK

(71) Applicant: Level 3 Communications, LLC, Broomfield, CO (US)

(72) Inventors: Laurence R. Lipstone, Calabasas, CA (US); William Crowder, Camarillo, CA (US); Jeffrey G. Koller, Oxnard, CA (US); David Fullagar, Boulder, CO (US); Maksim Yevmenkin, Thousand Oaks, CA (US); Christopher Newton, Westlake Village, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 110 days.

(21) Appl. No.: 17/559,071

(22) Filed: Dec. 22, 2021

(65) Prior Publication Data

US 2022/0116477 A1 Apr. 14, 2022

Related U.S. Application Data

(63) Continuation of application No. 17/095,325, filed on Nov. 11, 2020, now Pat. No. 11,218,566, which is a
(Continued)

(51) Int. Cl.
*H04L 67/60* (2022.01)
*H04L 41/0853* (2022.01)
(Continued)

(52) U.S. Cl.
CPC .......... *H04L 67/60* (2022.05); *H04L 41/0856* (2013.01); *H04L 41/0893* (2013.01);
(Continued)

(58) Field of Classification Search
None
See application file for complete search history.

(56) References Cited

U.S. PATENT DOCUMENTS

| | | |
|---|---|---|
| 5,511,208 A | 4/1996 | Boyles et al. |
| 5,805,837 A | 9/1998 | Hoover et al. |

(Continued)

FOREIGN PATENT DOCUMENTS

| | | |
|---|---|---|
| CN | 102047244 A | 5/2011 |
| WO | WO-200215014 A1 | 2/2002 |

(Continued)

OTHER PUBLICATIONS

Apache Module mod-filter, Apache HTTP Server Version 2.2, http://web.archive.org/web/20111025125344/http//httpd.apache.org:80/docs/2.2/mod/mod_filter.html; XP055408276; retrieved from Internet Sep. 20, 2017 Oct. 25, 2011, 7 pgs.

(Continued)

*Primary Examiner* — Brian Whipple

(57) ABSTRACT

A content delivery network (CDN) includes a plurality of CDN components including at least one CDN rendezvous mechanism and at least one control core. The CDN components are controlled by control core data from the at least one control core. Some CDN components obtain CDN resources including control core data from at least some other CDN components. The CDN components use the CDN rendezvous mechanism to select one or more CDN components from which to obtain CDN resources.

17 Claims, 43 Drawing Sheets

Related U.S. Application Data continuation of application No. 16/181,010, filed on Nov. 5, 2018, now Pat. No. 10,841,398, which is a continuation of application No. 14/302,865, filed on Jun. 12, 2014, now Pat. No. 10,187,491, which is a continuation of application No. 13/714,410, filed on Dec. 14, 2012, now Pat. No. 9,456,053.

(60) Provisional application No. 61/570,486, filed on Dec. 14, 2011, provisional application No. 61/570,448, filed on Dec. 14, 2011.

(51) Int. Cl.
| | |
|---|---|
| *H04L 41/5061* | (2022.01) |
| *H04L 41/50* | (2022.01) |
| *H04L 67/00* | (2022.01) |
| *H04L 67/02* | (2022.01) |
| *H04L 69/22* | (2022.01) |
| *H04L 67/01* | (2022.01) |
| *H04L 67/55* | (2022.01) |
| *H04L 67/568* | (2022.01) |
| *H04L 67/5682* | (2022.01) |
| *H04L 41/0893* | (2022.01) |
| *H04L 9/40* | (2022.01) |

(52) U.S. Cl.
CPC ........ *H04L 41/509* (2013.01); *H04L 41/5064* (2013.01); *H04L 67/01* (2022.05); *H04L 67/02* (2013.01); *H04L 67/34* (2013.01); *H04L 67/55* (2022.05); *H04L 67/568* (2022.05); *H04L 67/5682* (2022.05); *H04L 69/22* (2013.01); *H04L 63/166* (2013.01)

(56) References Cited

U.S. PATENT DOCUMENTS

| | | |
|---|---|---|
| 5,870,559 A | 2/1999 | Leshem et al. |
| 5,951,694 A | 9/1999 | Choquier et al. |
| 6,173,322 B1 | 1/2001 | Hu |
| 6,185,598 B1 | 2/2001 | Farber et al. |
| 6,212,178 B1 | 4/2001 | Beck et al. |
| 6,226,694 B1 | 5/2001 | Constant et al. |
| 6,279,032 B1 | 8/2001 | Short et al. |
| 6,484,143 B1 | 11/2002 | Swildens et al. |
| 6,571,261 B1 | 5/2003 | Wang-Knop et al. |
| 6,587,928 B1 | 7/2003 | Periyannan et al. |
| 6,654,807 B2 | 11/2003 | Farber et al. |
| 6,757,708 B1 | 6/2004 | Craig et al. |
| 6,965,930 B1 | 11/2005 | Arrowood et al. |
| 7,010,578 B1 | 3/2006 | Lewin et al. |
| 7,054,935 B2 | 5/2006 | Farber et al. |
| 7,062,556 B1 | 6/2006 | Chen et al. |
| 7,076,608 B2 | 7/2006 | Arunagirinathan et al. |
| 7,136,649 B2 | 11/2006 | Ying et al. |
| 7,206,841 B2 | 4/2007 | Traversat et al. |
| 7,320,085 B2 | 1/2008 | Bain |
| 7,370,102 B1 | 5/2008 | Chu et al. |
| 7,395,346 B2 | 7/2008 | Pinder et al. |
| 7,461,206 B2 | 12/2008 | Bhanoo et al. |
| 7,512,702 B1 | 3/2009 | Srivastava et al. |
| 7,512,707 B1 | 3/2009 | Manapragada et al. |
| 7,523,181 B2 | 4/2009 | Swildens et al. |
| 7,797,426 B1 | 9/2010 | Lyon |
| 7,822,871 B2 | 10/2010 | Stolorz et al. |
| 7,840,667 B2 | 11/2010 | Weller et al. |
| 7,945,693 B2 | 5/2011 | Farber et al. |
| 7,949,779 B2 | 5/2011 | Farber et al. |
| 8,015,298 B2 | 9/2011 | Yevmenkin et al. |
| 8,060,613 B2 | 11/2011 | Farber et al. |
| 8,255,557 B2 | 8/2012 | Raciborski et al. |
| 8,260,841 B1 | 9/2012 | Maity |
| 8,281,035 B2 | 10/2012 | Farber et al. |
| 8,296,296 B2 | 10/2012 | Keith, Jr. |
| 8,296,396 B2 | 10/2012 | Farber et al. |
| 8,321,556 B1 | 11/2012 | Chatterjee et al. |
| 8,396,970 B2 | 3/2013 | Black et al. |
| 8,412,823 B1 | 4/2013 | Richardson et al. |
| 8,458,290 B2 | 6/2013 | Black et al. |
| 8,478,858 B2 | 7/2013 | Dunbar et al. |
| 8,489,750 B2 | 7/2013 | Yevmenkin et al. |
| 8,511,208 B1 | 8/2013 | Frazer |
| 8,521,813 B2 | 8/2013 | Black et al. |
| 8,543,702 B1 | 9/2013 | Marshall et al. |
| 8,577,827 B1 | 11/2013 | Sehn et al. |
| 8,615,577 B2 | 12/2013 | Black et al. |
| 8,626,876 B1 | 1/2014 | Kokal et al. |
| 8,626,878 B2 | 1/2014 | Wolber et al. |
| 8,645,517 B2 | 2/2014 | Stolorz et al. |
| 8,788,671 B2 | 7/2014 | Richardson et al. |
| 8,819,283 B2 | 8/2014 | Richardson et al. |
| 8,856,865 B1 | 10/2014 | Martini |
| 8,868,772 B2 | 10/2014 | Major |
| 8,949,533 B2 | 2/2015 | Puthalath et al. |
| 9,098,464 B2 | 8/2015 | Hajiaghayi et al. |
| 9,246,965 B1 | 1/2016 | Stoica |
| 2002/0010798 A1 | 1/2002 | Ben-Shaul et al. |
| 2002/0091801 A1 | 7/2002 | Lewin |
| 2002/0116583 A1 | 8/2002 | Copeland et al. |
| 2002/0120717 A1 | 8/2002 | Giotta |
| 2002/0141592 A1 | 10/2002 | Aull |
| 2002/0161823 A1 | 10/2002 | Casati et al. |
| 2002/0165727 A1 | 11/2002 | Greene et al. |
| 2002/0174168 A1 | 11/2002 | Beukema et al. |
| 2002/0174227 A1 | 11/2002 | Hartsell et al. |
| 2002/0184357 A1 | 12/2002 | Traversat et al. |
| 2003/0028594 A1 | 2/2003 | Laschkewitsch et al. |
| 2003/0065708 A1 | 4/2003 | Jacobs et al. |
| 2003/0115283 A1 | 6/2003 | Barbir et al. |
| 2003/0115421 A1 | 6/2003 | McHenry et al. |
| 2003/0135509 A1 | 7/2003 | Davis et al. |
| 2003/0140111 A1 | 7/2003 | Pace et al. |
| 2003/0154090 A1 | 8/2003 | Bernstein et al. |
| 2003/0158913 A1 | 8/2003 | Agnoli |
| 2003/0200283 A1 | 10/2003 | Suryanarayana et al. |
| 2003/0217139 A1 | 11/2003 | Burbeck |
| 2004/0068622 A1 | 4/2004 | Van Doren et al. |
| 2004/0073596 A1 | 4/2004 | Kloninger et al. |
| 2004/0162871 A1 | 8/2004 | Pabla et al. |
| 2004/0167960 A1 | 8/2004 | Kinner et al. |
| 2004/0193656 A1 | 9/2004 | Pizzo et al. |
| 2004/0215757 A1 | 10/2004 | Butler |
| 2004/0230797 A1 | 11/2004 | Ofek |
| 2005/0010653 A1 | 1/2005 | McCanne |
| 2005/0086348 A1 | 4/2005 | Balassanian |
| 2005/0086386 A1 | 4/2005 | Shen et al. |
| 2005/0160429 A1 | 7/2005 | Hameleers et al. |
| 2005/0177600 A1 | 8/2005 | Eilam et al. |
| 2005/0188073 A1 | 8/2005 | Nakamichi et al. |
| 2005/0190775 A1 | 9/2005 | Tonnby et al. |
| 2005/0192995 A1 | 9/2005 | Li et al. |
| 2005/0289388 A1 | 12/2005 | Black-Ziegelbein et al. |
| 2006/0031441 A1 | 2/2006 | Davis |
| 2006/0047751 A1 | 3/2006 | Chen et al. |
| 2006/0064485 A1 | 3/2006 | Baron et al. |
| 2006/0112176 A1 | 5/2006 | Liu et al. |
| 2006/0167704 A1 | 7/2006 | Nicholls et al. |
| 2006/0212524 A1 | 9/2006 | Wu et al. |
| 2006/0233310 A1 | 10/2006 | Adams et al. |
| 2006/0233311 A1 | 10/2006 | Adams et al. |
| 2006/0244818 A1 | 11/2006 | Majors et al. |
| 2007/0156845 A1 | 7/2007 | Devanneaux et al. |
| 2007/0156876 A1 | 7/2007 | Sundarrajan et al. |
| 2007/0156965 A1 | 7/2007 | Sundarrajan et al. |
| 2007/0156966 A1 | 7/2007 | Sundarrajan et al. |
| 2007/0162434 A1 | 7/2007 | Alessi et al. |
| 2007/0168517 A1 | 7/2007 | Weller et al. |
| 2007/0192486 A1 | 8/2007 | Wilson et al. |
| 2007/0198678 A1 | 8/2007 | Dieberger et al. |
| 2007/0245090 A1 | 10/2007 | King et al. |
| 2007/0250468 A1 | 10/2007 | Pieper |
| 2007/0271385 A1 | 11/2007 | Davis et al. |

(56) References Cited

U.S. PATENT DOCUMENTS

| | | |
|---|---|---|
| 2008/0066073 A1 | 3/2008 | Sen |
| 2008/0108360 A1 | 5/2008 | Baarman et al. |
| 2008/0205292 A1 | 8/2008 | Denby |
| 2008/0209036 A1 | 8/2008 | Sakamoto et al. |
| 2008/0215735 A1 | 9/2008 | Farber et al. |
| 2008/0228864 A1 | 9/2008 | Plamondon |
| 2008/0256299 A1 | 10/2008 | Iyengar et al. |
| 2008/0301470 A1 | 12/2008 | Green et al. |
| 2008/0313267 A1 | 12/2008 | Desai et al. |
| 2009/0019228 A1 | 1/2009 | Brown et al. |
| 2009/0125413 A1 | 5/2009 | Le Chevalier |
| 2009/0125758 A1 | 5/2009 | Anuszczyk et al. |
| 2009/0150319 A1 | 6/2009 | Matson et al. |
| 2009/0157850 A1 | 6/2009 | Gagliardi et al. |
| 2009/0164621 A1 | 6/2009 | Kothari et al. |
| 2009/0165115 A1 | 6/2009 | Toumura et al. |
| 2009/0171752 A1 | 7/2009 | Galvin et al. |
| 2009/0172167 A1 | 7/2009 | Drai et al. |
| 2009/0210528 A1 | 8/2009 | Swildens |
| 2009/0210936 A1 | 8/2009 | Omar |
| 2009/0254661 A1 | 10/2009 | Fullagar et al. |
| 2009/0276771 A1 | 11/2009 | Nickolov |
| 2009/0276842 A1 | 11/2009 | Yevmenkin et al. |
| 2010/0042734 A1 | 2/2010 | Olafsson et al. |
| 2010/0064035 A1 | 3/2010 | Branca et al. |
| 2010/0083281 A1 | 4/2010 | Malladi et al. |
| 2010/0088405 A1 | 4/2010 | Huang |
| 2010/0114857 A1 | 5/2010 | Edwards |
| 2010/0125673 A1* | 5/2010 | Richardson ......... H04L 67/1001 709/239 |
| 2010/0142712 A1 | 6/2010 | Tang et al. |
| 2010/0158236 A1 | 6/2010 | Chang et al. |
| 2010/0180105 A1 | 7/2010 | Asnaashari |
| 2010/0217869 A1 | 8/2010 | Esteban |
| 2010/0228874 A1 | 9/2010 | Rajan |
| 2010/0228962 A1 | 9/2010 | Simon et al. |
| 2010/0246797 A1 | 9/2010 | Chavez et al. |
| 2010/0257258 A1 | 10/2010 | Liu et al. |
| 2010/0274765 A1 | 10/2010 | Murphy et al. |
| 2010/0281224 A1 | 11/2010 | Ho et al. |
| 2010/0332595 A1 | 12/2010 | Fullagar et al. |
| 2011/0022471 A1 | 1/2011 | Brueck |
| 2011/0022812 A1 | 1/2011 | van der Linden et al. |
| 2011/0072073 A1 | 3/2011 | Curtis |
| 2011/0099290 A1 | 4/2011 | Swildens et al. |
| 2011/0107364 A1 | 5/2011 | Lajoie et al. |
| 2011/0112909 A1 | 5/2011 | Singh et al. |
| 2011/0116376 A1 | 5/2011 | Pacella |
| 2011/0138064 A1 | 6/2011 | Rieger et al. |
| 2011/0153724 A1 | 6/2011 | Raja et al. |
| 2011/0161513 A1 | 6/2011 | Viers |
| 2011/0194681 A1 | 8/2011 | Fedorov et al. |
| 2011/0219108 A1 | 9/2011 | Lisiecki |
| 2011/0219109 A1 | 9/2011 | Zehavi |
| 2011/0238488 A1 | 9/2011 | Hahn et al. |
| 2011/0247084 A1 | 10/2011 | Kolbert et al. |
| 2011/0276679 A1 | 11/2011 | Newton et al. |
| 2011/0280143 A1 | 11/2011 | Li |
| 2011/0295983 A1 | 12/2011 | Medved |
| 2011/0296053 A1 | 12/2011 | Medved |
| 2012/0002717 A1 | 1/2012 | Ma et al. |
| 2012/0023530 A1 | 1/2012 | Xia |
| 2012/0030341 A1 | 2/2012 | Jensen |
| 2012/0079023 A1 | 3/2012 | Tejada-Gamero et al. |
| 2012/0079083 A1 | 3/2012 | Branca et al. |
| 2012/0089664 A1 | 4/2012 | Igelka |
| 2012/0089700 A1 | 4/2012 | Safruti |
| 2012/0113893 A1 | 5/2012 | Damola |
| 2012/0127183 A1 | 5/2012 | Vonog et al. |
| 2012/0150993 A1 | 6/2012 | Flack et al. |
| 2012/0159558 A1 | 6/2012 | Whyte et al. |
| 2012/0163203 A1 | 6/2012 | Wilkinson et al. |
| 2012/0166589 A1 | 6/2012 | Swildens et al. |
| 2012/0191862 A1 | 7/2012 | Kovvali et al. |
| 2012/0198043 A1 | 8/2012 | Hesketh et al. |
| 2012/0209952 A1 | 8/2012 | Lotfalla et al. |
| 2012/0215779 A1 | 8/2012 | Lipstone |
| 2012/0221767 A1 | 8/2012 | Post et al. |
| 2012/0226734 A1 | 9/2012 | Poese |
| 2012/0284384 A1 | 11/2012 | Shi et al. |
| 2012/0290911 A1 | 11/2012 | Zhao |
| 2013/0041972 A1 | 2/2013 | Field et al. |
| 2013/0046664 A1 | 2/2013 | Kazerani et al. |
| 2013/0046883 A1 | 2/2013 | Lientz et al. |
| 2013/0094445 A1 | 4/2013 | De Foy |
| 2013/0103791 A1 | 4/2013 | Gottdenker et al. |
| 2013/0104173 A1 | 4/2013 | Tjio et al. |
| 2013/0144727 A1 | 6/2013 | Morot-Gaudry et al. |
| 2013/0152187 A1 | 6/2013 | Strebe |
| 2013/0159472 A1 | 6/2013 | Newton et al. |
| 2013/0159473 A1 | 6/2013 | Newton et al. |
| 2013/0159500 A1 | 6/2013 | Reus et al. |
| 2013/0173769 A1 | 7/2013 | Seastrom et al. |
| 2013/0191499 A1 | 7/2013 | Ludin et al. |
| 2013/0326032 A1 | 12/2013 | Duarte et al. |
| 2014/0047085 A1 | 2/2014 | Peters et al. |
| 2014/0095537 A1 | 4/2014 | Park et al. |
| 2014/0101736 A1 | 4/2014 | Mays et al. |
| 2014/0108671 A1 | 4/2014 | Watson |
| 2014/0122725 A1 | 5/2014 | Batrouni et al. |
| 2014/0126370 A1 | 5/2014 | Xie |
| 2014/0172944 A1 | 6/2014 | Newton et al. |
| 2014/0172951 A1 | 6/2014 | Varney et al. |
| 2014/0172952 A1 | 6/2014 | Varney et al. |
| 2014/0172956 A1 | 6/2014 | Varney et al. |
| 2014/0172970 A1 | 6/2014 | Newton et al. |
| 2014/0173023 A1 | 6/2014 | Varney et al. |
| 2014/0173029 A1 | 6/2014 | Varney et al. |
| 2014/0173030 A1 | 6/2014 | Varney et al. |
| 2014/0173038 A1 | 6/2014 | Newton et al. |
| 2014/0173039 A1 | 6/2014 | Newton et al. |
| 2014/0173040 A1 | 6/2014 | Newton et al. |
| 2014/0173041 A1 | 6/2014 | Newton et al. |
| 2014/0173042 A1 | 6/2014 | Newton et al. |
| 2014/0173043 A1 | 6/2014 | Varney et al. |
| 2014/0173044 A1 | 6/2014 | Varney et al. |
| 2014/0173045 A1 | 6/2014 | Crowder et al. |
| 2014/0173046 A1 | 6/2014 | Crowder et al. |
| 2014/0173047 A1 | 6/2014 | Crowder et al. |
| 2014/0173048 A1 | 6/2014 | Crowder et al. |
| 2014/0173052 A1 | 6/2014 | Newton et al. |
| 2014/0173053 A1 | 6/2014 | Varney et al. |
| 2014/0173054 A1 | 6/2014 | Varney et al. |
| 2014/0173061 A1 | 6/2014 | Lipstone et al. |
| 2014/0173062 A1 | 6/2014 | Lipstone et al. |
| 2014/0173064 A1 | 6/2014 | Newton et al. |
| 2014/0173066 A1 | 6/2014 | Newton et al. |
| 2014/0173067 A1 | 6/2014 | Newton et al. |
| 2014/0173077 A1 | 6/2014 | Newton et al. |
| 2014/0173079 A1 | 6/2014 | Newton et al. |
| 2014/0173087 A1 | 6/2014 | Varney et al. |
| 2014/0173088 A1 | 6/2014 | Varney et al. |
| 2014/0173091 A1 | 6/2014 | Lipstone et al. |
| 2014/0173097 A1 | 6/2014 | Newton et al. |
| 2014/0173115 A1 | 6/2014 | Varney et al. |
| 2014/0173131 A1 | 6/2014 | Newton et al. |
| 2014/0173132 A1 | 6/2014 | Varney et al. |
| 2014/0173135 A1 | 6/2014 | Varney et al. |
| 2014/0198641 A1 | 7/2014 | Perkuhn et al. |
| 2014/0222946 A1 | 8/2014 | Lipstone et al. |
| 2014/0222977 A1 | 8/2014 | Varney et al. |
| 2014/0222984 A1 | 8/2014 | Varney et al. |
| 2014/0223002 A1 | 8/2014 | Varney et al. |
| 2014/0223003 A1 | 8/2014 | Varney et al. |
| 2014/0223015 A1 | 8/2014 | Varney et al. |
| 2014/0223016 A1 | 8/2014 | Varney et al. |
| 2014/0223017 A1 | 8/2014 | Lipstone et al. |
| 2014/0223018 A1 | 8/2014 | Varney et al. |
| 2014/0304590 A1 | 10/2014 | Zhang et al. |
| 2014/0337461 A1 | 11/2014 | Lipstone et al. |
| 2014/0337472 A1 | 11/2014 | Newton et al. |
| 2014/0344391 A1 | 11/2014 | Varney et al. |
| 2014/0344399 A1 | 11/2014 | Lipstone et al. |
| 2014/0344400 A1 | 11/2014 | Varney et al. |

(56) References Cited

U.S. PATENT DOCUMENTS

| | | |
|---|---|---|
| 2014/0344401 A1 | 11/2014 | Varney et al. |
| 2014/0344413 A1 | 11/2014 | Lipstone et al. |
| 2014/0344425 A1 | 11/2014 | Varney et al. |
| 2014/0344452 A1 | 11/2014 | Lipstone et al. |
| 2014/0344453 A1 | 11/2014 | Varney et al. |
| 2014/0372588 A1 | 12/2014 | Newton et al. |
| 2014/0372589 A1 | 12/2014 | Newton et al. |
| 2015/0067185 A1 | 3/2015 | Tamblin et al. |
| 2015/0088634 A1 | 3/2015 | Greenzeiger |
| 2015/0180724 A1 | 6/2015 | Varney et al. |
| 2015/0180725 A1 | 6/2015 | Varney et al. |
| 2015/0180971 A1 | 6/2015 | Varney et al. |
| 2015/0207695 A1 | 7/2015 | Varney et al. |
| 2015/0288647 A1 | 10/2015 | Chhabra |
| 2019/0082029 A1 | 3/2019 | Lipstone et al. |
| 2021/0067601 A1 | 3/2021 | Lipstone |

FOREIGN PATENT DOCUMENTS

| | | |
|---|---|---|
| WO | WO-200225463 A1 | 3/2002 |
| WO | WO-2011115471 A1 | 9/2011 |

OTHER PUBLICATIONS

Apache Tutorial: .htaccess files, Apache HTTP Server Version 2.2; https://web.archive.org/web/20110427102715/http://httpd.apache.org:80/docs/2.2/howto/htaccess.html; XP055409323; retrieved from Internet Sep. 22, 2017 Apr. 27, 2011, 5 pgs.
Argentina Examination Report, dated Nov. 10, 2017, Application No. 20120104744, filed Dec. 14, 2012; 5 pgs.
Canadian Examination Report, dated Oct. 1, 2018, Application No. 2,859,163, filed Dec. 14, 2012; 2 pgs.
Chinese Examination Report, dated Feb. 24, 2016, Application No. 201280061712.3, filed Dec. 14, 2012; 40 pgs.
Chinese Second Examination Report, dated Nov. 1, 2016, Application No. 201280061712.3, filed Dec. 14, 2012; 10 pgs.
European Examination Report, dated Aug. 27, 2019, Application No. 17179711.1, filed Dec. 14, 2012; 7 pgs.
European Examination Report, dated Aug. 27, 2019, Application No. 17179713.7, filed Dec. 14, 2012; 7 pgs.
European Examination Report, dated Jul. 14, 2020, Application No. 17179713.7, filed Dec. 14, 2012; 6 pgs.
European Examination Report, dated Jul. 7, 2020, Application No. 17179711.1, filed Dec. 14, 2012; 6 pgs.
European Examination Report, dated Nov. 16, 2018, Application No. 17179711.1, filed Dec. 14, 2012; 7 pgs.
European Examination Report, dated Nov. 16, 2018, Application No. 17179713.7, filed Dec. 14, 2012; 7 pgs.
Extended European Search Report, dated Jun. 8, 2015, Application No. 12857282.3, filed Dec. 14, 2012; 13 pgs.
Extended European Search Report, dated Oct. 16, 2017, Application No. 17179711.1, filed Dec. 14, 2012; 9 pgs.
Extended European Search Report, dated Oct. 9, 2017, Application No. 17179713.7, filed Dec. 14, 2012; 12 pgs.
International Search Report, dated Feb. 20, 2013, Int'l Appl. No. PCT/US12/069712, Int'l Filing Date Dec. 14, 2012, 4 pgs.
International Search Report, dated May 23, 2014, Int'l Appl. No. PCT/US13/074824, Int'l Filing Date Dec. 12, 2013; 9 pgs.
"NetServ Framework Design and Implementation 1.0", XML File, retrieved from Internet May 29, 2015 at http://academiccommons.columbia.edu/download/fedora_content/show_pretty/ac:135426/CONTENT/ac135426_description.XML?data=meta Nov. 16, 2011, 4 pgs.
"Oracle Solaris Cluster Geographic Edition System Administration Guide", Oracle, Part No. E25231 Mar. 1, 2012, 144 pgs.
"Overview of recent changes in the IP interconnection ecosystem", Analysys Mason May 1, 2011, 47 pgs.
"What Every Service Provider Should Know About Federated CDNs", *Skytide* IP Video Management Analytics Jun. 19, 2011, 12 pgs.
"Wholesale Content Delivery Networks: Unlocking New Revenue Streams and Content Relationships", Cisco—White Paper, Cisco and/or its affiliates Jan. 1, 2012, pp. 1-16.
Written Opinion of the International Searching Authority, dated May 23, 2014, Int'l Appl. No. PCT/US13/074824, Int'l Filing Date Dec. 12, 2013; 43 pgs.
Written Opinion, dated Feb. 20, 2013, Int'l Appl. No. PCT/US12/069712, Int'l Filing Date Dec. 14, 2012, 6 pgs.
Bartolini, N. et al., "A Walk Through Content Delivery Networks", Mascots 2003, LNCS 2965 Jan. 1, 2004, pp. 1-25.
Buyya, R. et al., "Content Delivery Networks", Springer-Verlag Berlin Heidelberg; ISBN:978-3-540-77886-8 Jan. 1, 2008, 429 pgs.
Kostadinova, R., "Peer-to-Peer Video Streaming", Retrieved from the Internet <URL: http://www.ee.kth.se/php/modules/publications/reports/2008/XR-EE-LCN2008004.pdf> Jan. 1, 2008, pp. 1-53.
Lee, Jae W. et al., "NetServ Framework Design and Implementation 1.0", *Columbia University Computer Science Technical Reports* retrieved from Internet on http://academiccommons.columbia.edu/download/fedora_content/download/ac:135425/CONTENT/cucs-016-11.pdf on May 29, 2015 Nov. 16, 2012, pp. 1-15.
Pathan, A-M K. et al., "A Taxonomy and Survey of Content Delivery Networks", Jan. 1, 2011, pp. 1-44.
Puopolo, S. et al., "Content Delivery Network (CDN) Federations: How SPs Can Win the Battle for Content-Hungry Consumers", Cisco Internet Business Solutions Group (IBSG); Point of View Jan. 1, 2011, 9 pgs.
Sun, P. et al., "Identifying Performance Bottlenecks in CDNs through TCP-Level Monitoring", Dept. of Computer Science, Princeton University Aug. 19, 2011, 6 pgs.
Wang, Weiwei et al., "The Study Summarize for Distribution Technology of Streaming Media under the Basement of CDN", *Computer Engineering and Application* vol. 40, No. 8 Jan. 1, 2004, 7 pgs.
Yin, Hao et al., "Design and Deployment of a Hybrid CDN-P2P System for Live Video Streaming: Experiences with LiveSky", *Proceedings of the Seventeen ACM International Conference on Multimedia* Jan. 1, 2009, pp. 25-34.

* cited by examiner

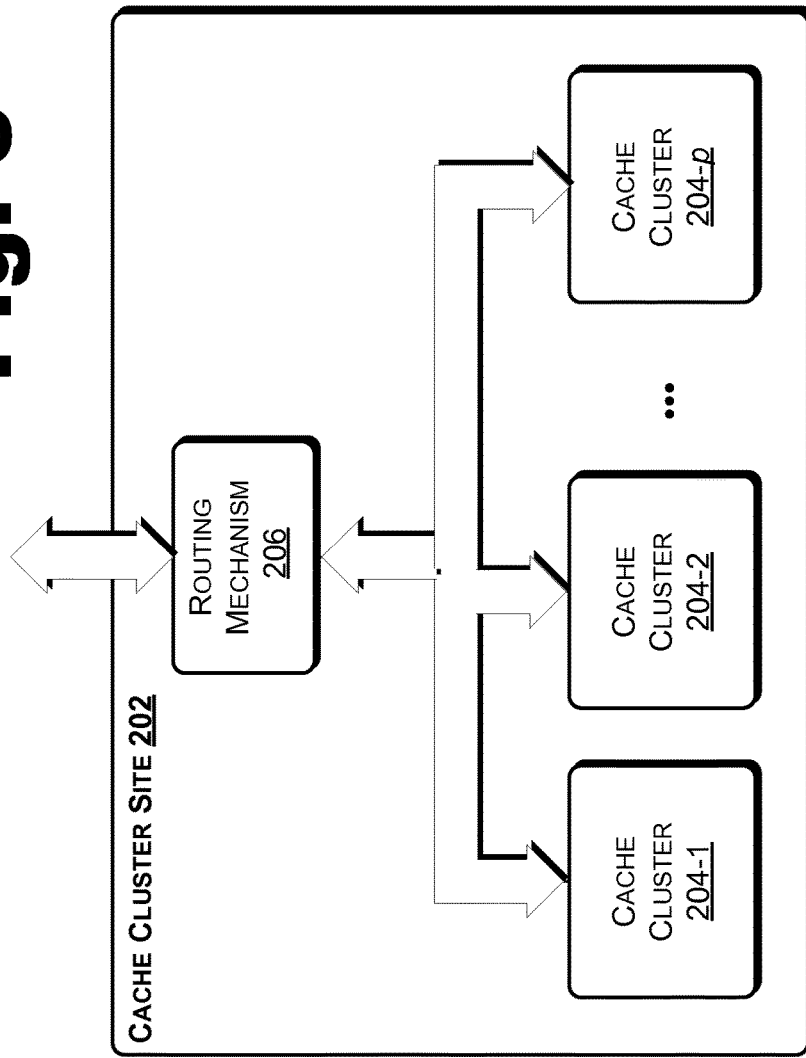
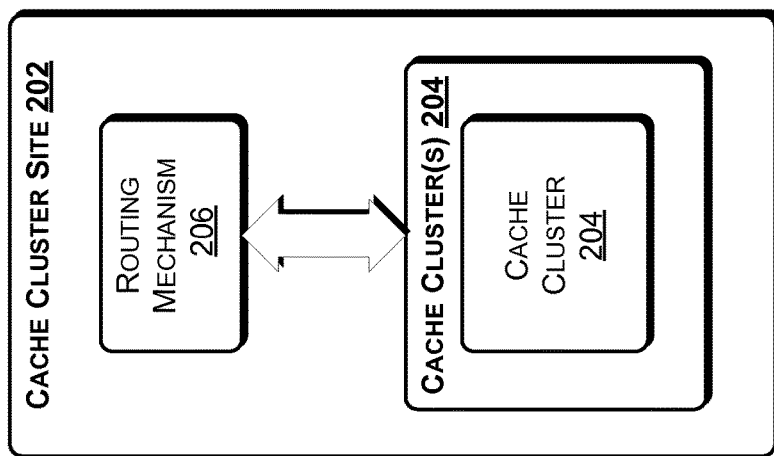

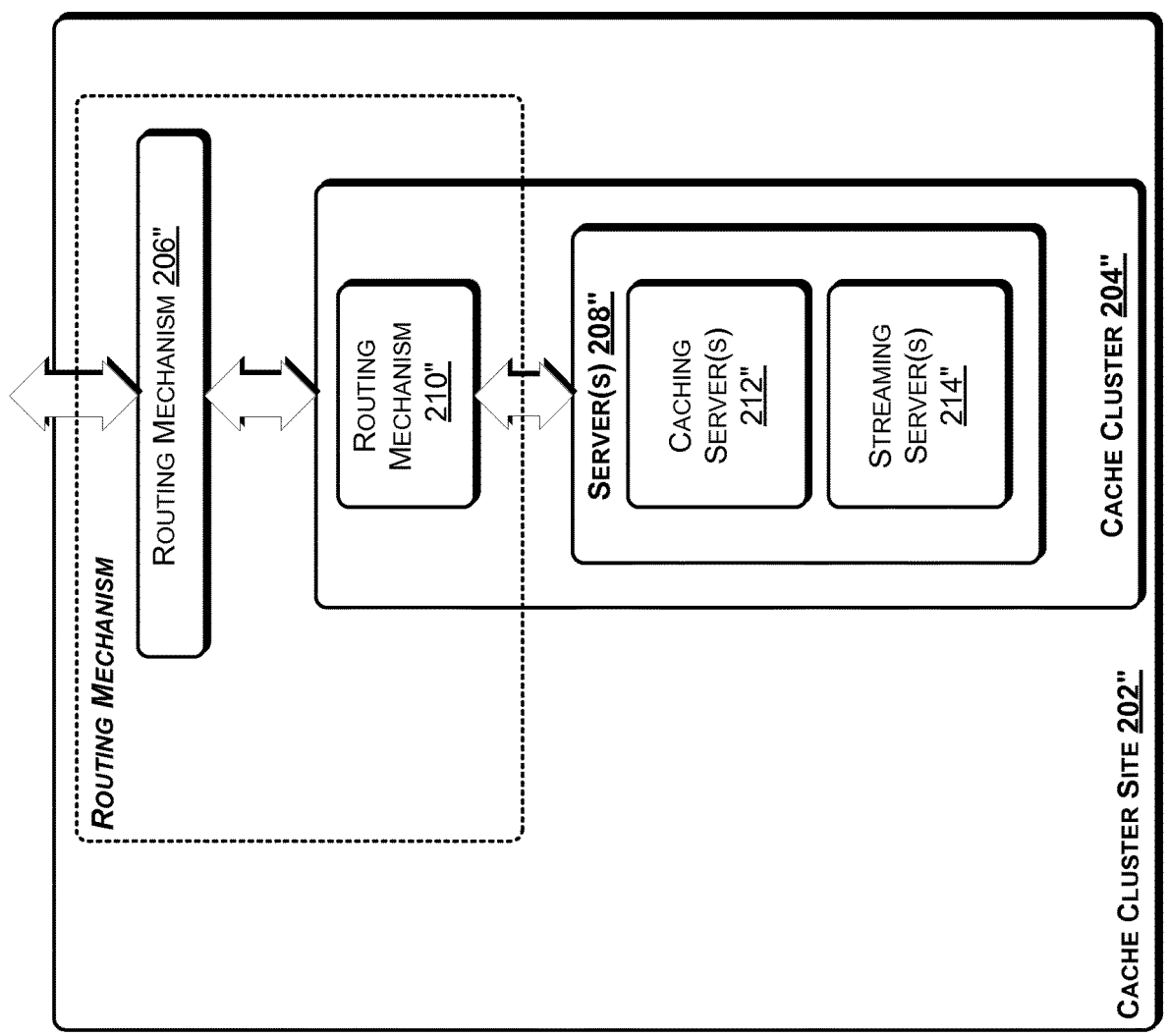

Fig. 12A

| 1204 NOTES OBJECT | |
|---|---|
| KEY | VALUE |
| KEY | VALUE |
| ... | ... |
| KEY | VALUE |

Fig. 12B

| 1206 SESSION OBJECT (SXN) | |
|---|---|
| KEY | VALUE |
| KEY | VALUE |
| ... | ... |
| KEY | VALUE |

Fig. 12C

| 1208 TRANSACTION OBJECT (TXN) | |
|---|---|
| KEY | VALUE |
| KEY | VALUE |
| ... | ... |
| KEY | VALUE |

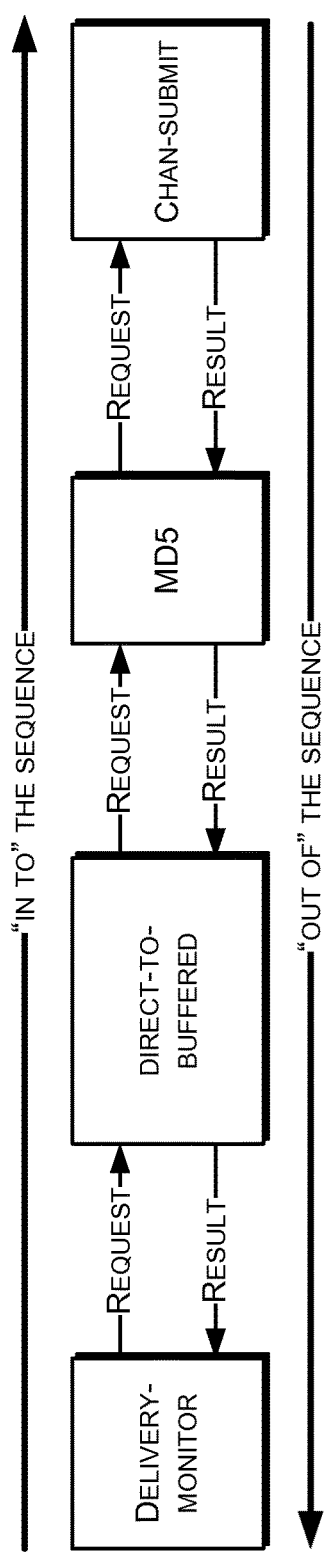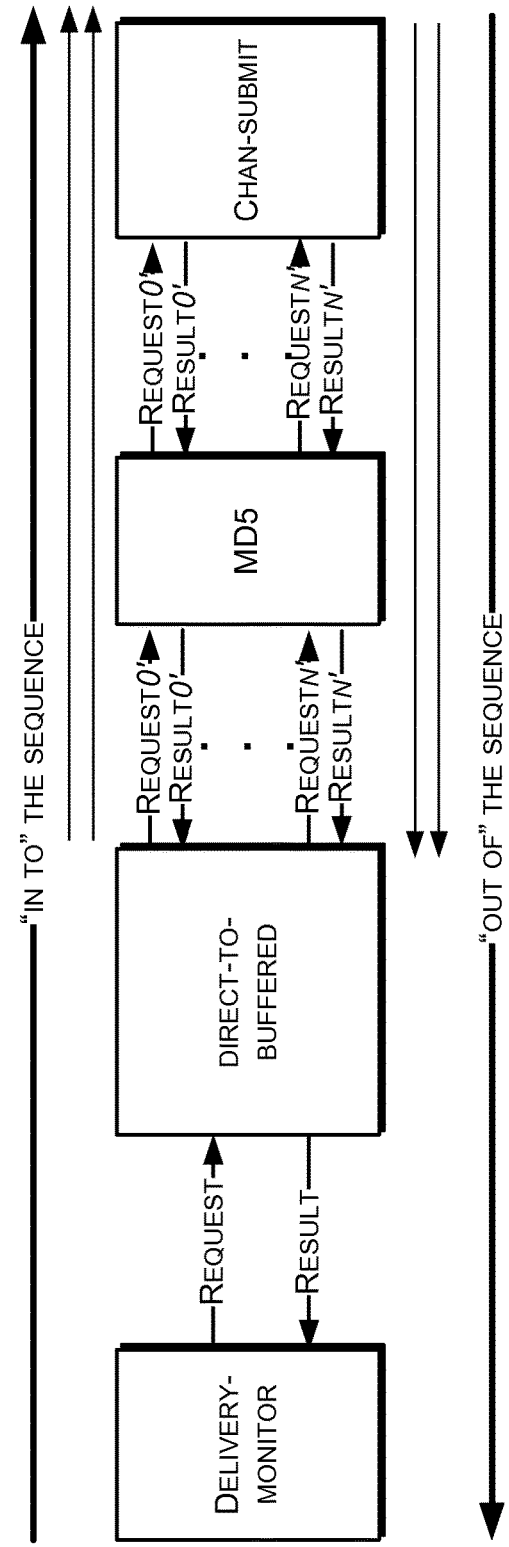

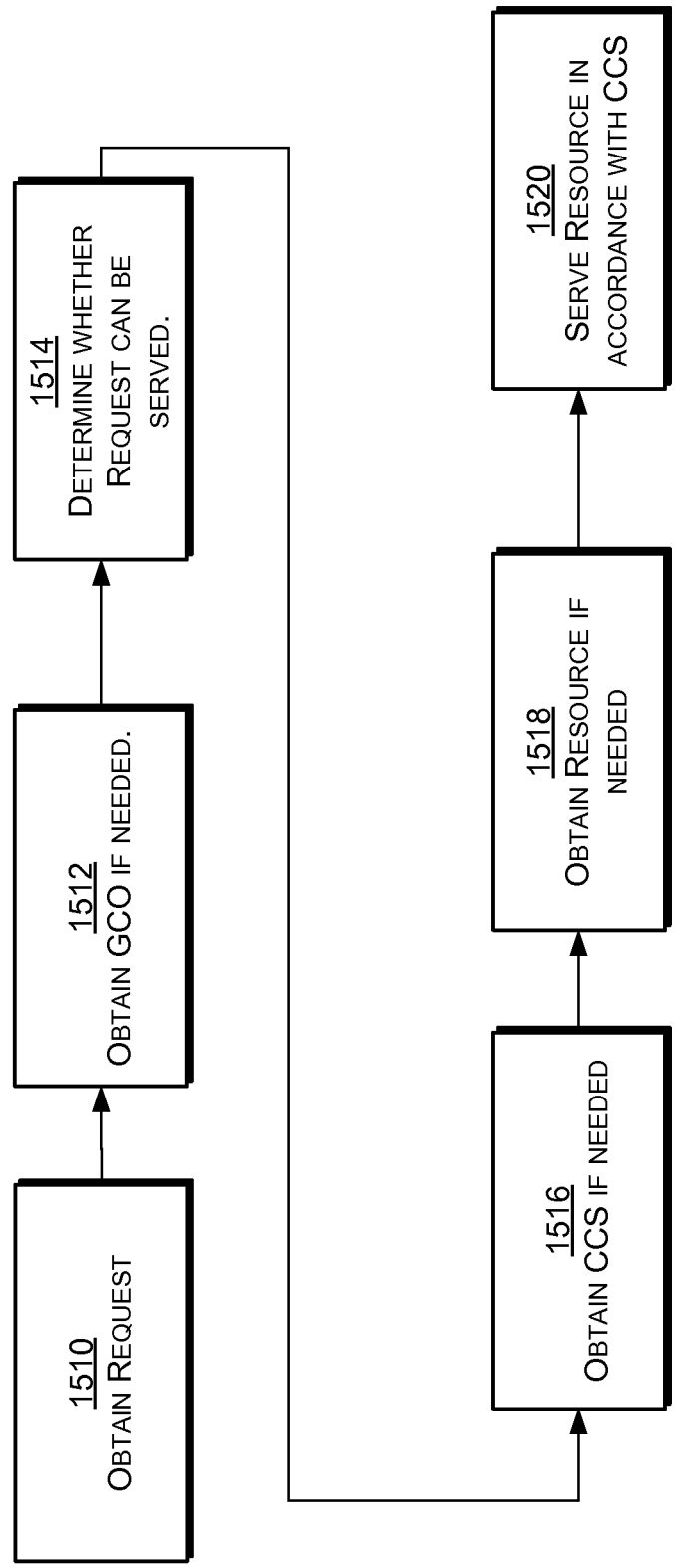

ORGANIZATION OF MAJOR CACHE MODULES

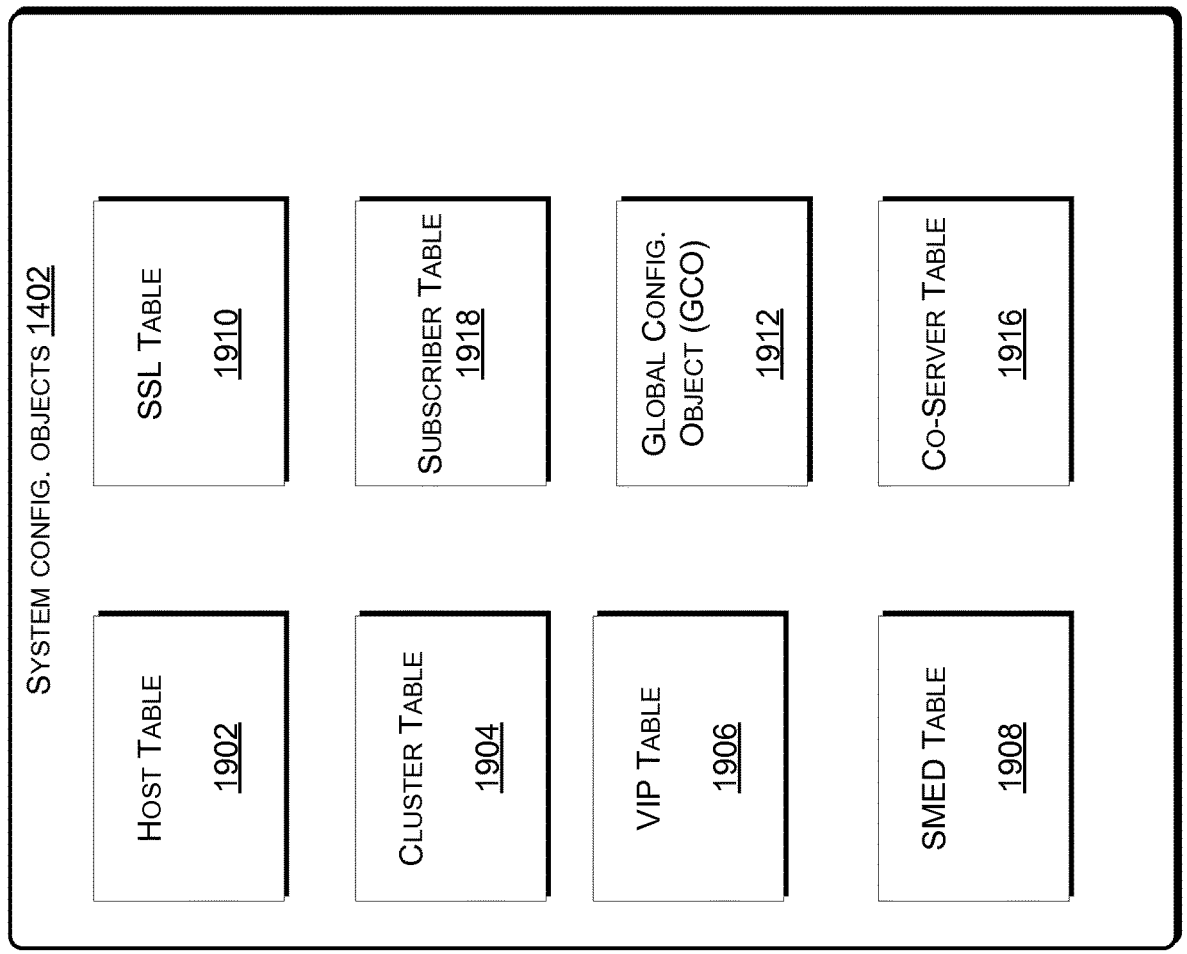

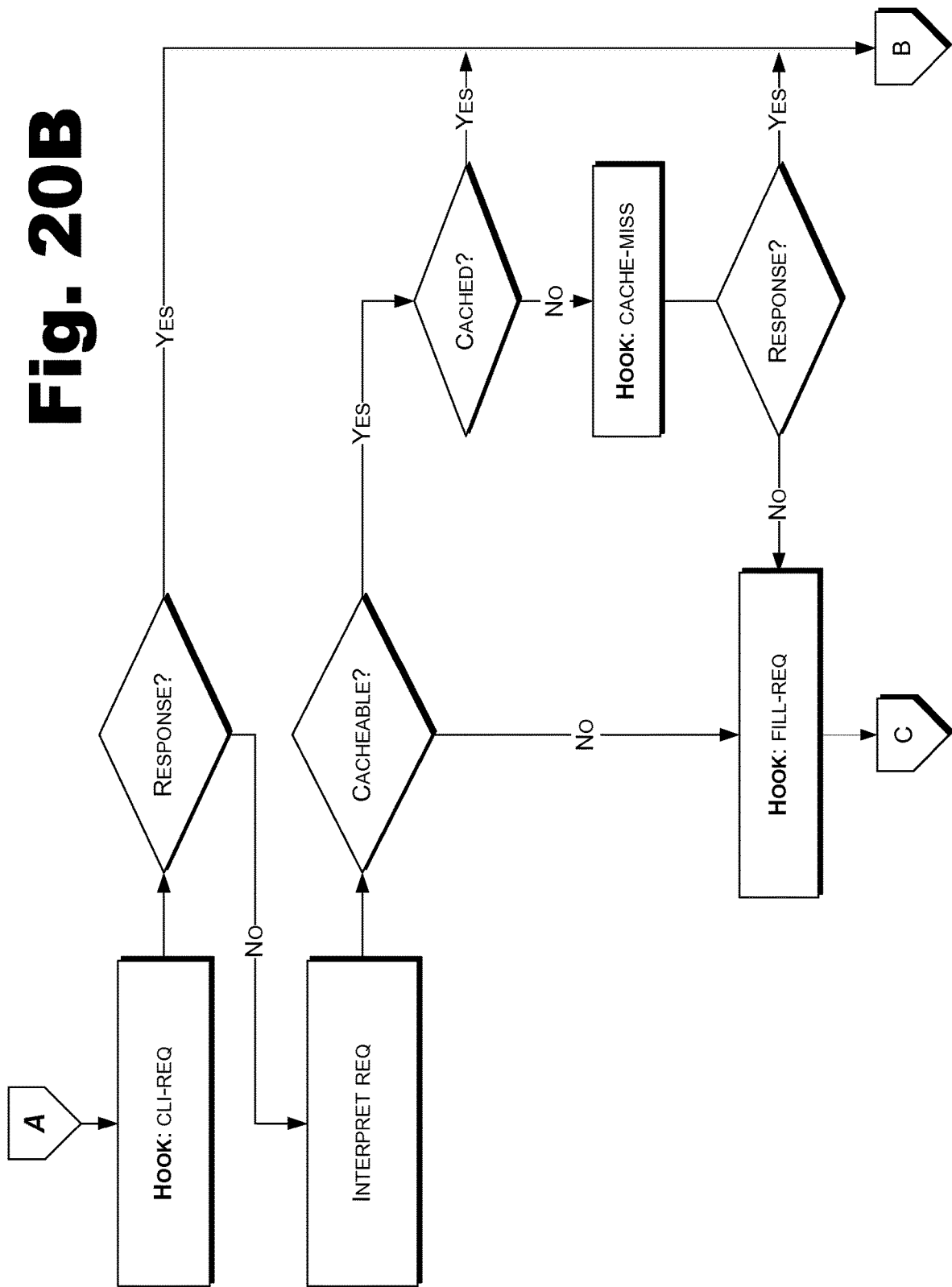

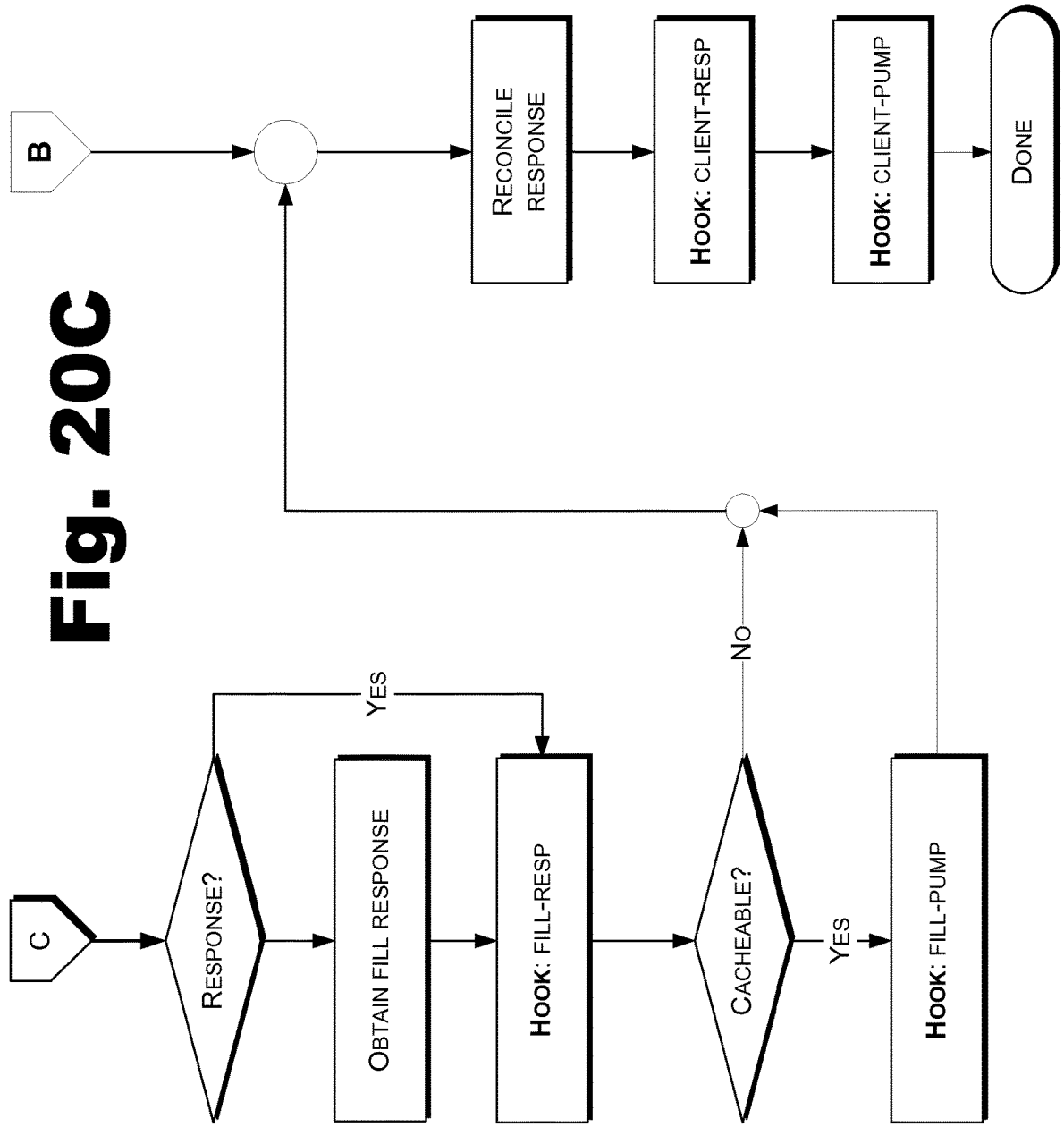

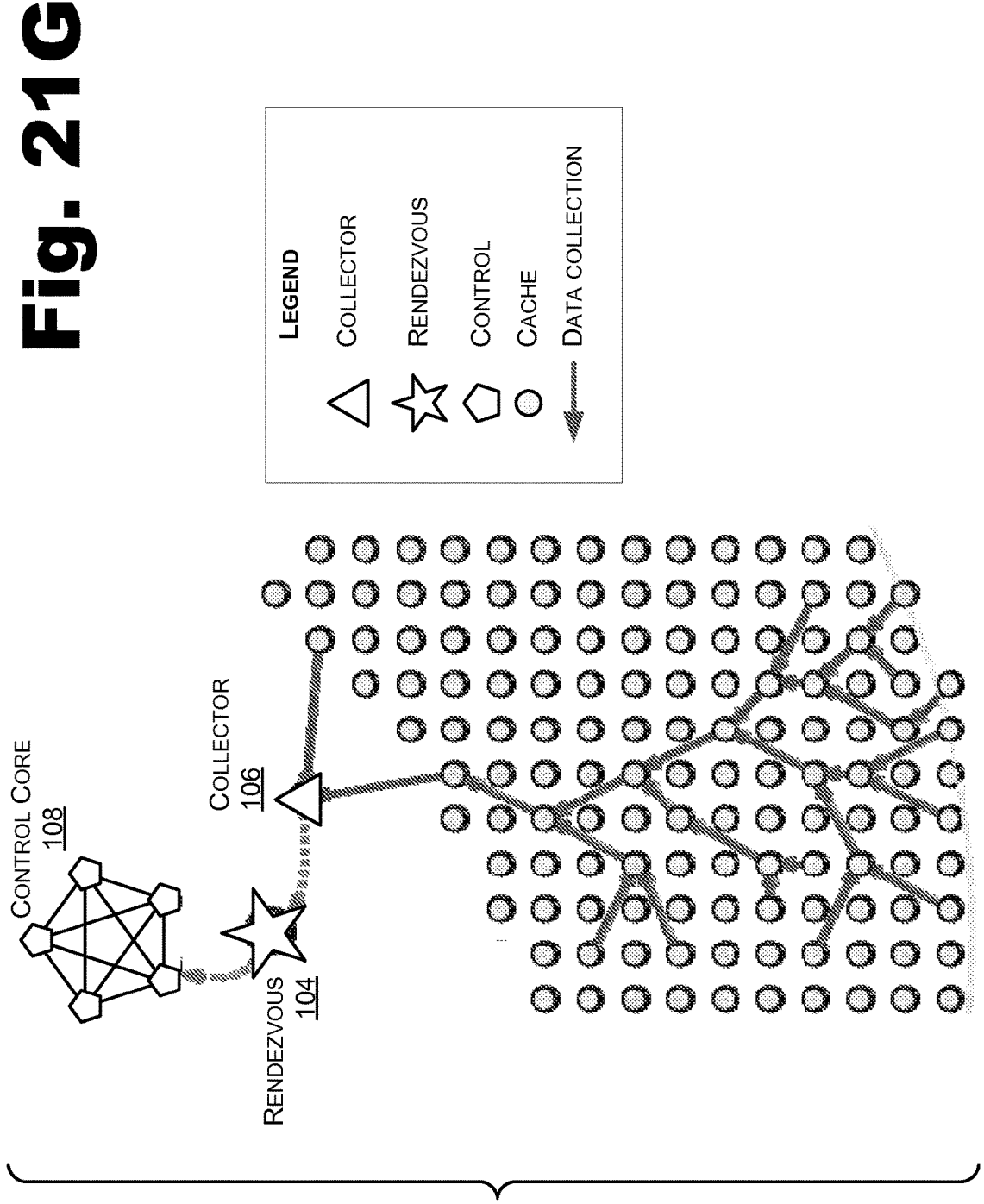

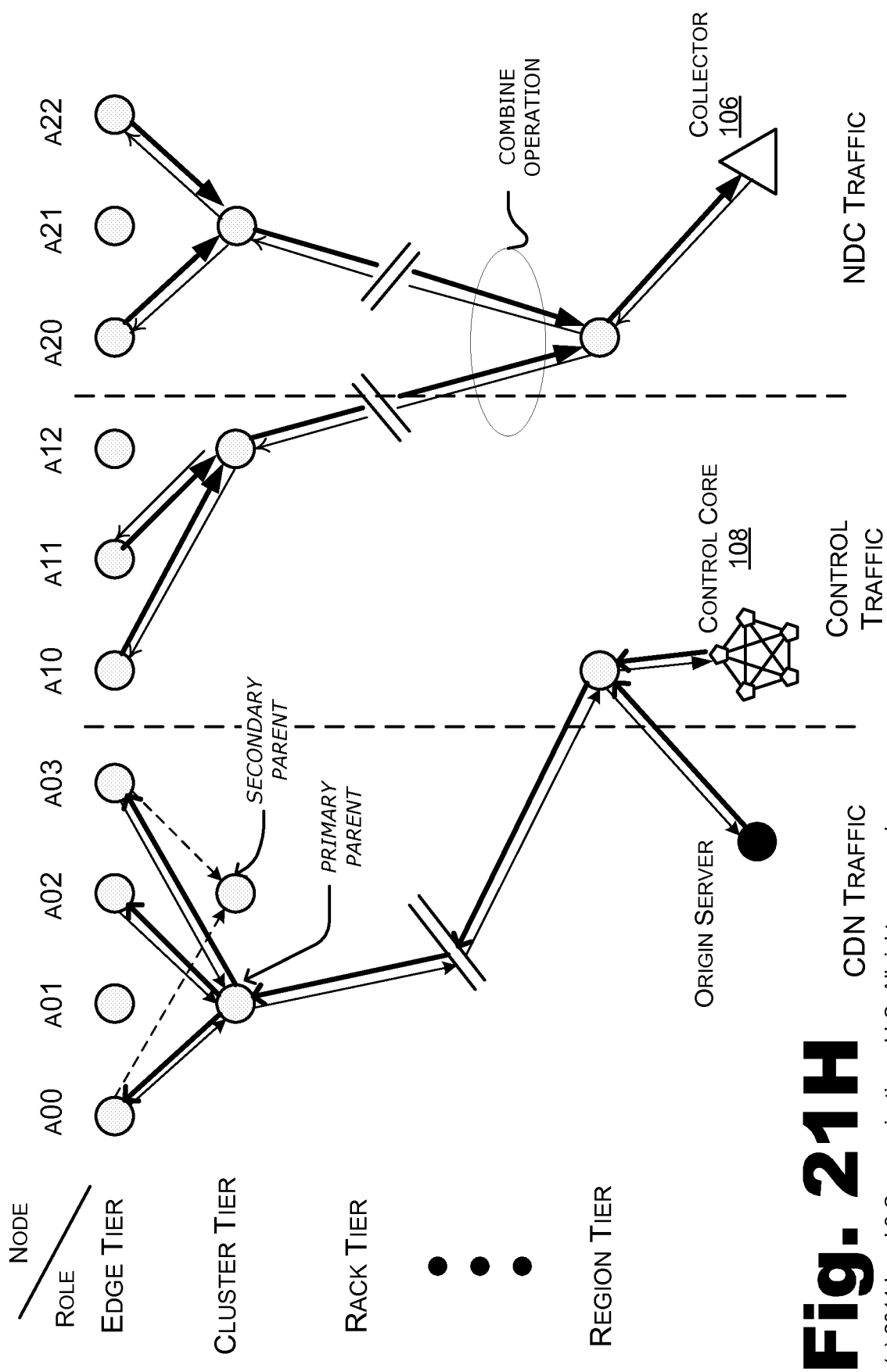

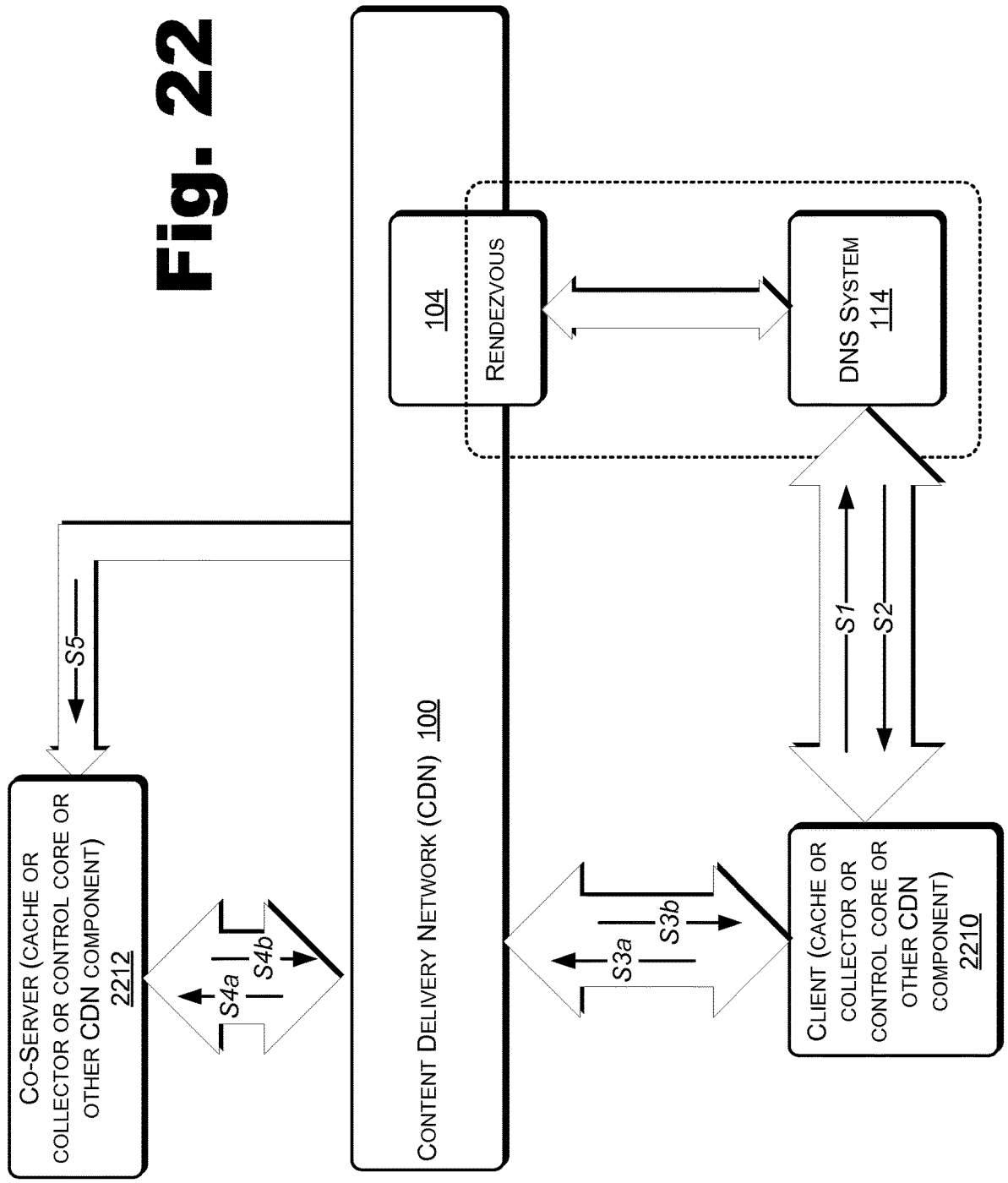

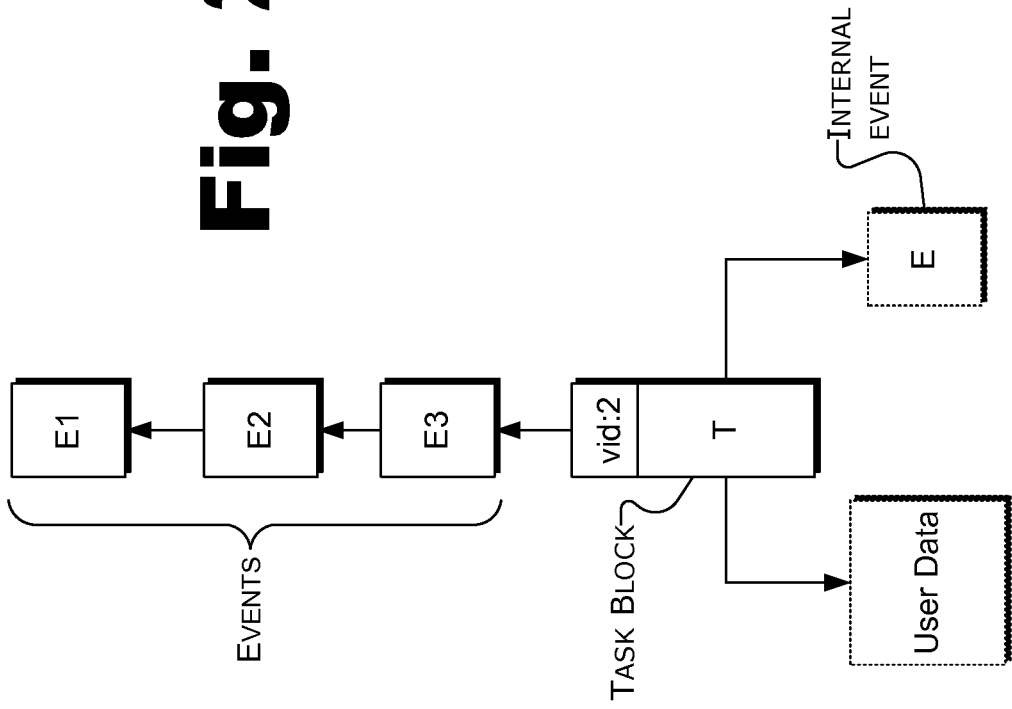

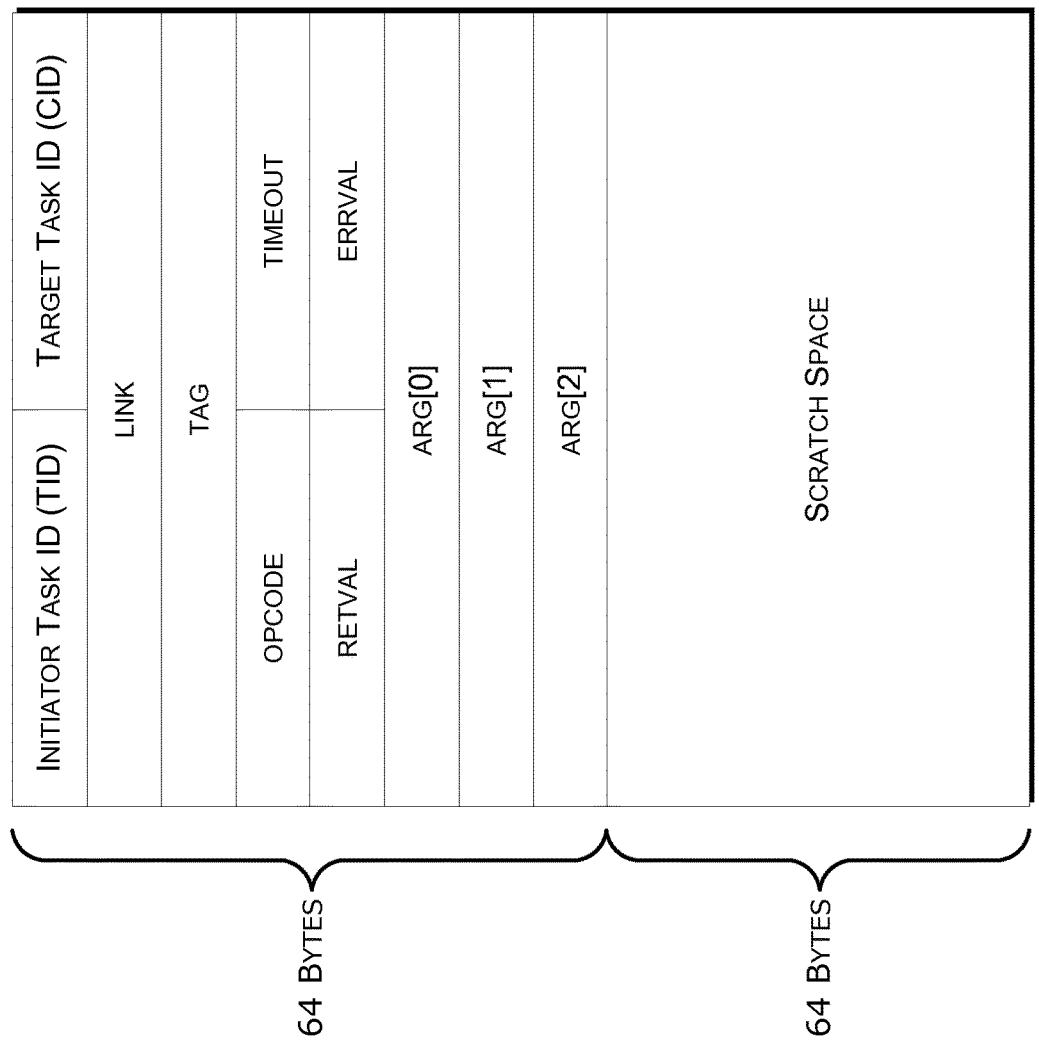

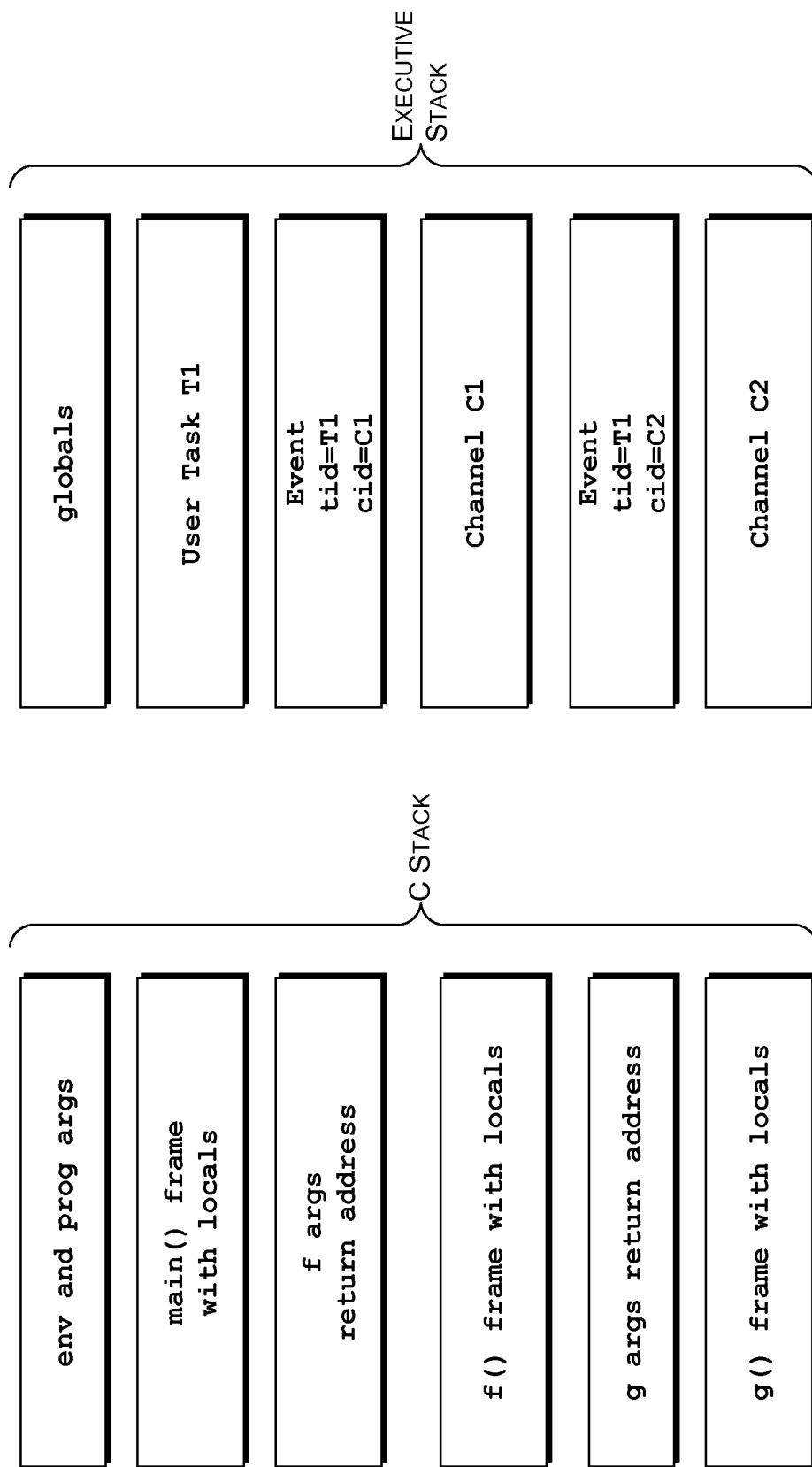

CONTROL IN A CONTENT DELIVERY NETWORK

RELATED APPLICATIONS

This application is related to and claims priority from co-owned and U.S. patent application Ser. No. 14/302,865, filed Jun. 12, 2014, published as US 2014-0372588 A1 on Dec. 18, 2014 and which is a continuation of application Ser. No. 13/714,410, filed Dec. 14, 2012, now U.S. Pat. No. 9,456,053, titled "Content Delivery Network," issued on Sep. 27, 2016, the entire contents of each of which are hereby fully incorporated herein by reference for all purposes. U.S. patent application Ser. No. 13/714,410 claimed priority from: (i) U.S. Application No. 61/570,448, titled "Content Delivery Network," filed Dec. 14, 2011, and (ii) U.S. Application No. 61/570,486, titled "Content Delivery Network," filed Dec. 14, 2011, the entire contents of each of which are fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

INCORPORATION BY REFERENCE

The following U.S. patents and published U.S. patent applications are hereby fully incorporated herein by reference for all purposes:
1. U.S. Pat. No. 7,822,871 titled "Configurable Adaptive Global Traffic Control And Management," filed Sep. 30, 2002, issued Oct. 26, 2010.
2. U.S. Pat. No. 7,860,964 titled "Policy-Based Content Delivery Network Selection," filed Oct. 26, 2007, issued Dec. 28, 2010
3. U.S. Pat. No. 6,185,598 titled "Optimized Network Resource Location," filed Feb. 10, 1998, issued Feb. 6, 2001
4. U.S. Pat. No. 6,654,807 titled "Internet Content Delivery Network," filed Dec. 6, 2001, issued Nov. 25, 2003
5. U.S. Pat. No. 7,949,779 titled "Controlling Subscriber Information Rates In A Content Delivery Network," filed Oct. 31, 2007, issued May 24, 2011
6. U.S. Pat. No. 7,945,693 titled "Controlling Subscriber Information Rates In A Content Delivery Network," filed Oct. 31, 2007, issued May 17, 2011
7. U.S. Pat. No. 7,054,935 titled "Internet Content Delivery Network," filed Mar. 13, 2002, issued May 30, 2006
8. U.S. Published Patent Application No. 2009-0254661 titled "Handling Long-Tail Content In A Content Delivery Network (CDN)," filed Mar. 21, 2009
9. U.S. Published Patent Application No. 2010-0332595 titled "Handling Long-Tail Content In A Content Delivery Network (CDN)," filed Sep. 13, 2010
10. U.S. Pat. No. 8,015,298 titled "Load-Balancing Cluster," filed Feb. 23, 2009, issued Sep. 6, 2011
11. U.S. Pat. No. 8,489,750, issued Jul. 16, 2013, published under No. 2010-0332664 titled "Load-Balancing Cluster," filed Sep. 13, 2010.

BACKGROUND OF THE INVENTION

Field of the Invention

This invention relates to content delivery and content delivery networks. More specifically, to content delivery networks and systems, frameworks, devices and methods supporting content delivery and content delivery networks.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 2 and 3 depict cache cluster sites in a CDN;

FIG. 6 depicts an exemplary cache cluster site;

FIGS. 12A-12C show various data structures;

FIG. 14A-14D show examples of sequencers and handlers;

FIG. 15B is a flow chart showing exemplary request-response processing in a CDN;

FIGS. 18 and 19 depict various tables and databases used by the CDN;

FIGS. 20A to 20C is a flow chart describing an exemplary request-response processing flow;

FIGS. 21A to 21H show an exemplary CDN and aspects of its operation;

FIG. 22 show interaction between components of the CDN; and

FIGS. 24A to 24E, and 25A to 25B and 26 describe aspects of the Executive system.

DETAILED DESCRIPTION OF THE PRESENTLY PREFERRED EXEMPLARY EMBODIMENTS

Glossary

As used herein, unless used otherwise, the following terms or abbreviations have the following meanings:

CCS means Customer Configuration Script
CDN means Content Delivery Network;
CNAME means Canonical Name;
DNS means Domain Name System;
FQDN means Fully Qualified Domain Name;
FTP means File Transfer Protocol;
GCO means Global Configuration Object;
HTTP means Hyper Text Transfer Protocol;
HTTPS means HTTP Secure;
IP means Internet Protocol;
IPv4 means Internet Protocol Version 4;
IPv6 means Internet Protocol Version 6;
IP address means an address used in the Internet Protocol, including both IPv4 and IPv6, to identify electronic devices such as servers and the like;
MX means Mail Exchange;
NDC means Network Data Collector;
NS means Name Server;
QoS means quality of service;
TCP means Transmission Control Protocol;
URI means Uniform Resource Identifier;
URL means Uniform Resource Locator; and
VIP address means a virtual IP address.

Background and Overview

The primary purpose of a content delivery network—a CDN—is to distribute resources efficiently to client machines on behalf of one or more content providers, preferably via a public Internet. A CDN can also provide an over-the-top transport mechanism for efficiently sending content in the reverse direction—from the client to the origin server. Both end-users (clients) and content providers benefit from using a CDN. By using a CDN, a content provider is able to take pressure off its own servers. Clients benefit by being able to obtain content with fewer delays.

Overview—Structure

Figure 1:
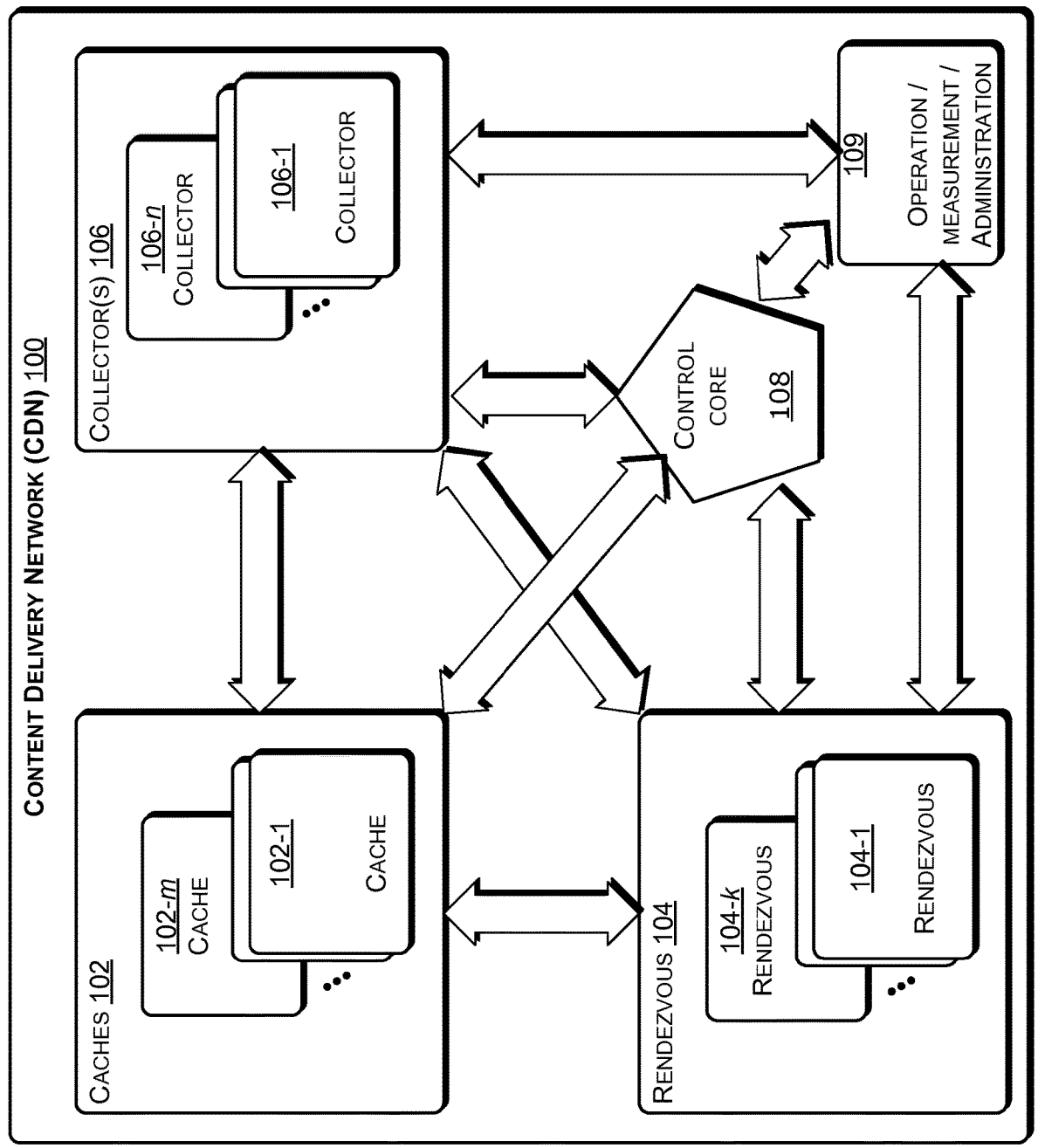
FIG. 1. shows exemplary content delivery network (CDN)

FIG. 1 shows an exemplary CDN 100, which includes multiple caches 102-1, 102-2 . . . 102-m (collectively caches 102, individually cache 102-i), rendezvous mechanisms/systems 104-1 . . . 104-k, (collectively rendezvous mechanism(s)/system(s) 104, made up of one or more rendezvous mechanisms 104-j), collector mechanism/system 106 (made up of one or more collector mechanisms 106-1 . . . 106-n), and a control core 108. The CDN 100 also includes various operational and/or administrative mechanisms 109.

As shown in FIG. 2, each CDN cache 102 may be a cache cluster site 202 comprising one or more cache clusters 204. The cache cluster site 202 may include a routing mechanism 206 acting, inter alia, to provide data to/from the cache clusters 202. The routing mechanism 206 may perform various functions such as, e.g., load balancing, or it may just pass data to/from the cache cluster(s) 204. Depending on its configuration, the routing mechanism 206 may pass incoming data to more than one cache cluster 204. FIG. 3 shows an exemplary cache cluster site 202 with p cache clusters (denoted 204-1, 204-2 . . . 204-p).

Figure 4:
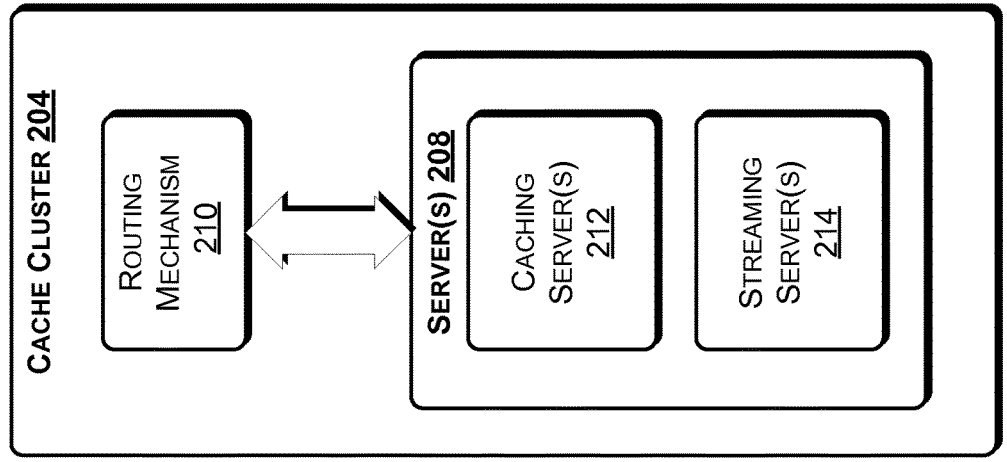

As shown in FIG. 4, a cache cluster 204 comprises one or more servers 208. The cache cluster preferably includes a routing mechanism 210, e.g., a switch, acting, inter alia, to provide data to/from the servers 208. The servers 208 in any particular cache cluster 204 may include caching servers 212 and/or streaming servers 214. The routing mechanism 210 provides data (preferably packet data) to the server(s) 208. Preferably the routing mechanism 210 is an Ethernet switch.

Figure 5:
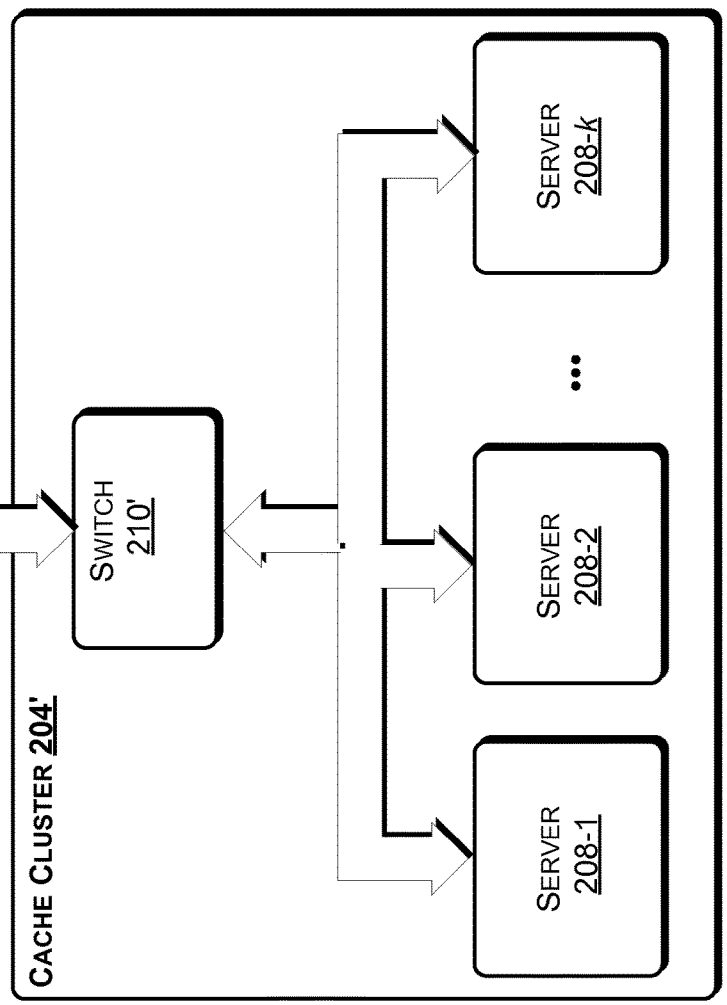
FIGS. 4 and 5 depict cache clusters in the cache cluster sites of FIGS. 2 and 3.

The routing mechanism 210 may perform various functions such as, e.g., load balancing, or it may just pass data to/from the server(s) 208. Depending on its configuration, the routing mechanism 210 may pass incoming data to more than one server 208. FIG. 5 shows an exemplary cache cluster 204' comprising k servers (denoted 208-1, 208-2 . . . 208-k) and a switch 210'.

The cache cluster site routing mechanism 206 may be integrated with and/or co-located with the cache cluster routing mechanism 210.

FIG. 6 shows an exemplary cache cluster site 202" with a single cache cluster 204" comprising one or more servers 208". The server(s) 208" may be caching servers 212" and/or streaming servers 214". As shown in the example in FIG. 6, the cache cluster routing mechanism 210" and the cache cluster site's routing mechanism 206" are logically/functionally (and possibly physically) combined into a single mechanism (as shown by the dotted line in the drawing).

A cache server site may be a load-balancing cluster, e.g., as described in U.S. published Patent Application No. 2010-0332664, filed Feb. 28, 2009, titled "Load-Balancing Cluster," and U.S. Pat. No. 8,015,298, titled "Load-Balancing Cluster," filed Feb. 23, 2009, issued Sep. 6, 2011, the entire contents of each of which are fully incorporated herein by reference for all purposes.

In presently preferred implementations, some of the cache cluster servers 208 that are connected to a particular switch 210 will share the same virtual IP (VIP) addresses. (Each cache cluster server 208 will also preferably have a different and unique IP address.) In these presently preferred implementations, for the purposes of CDN control, the cache cluster routing mechanism 210 and the cache cluster site's routing mechanism 206 are logically/functionally (and preferably physically) combined into a single mechanism—a switch. In these implementations the cache cluster site refers to all of the machines that are connected to (e.g., plugged in to) the switch. Within that cache cluster site, a cache cluster consists of all machines that share the same set of VIPs.

An exemplary cache cluster 204 is described in U.S. published Patent Application No. 2010-0332664, titled "Load-Balancing Cluster," filed Sep. 13, 2010, and U.S. Pat. No. 8,015,298, titled "Load-Balancing Cluster," filed Feb. 23, 2009, issued Sep. 6, 2011, the entire contents of each of which are fully incorporated herein for all purposes.

With reference again to FIG. 1, as explained in greater detail below, the rendezvous system 104 is used to direct client resource requests. The rendezvous system 104 is preferably implemented using the DNS and comprises one or more DNS name servers. The rendezvous mechanisms 104-j are preferably domain name servers implementing policy-based domain name resolution. An exemplary rendezvous system 104 is described in U.S. Pat. No. 7,822,871, titled "Configurable Adaptive Global Traffic Control And Management," filed Sep. 30, 2002, issued Oct. 26, 2010, and U.S. Pat. No. 7,860,964 "Policy-Based Content Delivery Network Selection," filed Oct. 26, 2007, issued Dec. 28, 2010, the entire contents of each of which are fully incorporated herein for all purposes.

Figure 7:
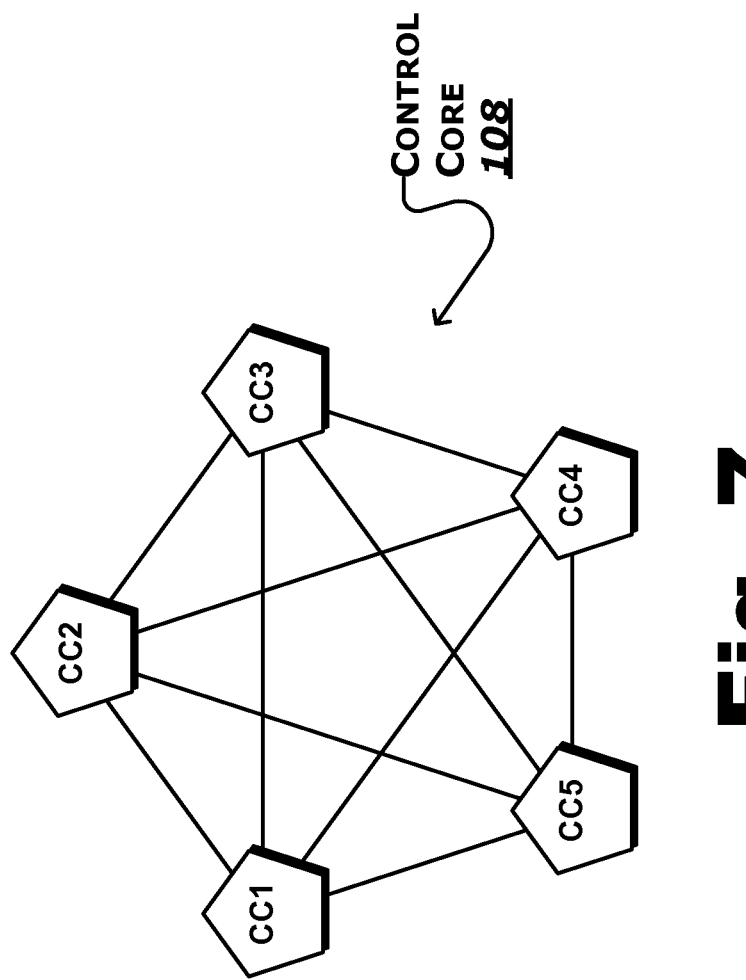
FIG. 7 depicts a control core cluster of a CDN.

The control core mechanism 108 controls operation of the CDN and is described in greater detail below. Physically, the control core preferably consists of a set of geographically distributed machines, preferably connected via high-speed communication links. E.g., five machines located in New York, San Francisco, Chicago, London, and Frankfurt. Logically, the control core acts like a single, robust data base/web server combination, containing configuration data. FIG. 7 shows an exemplary control core mechanism 108 made up of five distinct components or machines (denoted CC1, CC2, CC3, CC4, CC5 in the drawing). While shown with five components or machines, those of skill in the art will realize and understand, upon reading this description, that the control core could be formed of any number of components or machines comprising the control core. Odd numbers are preferable because of the use of voting by the components or machines. Larger numbers will make the control core more available but respond slower. Having only one machine is a degenerate case possibly useful in non-production situations. The components or machines forming the control core are operated together as a single high-availability cluster, and are shown as a single entity in most drawings. It should be understood that any particular interaction with the control core mechanism 108 will likely take place with only one of its component machines. The control core mechanism 108 is also referred to herein as the control core cluster 108 or the control core 108.

Although only one control core 108 is shown in FIG. 1, it should be appreciated that a CDN may have more than one control core, with different control cores controlling different aspects or parts of the CDN.

The control core 108 is addressable by one or more domain names. For the sake of this description, the domain name control.fp.net will be used for the control core 108. In a preferred implementation the control core cluster consists of five (5) distinct and geographically distributed control core mechanisms and is operated as a multihomed location with five (5) IP addresses. Thus, when a client asks a DNS server to resolve the control core's domain name (e.g., control.fp.net) the DNS server will return one or more of the five IP addresses associated with that name. That client may then access the control core at one of those addresses. It should be appreciated that the DNS server(s) will provide the client with a rendezvous to a "nearby" control core server or servers (i.e., to "best" or "optimal" control core server(s) for that client), similar to the manner in which clients rendezvous with CDN servers. In other words, internal components of the CDN (cache servers, control cores, etc.) may use the same rendezvous mechanisms as are used by entities outside the CDN to rendezvous with CDN components. In some cases the various control core mechanisms may have the same IP address, in which cases routing tables may direct a client to a "best" or "optimal" control core mechanism. This may also be achieved using an anycast IP address.

Tiers and Groups

Figure 8:
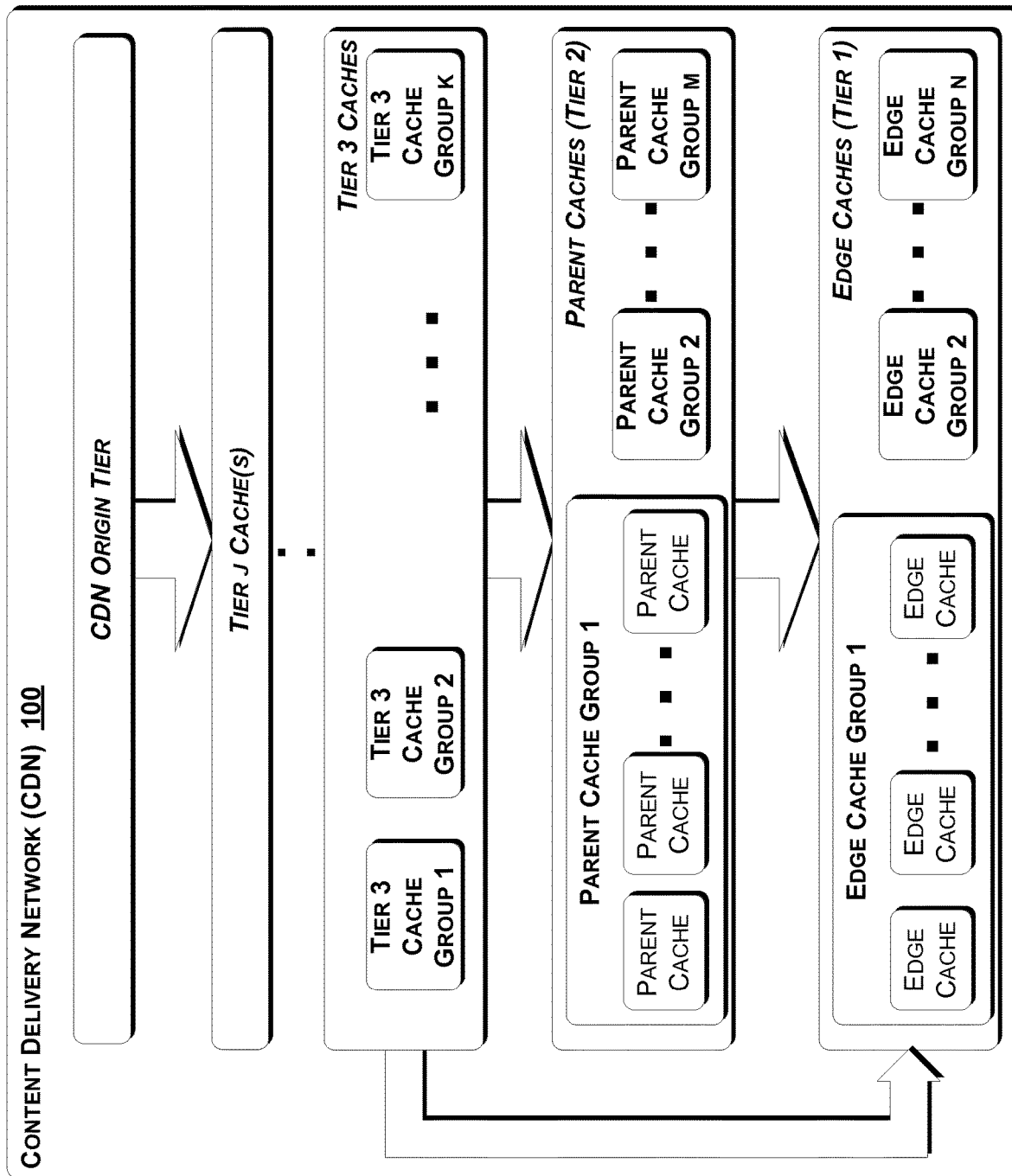
FIGS. 8 and 9 depict the hierarchical organization of a content delivery network and the logical organization of caches in a CDN.

A CDN may have one or more tiers of caches, organized hierarchically. FIG. 8 depicts a content delivery network 100 that includes multiple tiers of caches. Specifically, the CDN 100 of FIG. 8 shows j tiers of caches (denoted Tier 1, Tier 2, Tier 3, . . . Tier j in the drawing). Each tier of caches may comprise a number of caches organized into cache groups. A cache group may correspond to a cache cluster site or a cache cluster (202, 204 in FIGS. 2-5). The Tier 1 caches are also referred to as edge caches, and Tier 1 is sometimes also referred to as the "edge" or the "edge of the CDN." The Tier 2 caches (when present in a CDN) are also referred to as parent caches.

For example, in the CDN 100 of FIG. 8, Tier 1 has n groups of caches (denoted "Edge Cache Group 1", "Edge Cache Group 2", . . . "Edge Cache Group n"); tier 2 (the parent caches' tier) has in cache groups (the i-th group being denoted "Parent Caches Group i"); and tier 3 has k cache groups, and so on. Preferably each tier has the same number of cache groups, although this is not required.

Figure 9:
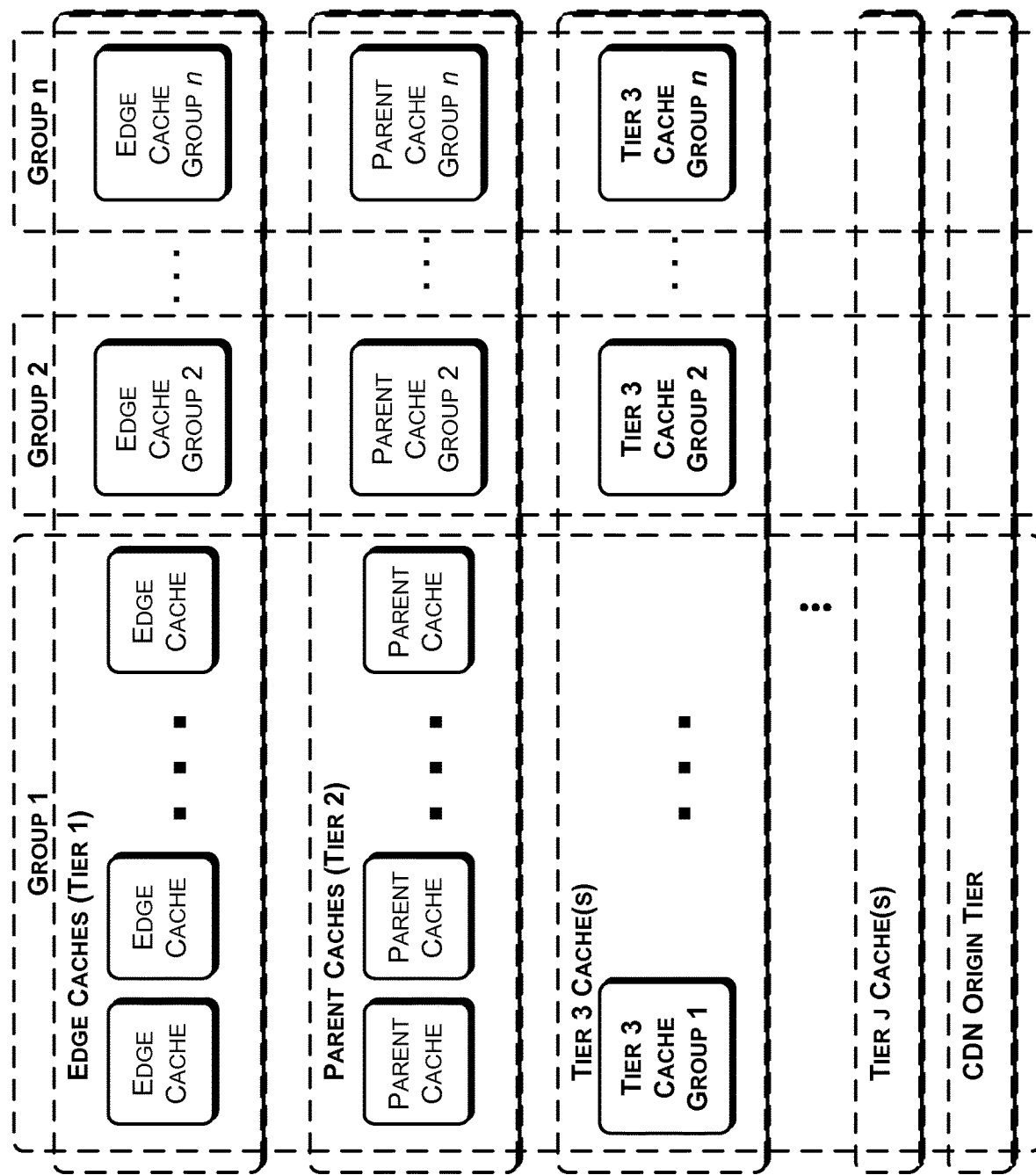

FIG. 9 shows the logical organization/grouping of caches in a CDN of FIG. 8. In the exemplary CDN 100 of FIG. 9, each tier of caches has the same number (n) of cache groups. Those of skill in the art will know and understand, upon reading this description, that each cache group may have the same or a different number of caches. Additionally, the number of caches in a cache group may vary dynamically. For example, additional caches may be added to a cache group to deal with increased load on the group.

The caches in a cache group may be homogeneous or heterogeneous, and each cache in a cache group may comprise a cluster of physical caches sharing the same name and/or network address. An example of such a cache is described in co-pending and co-owned U.S. published Patent Application No. 2010-0332664, titled "Load-Balancing Cluster," filed Sep. 13, 2010, and U.S. Pat. No. 8,015,298, titled "Load-Balancing Cluster," filed Feb. 23, 2009, issued Sep. 6, 2001, the entire contents of which are fully incorporated herein by reference for all purposes.

Caches in the same tier and the same group may be referred to as peers or peer caches. In general, for each Tier j, the caches in Tier j may be peers of each other, and the caches in Tier j+1 may be referred to as parent caches. In some cases, caches in different groups and/or different tiers may also be considered peer caches. It should be appreciated that the notion of peers is flexible and that multiple peering arrangements are possible and contemplated herein.

A typical CDN has only one or two tiers of caches. A CDN with only one tier will have only edge caches, whereas a CDN with two tiers will have edge caches and parent caches. (At a minimum, a CDN should have at least one tier of caches—the edge caches.)

The grouping of caches in a tier may be based, e.g., on one or more of their physical or geographical location, network proximity, the type of content being served, the characteristics of the machines within the group, etc. For example, a particular CDN may have six groups—four groups of caches in the United States, group 1 for the West Coast, group 2 for the mid-west, Group 3 for the northeast and Group 4 for the south east; and one group each for Europe and Asia.

Those of skill in the art will realize and understand, upon reading this description, that cache groups may correspond to cache clusters or cache cluster sites.

A particular CDN cache is preferably in only one cache group.

In general, some or all of the caches in each tier can exchange data with some or all of the caches in each other tier. Thus, some or all of the parent caches can exchange information with some or all of the edge caches, and so on. For the sake of simplicity, in the drawing (FIG. 8), each tier of caches is shown as being operationally connectable to each tier above and below it, and Tier 3 is shown as operationally connected to Tier 1 (the Edge Tier). In some CDNs, however, it may be preferable that the caches in a particular tier can only exchange information with other caches in the same group (i.e., with peer caches) and/or with other caches in the same group in a different tier. For example, in some CDNs, the edge caches in edge cache group k, can exchange information with each other and with all caches in parent cache group k, and so on.

A content provider's/customer's server (or servers) are also referred to as origin servers. A content provider's origin servers may be owned and/or operated by that content provider or they may be servers provided and/or operated by a third party such as a hosting provider. The hosting provider for a particular content provider may also provide CDN services to that content provider. With respect to a particular subscriber/customer resource, a subscriber/customer origin server is the authoritative source of the particular resource. More generally, in some embodiments, with respect to any particular resource (including those from elements/machines within the CDN), the authoritative source of that particular resource is sometimes referred to as a co-server.

A CDN may also include a CDN origin/content cache tier which may be used to cache content from the CDN's subscribers (i.e., from the CDN subscribers' respective origin servers). Those of skill in the art will know and understand, upon reading this description, that a CDN can support one or more content providers or subscribers, i.e., that a CDN can function as a shared infrastructure supporting numerous content providers or subscribers. The CDN origin tier may also consist of a number of caches, and these caches may also be organized (physically and logically) into a number of regions and/or groups. The cache(s) in the CDN origin tier obtain content from the content providers'/subscribers' origin servers, either on an as needed basis or in advance or an explicit pre-fill.

Overview—Operation

Figure 10:
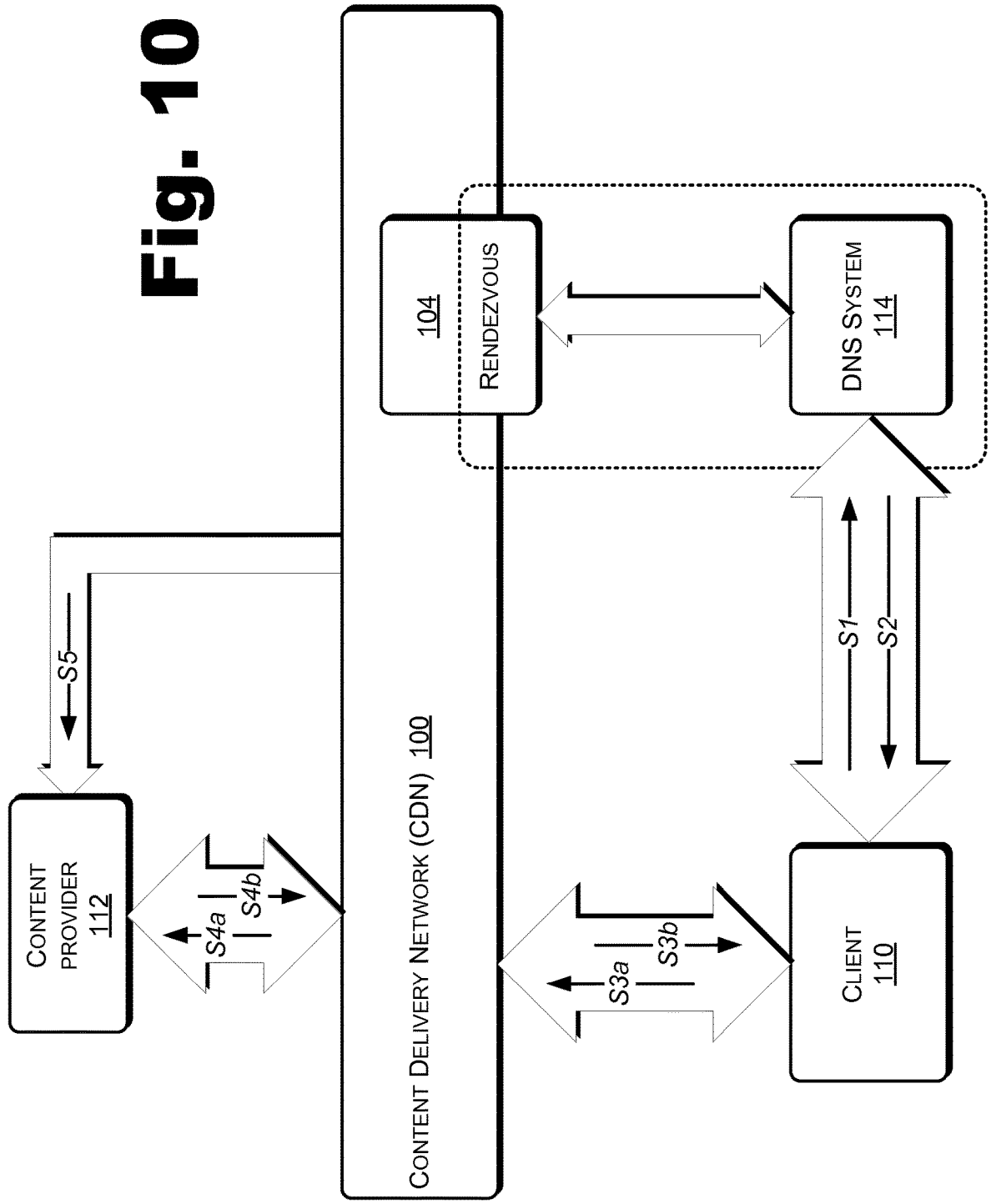
FIG. 10 shows a typical interaction between a client and a CDN.

FIG. 10 shows a typical interaction between a client 110 and a CDN 100. In this case the CDN 100 serves content (resources) on behalf of the content provider 112. As described above, the CDN includes multiple locations (e.g., cache sites not shown in the drawing) from which content may be provided/served to clients. The process of associating a particular client (or client request) with a particular location in the CDN is referred to as a rendezvous process. When a particular client (e.g., client 110) wants to obtain some content (e.g., a particular resource), that client is typically directed to a "best" (or "optimal") location (via some rendezvous mechanism 104). As used here, a location may be, e.g., a server, a server site, a region of servers, a cache cluster, a cache cluster site, etc. The location may even be another CDN or network or a server outside the CDN 100. With reference to FIGS. 1-7, the "best" or "optimal" location may be, without limitation, a cache cluster site, a cache cluster, a group, a tier, or some combination thereof.

Those of skill in the art will realize and understand, upon reading this description, that the notion of a "best" or "optimal" location is dependent on multiple factors, including, without limitation, some or all of the following: network load, load on the CDN servers and other components, location of the client computer, etc. The notion of a "best" or "optimal" location may vary by time of day, type of content, content provider policies, CDN policies, etc. The invention is not to be limited in any way by the manner in which a "best" or "optimal" location in the CDN is determined.

A "best" or "optimal" server may be selected by a server selection mechanism such as described in U.S. Pat. Nos. 6,185,598; 6,654,807; 7,949,779; 7,945,693; and 7,054,935, the entire contents of each of which are fully incorporated herein for all purposes. In a presently preferred implementation, the server selection mechanism is part of and/or uses the DNS system.

In a presently preferred implementation, the rendezvous system 104 uses and is integrated into the DNS system, as described in U.S. Pat. No. 7,822,871, filed Sep. 30, 2002, issued Oct. 26, 2010, and U.S. Pat. No. 7,860,964, filed Oct. 26, 2007, issued Dec. 28, 2010, the entire contents of each of which are fully incorporated herein for all purposes. The client 110's DNS system 114 interacts with the CDN's rendezvous mechanism 104 in order to associate a particular client request for a resource with a particular location, preferably in the CDN 100, from which that requested resource will be served to the client. The "best" or "optimal" location may be provided by the rendezvous mechanism 104 as one or more IP addresses or a CNAME (domain name) corresponding to one or more locations in the CDN or to a different CDN or network.

With reference to FIG. 10, an exemplary use of the CDN 100 (in which the client 110 wants to obtain a particular resource) is as follows:

The client computer 110 interacts with the rendezvous mechanism 104 in order to determine the "best" location from which to obtain the particular resource (at S1). When the rendezvous mechanism 104 is integrated into the DNS system, the client's DNS system 114 interacts with the CDN's rendezvous mechanism 104 to direct the client to a location, preferably in the CDN 100, from which the client can obtain (or try to obtain) the resource. When the rendezvous mechanism 104 is integrated into the DNS system, this request (at S1) may be part of a request to resolve a domain name associated with the particular resource, and the rendezvous mechanism may provide the client with one or more IP addresses or CNAME of one or more locations in the CDN (at S2). If the rendezvous mechanism provides more than one IP address (corresponding to more than one "best" location), the client may select which of those addresses to use.

Having obtained a "best" location from which to obtain the particular resource, the client computer 110 then requests the particular resource from the location in the CDN 100 (at S3a). The CDN 100 may already have a copy of that particular resource at that location, in which case it provides (serves) the resource to the client computer 110 (at S3b). If the CDN did not already have a copy of that particular resource at that location, then it tries to obtain a copy at that location (either from another location in the CDN or from the content provider 112 (at S4a, S4b)). Having obtained the resource (either from another location in the CDN or from a the content provider 112), the CDN 100 provides (serves) the resource to the client computer 110 (at S3b). It should be appreciated that in some cases the response could be generated within the CDN as opposed to fetched. This may occur, e.g., in the case of a conversion from an existing resource (such as a compression/transcoding) or completely generated by a script/process (either previously pulled from the content providers origin server, or provided from the control core as part of the property configuration.

The CDN may also provide information (e.g., logs and performance data) to content providers regarding resources delivered on their behalf Thus, as shown in FIG. 10, the CDN 100 may provide information to the content provider 112 (at S5).

To simplify the above explanation, FIG. 10 shows only one client computer 110, one content provider 110 and one CDN 100. Those of skill in the art will realize and understand, upon reading this description, that a typical CDN may provide content on behalf of multiple content providers to multiple client computers. Those of skill in the art will also realize and understand, upon reading this description, that the system may include multiple CDNs, and that the rendezvous mechanism 104 may cause client requests to be directed to different ones of the CDNs. An exemplary rendezvous mechanism 104 is described, e.g., in U.S. Pat. Nos. 7,822,871 and 7,860,964, the entire contents of each of which are fully incorporated herein by reference for all purposes.

As used herein, the terms "resource" and "content" refer, without any limitations, to any and all kinds of resources and/or content that may be provided to client computers via CDNs. Resources and/or content may be any static or dynamic data item comprising an arbitrary sequence of bits, regardless of how those bits are stored or transmitted, and regardless of what those bits represent. A resource provided by a CDN may comprise data representing some or all of another resource, including some or all of: a file, a portion of a file, a digital message, a portion of a digital message, a digital image, a portion of a digital image, a video signal, a portion of a video signal, an audio signal, a portion of an audio signal, a software product, a portion of a software product, a page in memory, a web page; a movie, and a portion of a movie. This list is given by way of example, and is not intended to be in any way limiting.

FIG. 10 shows the client 110 as separate from the CDN. As will be explained in detail below, the inventors realized that the various components of the CDN could themselves act as clients with respect to the CDN in order to obtain CDN related resources. Therefore the client may be a CDN element or component, e.g., a cache. Similarly, FIG. 10 shows the content provider 112 as separate from the CDN. As will be explained in detail below, the inventors realized that the various components of the CDN could themselves act as content providers with respect to the CDN in order to provide CDN related resources to other CDN components. Thus, e.g., as will be explained further below, with reference to FIG. 1, when a collector mechanism 106 obtains information from a cache 102, that collector mechanism 106 is acting as a client, while the cache 102 is a content provider.

The CDN has been described thus far in terms of its separate and distinct components. It should be understood, however, that within the CDN each object (e.g., all data that is to be moved between CDN components) is treated as a web object or resource, with, e.g. the control core acting as the "origin tier" for such objects. That is, each CDN object has a URL (or whatever address is used by the CDN), and each CDN object can be requested, filled, invalidated, refreshed, etc. Each cache has the knowledge (information) it needs to obtain and provide CDN objects. This approach allows all data transfers within the CDN to use the CDN itself. The CDN can thus use its own mechanisms to deal with CDN control and/or management-related information (e.g., control core data). Thus, e.g., any CDN component can obtain CDN data using the CDN.

Request-Response Processing

In operation, the various CDN components (e.g., caches) receive requests for resources, processes those requests, and provide responses (which may include, e.g., the requested resources, error messages, or directions to find the resources elsewhere).

Figure 11:
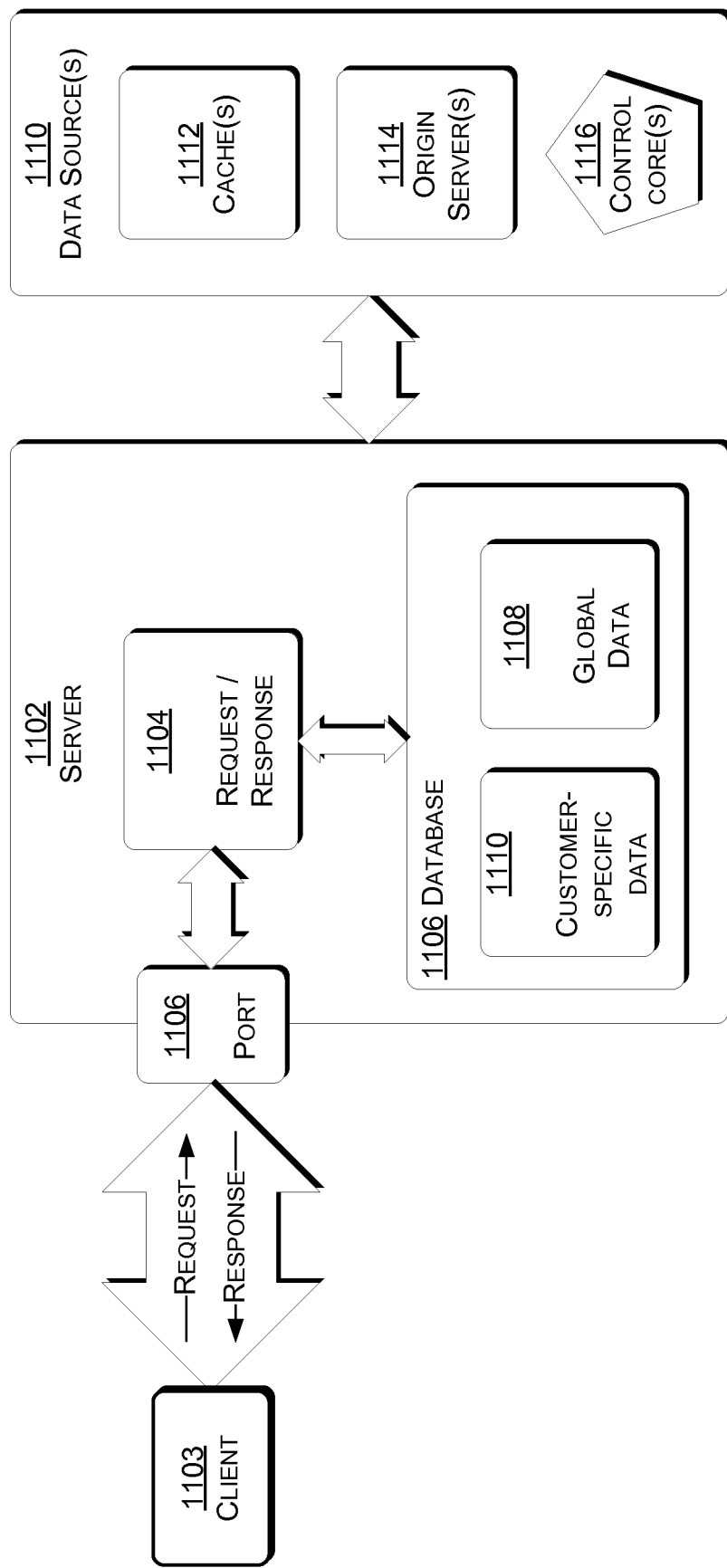
FIG. 11 shows request-response processing in a CDN.

FIG. 11 shows the request-response operation of an exemplary CDN component 1102. Although component 1102 is denoted "Server" in the drawing, it should be appreciated that component 1102 may be a cache server or any other component of the CDN that performs request-response processing. As shown in the drawing, client 1103 makes a request for a resource of server 1102, and receives a response to that request. In processing that request, as explained below, the server 1102 may obtain information from one or more other data sources 1110. Some of these data sources 1110 may be other CDN components (e.g., caches 1112 or control core(s) 1116). The data sources 1110 may also include origin server(s) 1114 that may or may not be part of the CDN. It should be appreciated that the client 1103 may be another CDN component (e.g., a cache) or it may be a client entity that is external to the CDN.

The server 1102 preferably supports HTTP/1.0, and HTTP/1.1, and HTTPS requests, although it is not limited to those protocols or to any particular version of any protocol. HTTP/1.1 is defined in Network Working Group, Request for Comments: 2616, June 1999, "Hypertext Transfer Protocol—HTTP/1.1," the entire contents of which are fully incorporated herein by reference for all purposes. HTTPS is described in Network Working Group, Request for Comments: 2818, May 2000, "HTTP Over TLS," the entire contents of each of which are fully incorporated herein by reference for all purposes. Unless specifically stated otherwise, "HTTP" is used in this description to refer to any version or form of HTTP request, including HTTP and HTTPS requests. Those of skill in the art will realize and understand, upon reading this description, that HTTPS may be preferred in situations where additional security may be required. It should also be appreciated that when an HTTP request is referred to herein, some other protocols, including possibly proprietary protocols, may be used while still leveraging the CDN and using URLs to name the objects.

The server 1102 includes a request/response mechanism 1104 (preferably implemented by software in combination with hardware on the server 1102). The request/response mechanism 1104 listens for requests on multiple configured addresses/ports, including port 1106.

When a request is made, the request/response mechanism 1104 tries to identify a customer associated with that request. As used here, a "customer" is an entity that is authorized to have its content served by the server 1102. The customer may be an external entity such as, e.g., a subscriber to the CDN, or the customer may be another CDN component. In order to determine whether or not the request is associated with a customer of the CDN (or the CDN itself), the server 1102 needs at least some information about the CDN's customers. This information may be stored as global data 1108 in a database 1106 on the server 1102. The global data 1108 should include sufficient data to allow the server 1102 to either reject the request (in the case of a request for a resource that is not associated with a customer), or to serve the requested resource to the client 1103, or to direct the client to another source from which the requested resource can be served. If the server 1102 does not have the required global data 1108 at the time of the client request, it may obtain the needed global data 1108 from a data source 1110, preferably from a control core 1116 or from another cache. In effect, for internal CDN data, the control core is considered an origin server or coserver.

As explained below, the request/response mechanism 1104 may perform customer-specific processing as part of the request/response processing. In order to perform customer-specific processing, the request/response mechanism needs certain customer-specific data 1110. If current customer-specific data 1110 are not available in the request/response mechanism's database 1106, the server 1102 may obtain the needed customer-specific data from a data source 1110, preferably from a control core 1116 (although customer-specific data may also be obtained from another cache 1112 in the CDN).

Objects, Sequencers and Handlers

The processing performed by request/response mechanism 1104 uses various kinds of objects, including a Notes Object, a Session Object (sxn), and a Transaction Object (txn). With reference to FIG. 12A, a Notes Object 1204 is a generalized string key/value table. FIGS. 12B-12C show a Session Object (sxn 1206) and a Transaction Object (txn 1208), respectively. A session object 1206 contains information about a particular client session, e.g., a client connection or an internally launched (or spawned) session. A Session Object 1206 may contain allocation context information for a session. A Transaction Object (txn 1208) is usually associated with a session and contains information about an individual request. During a session, multiple transactions may be performed, and information about each transaction is carried in a transaction object. E.g., a transaction object carries the request to be satisfied, room for the response, information about where the response body is coming from (e.g., response channel id), etc.

Figure 13A:
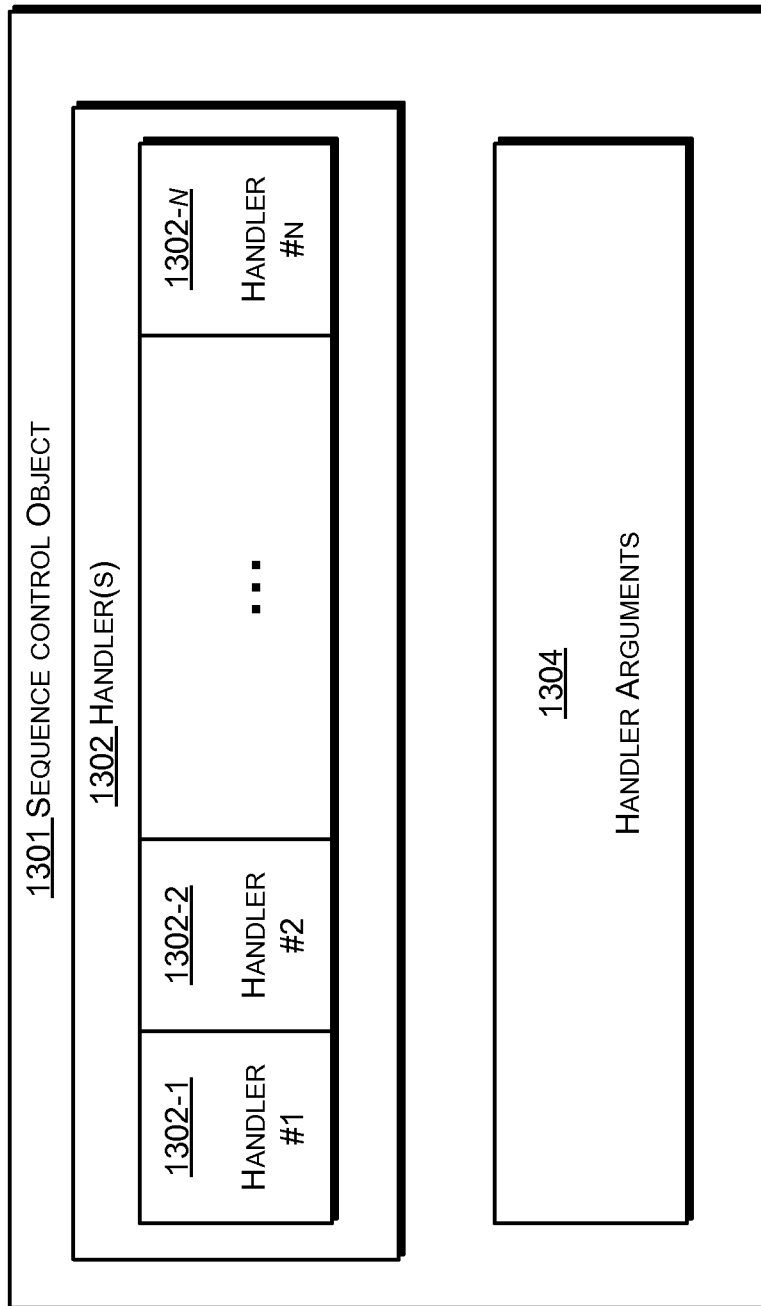
FIG. 13A is a logical depiction of a sequence control object.

A sequencer is essentially a task. A sequencer uses a sequence control object made up of an ordered list of one or more handlers and handler argument(s). FIG. 13A shows an exemplary sequence control object 1301 comprising handler(s) 1302 and handler argument(s) 1304. The handler(s) 1302 comprise the ordered lists of handlers 1302-1, 1302-2 . . . 1302-n. It should be appreciated that not all handlers require arguments, and that some handlers may obtain some or all of their arguments from other locations. It should also be appreciated that a sequence control object may have only a single handler and/or no arguments.

Figure 13B:
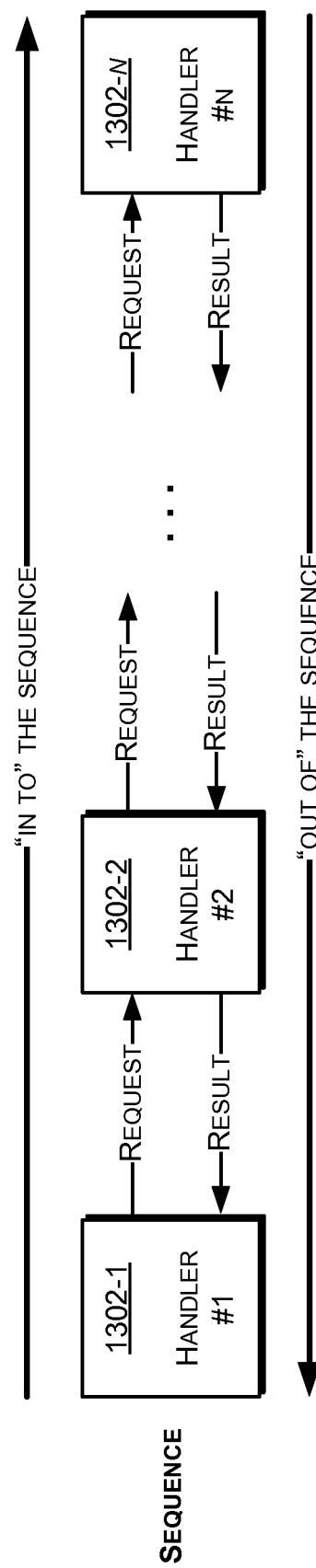
FIGS. 13B-13D show examples of sequences and sequence processing.

When running, a sequencer invokes its handlers (essentially, processing modules) in order. By default, sequencers are bidirectional, so that the sequencer's handlers are called (invoked) in order on the way "in" and in reverse order on the way "out". Handlers can modify the sequence, thereby providing flexibility. FIG. 13B shows the execution of the sequence of handlers 1302 from sequence control object 1301 (of FIG. 13D). As shown in FIG. 13B, the sequencer invokes the handlers in the order "Handler #1," "Handler #2," . . . "Handler #n" into the sequence and then in the reverse order out of the sequence. So "Handler #1" makes a request of "Handler #2", and so on, until "Handler #n", and then results are passed back, eventually from "Handler #2" to "Handler #1".

Figure 13C:
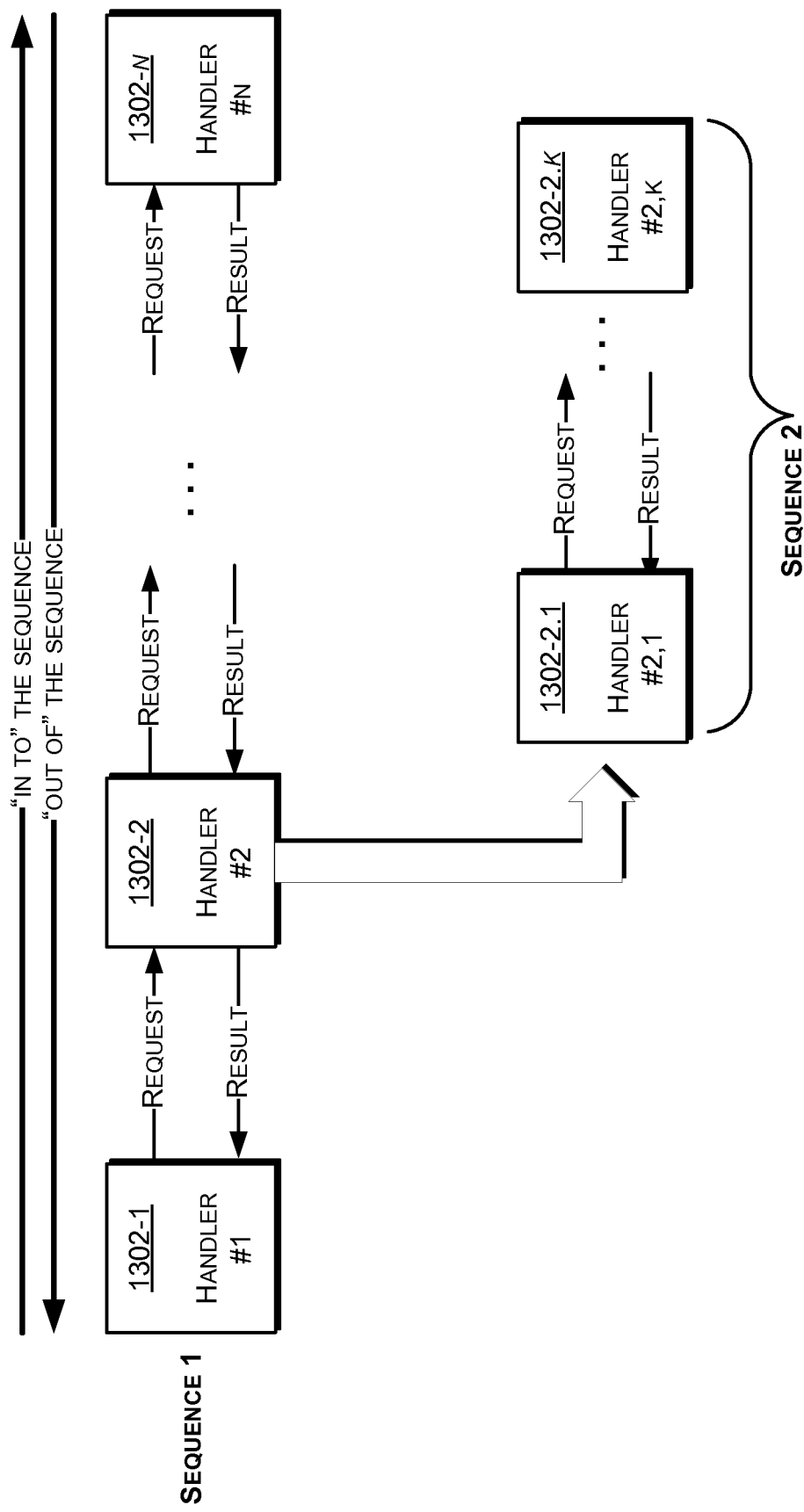

Handlers may be synchronous or blocking. Handlers may inspect and modify the sequence to which they belong, and handlers may launch their own sequencers. There are two forms of this process: one is where a handler launches a "subsequence". That subsequence runs in the same sequencer as the handler and the sequence the handler is in is suspended until the subsequence is complete. Another example is where a handler launches a complete sequencer. In that case, the sequencer is a separate, independent task. A powerful aspect of that model is that a handler could launch such a sequence on the way in to the sequence, allow processing to continue, and then pick up the result (waiting if necessary) on the way out of the sequence. FIG. 13C shows an example of a first sequence ("Sequence 1") in which a handler (Handler #2, 1302-2) launches (or spawns) another sequence ("Sequence 2", consisting of Handler #2,1 1302-2.1 . . . Handler #2,k 1302-2.k). If Sequence 2 runs in the same sequence as the handler #2, then handler #3 (of sequence 1) will not begin until sequence 2 is complete (i.e., until handler #2,k is done). If, on the other hand, sequence 2 is launched as an independent and separate task, sequence 1 can continue with handler #3, etc. without waiting for sequence 2 to complete.

Figure 13D:
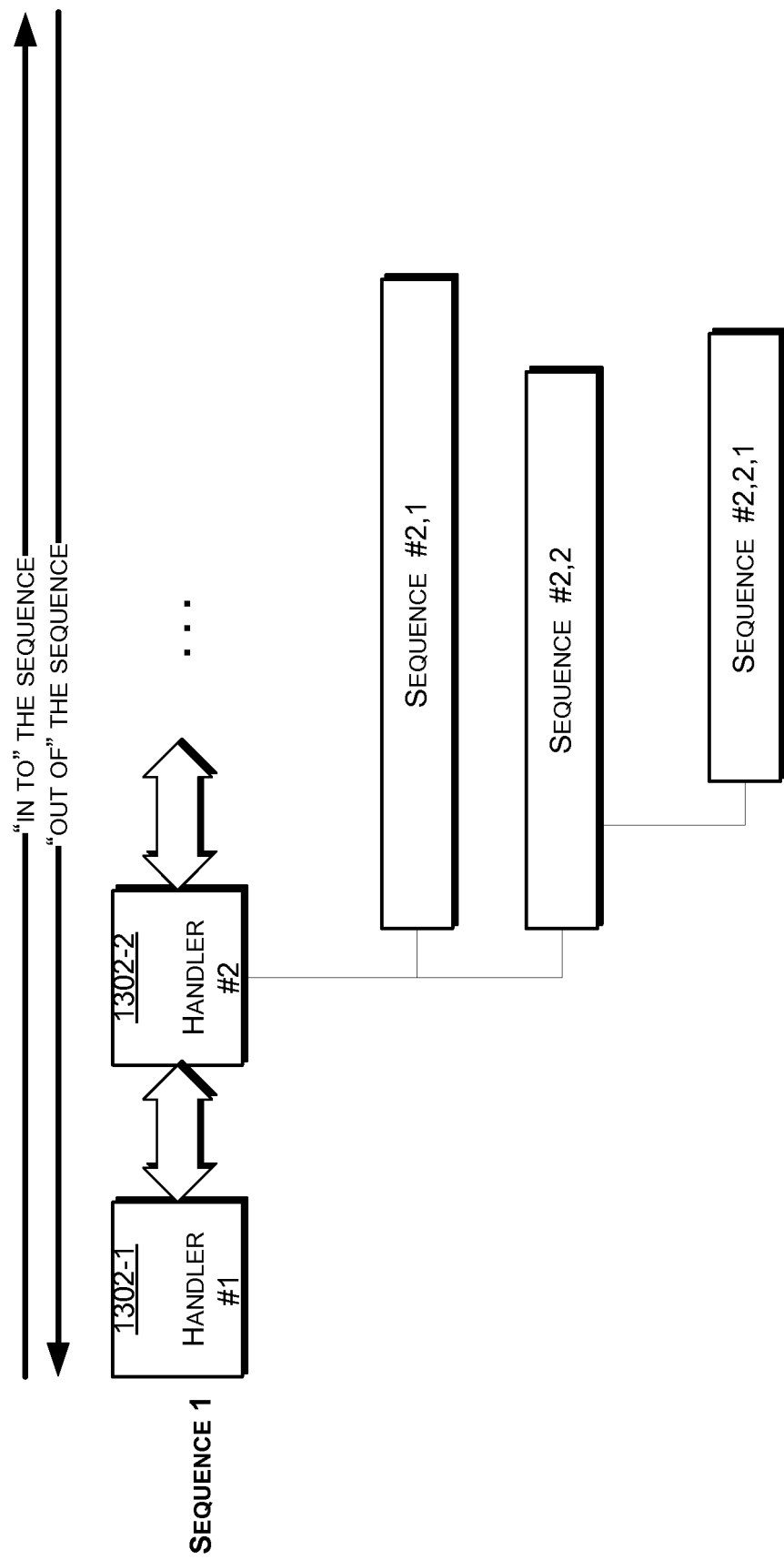

FIG. 13D shows an example of a first sequence ("Sequence 1") in which a handler (#2) launches two other sequences (Sequence #2,1, and Sequence #2,2). The Sequence #2,2 launches a subsequence #2,2.1.

A handler's behavior may be classified into three broad groups (or types):
One-shot: The handler is removed from sequence when done.
Intelligent: The handler may manipulate sequence.
Persistent: The handler is called on the way "in" and "out".

These labels are used as descriptive shorthand for basic types of handler behavior, and it should be appreciated that this type is not used by the sequencer, and nothing needs to enforce a handler's "type," and a handler may act differently depending on circumstances.

Handlers may be named (e.g.: "ssl", "http-conn", "http-session", "strip-query", "proxy-auth", etc.) to correspond to the functions that they are to perform.

A sequence control object may be stored in compiled form for re-use, so there is no need to constantly look up handler names.

The following is an example of a sequence specification for an HTTP listener:

```
listener = {
address = "*.80",
sequence = "http-conn, http-session"
}
```

In this example, the handlers are "http-conn" and "http-session", and the parameters are "address='*.80'". This listener task provides a bare TCP or cleartext connection. The first handler ("http-conn") is a one-shot handler which creates an HTTP connection from a cleartext connection. The second handler ("http-session") is an intelligent handler that takes the HTTP connection (as already created by the "http-conn" handler), creates a session object and handles the entire session. It should be appreciated that the listener is just providing the communication channel to the client, and the same basic listener code could be used with different handlers to implement protocols other than HTTP (e.g., FTP).

As another example, the following sequence specifies a general SSL listener:

```
listener = {
address = "*.443",
sequence = "ssl, http-conn, http-session"
}
```

In this example, the handlers are "ssl", "http-conn" and "http-session", and the parameters are "address='*.443'". This sequence is similar to the HTTP listener (above), except that the SSL handler first creates an SSL channel on the bare (encrypted) connection, suitable for the http-conn handler. Although the SSL handler is a "one-shot" handler, it needs to block since it must perform the SSL negotiation. That is, the "ssl" handler must complete before the next handler can begin. The SSL handler is responsible for instantiating an SSL channel. It should be appreciated that although the ssl channel is persistent, the handler which sets it up does not need to be persistent. The "ssl" handler instantiates an SSL channel on top of the cleartext channel . . . . Once that is done, the SSL channel (which does the decryption and encryption) persists until the connection is finished, even though the "ssl" handler itself is gone from the sequence. So the "ssl" handler is not performing the SSL operations itself, it is just enabling them by instantiating the necessary channel.

FIGS. 14A-14D show examples of sequencers and handlers.

Figure 14A:
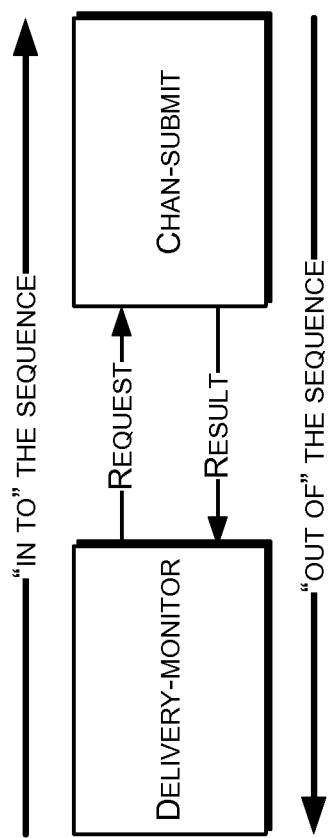

As shown above, a sequence may be is used to interpret a request and get to the point that a response is available to be pumped. Te same basic sequencing mechanism can be used to implement a programmable pump/filter, although of course the handlers themselves are now performing a different task. FIG. 14A shows a bidirectional sequence that is part of a pump/filter. The pump task uses "direct delivery" requests, e.g., sendfile( ), because it does not need to see the data itself. It should be appreciated that sendfile( ) is not the request, it is just one way a direct delivery request may be implemented by the channel involved. The delivery sequence consists of two handlers:

delivery-monitor (account bytes, monitors performance); and chan-submit (submits request to a channel, waits for response). The channel may be, e.g., an object channel, downstream channel, etc.

Figure 14B:
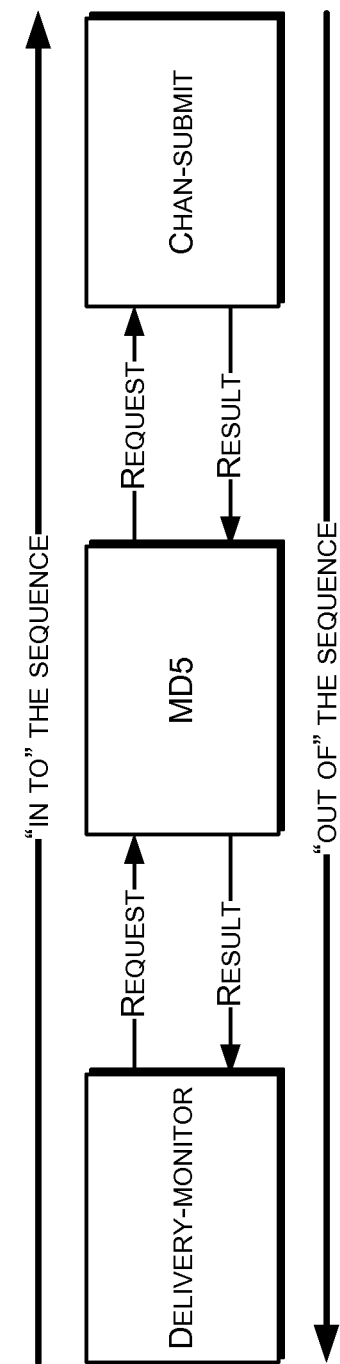

If the process requires, e.g., computation of an MD5 of the pumped data, the sequencer can be set up with an MD5 handler in the path (e.g., as shown in FIG. 14B). The MD5 handler can snoop the data as it passes.

An example of a self-modifying sequence is shown in FIG. 14C. The pump task is using direct delivery requests, so the data is not available in user space. The MD5 handler sees the request on the way "in" to the sequence and inserts a new handler ("direct-to-buffered") handler to the "left" of the MD5 handler so that it runs before the MD5 handler. The "direct-to-buffered" handler translates direct delivery to buffered read/write.

A sequence can be modified to change direction of the order of operations. For example, in a case where direct delivery requests can be too large for a single buffered read/write, the "direct-to-buffered" handler can change the sequence direction to perform multiple operations on one side of the sequence (e.g., as shown in FIG. 14D). Handlers to the left of the "direct-to-buffered" handler still see what they expect to see, while handlers to the right of the "direct-to-buffered" handler perform multiple operations.

Scripts and Customer-Specific Control

As noted, the request/response mechanism 1104 (FIG. 11) may perform customer-specific processing as part of the request/response processing. The request/response mechanism needs certain customer-specific data 1110 in order to perform the customer-specific processing.

The request/response mechanism 1104 may allow customer-specific handlers (or sequences) to be included at various locations (or hooks) during request/response processing. These customer-specific handlers may perform operations on the request and/or response paths. The customer-specific scripts that are to be used to process a customer's requests are referred to as Customer Configuration Scripts (CCSs), and are associated with the customers, e.g., via customer ids. Preferably the system has a default mode in which it will perform request/response processing without any customer-specific handlers. That is, preferably customer-specific handlers are optional.

It should be appreciated that scripts are not the same as sequences. A script is used to specify the sequences to be used to handle requests for a particular customer. The script may perform whatever operations it needs (including making its own HTTP requests, etc.) to determine what the sequences should be. For example, a script may also use a different sequence depending on the local environment. However, once the script has done that job, the resulting sequences are used (without rerunning the script) until something happens (e.g., the script is invalidated and reloaded) which indicates different sequences are now needed. Note, however, that a given handler may be implemented as a request/response script in the same language as the configuration script, but performing a different job.

Customers may provide handlers, parameters for existing handlers, or routines to be invoked by handlers at certain stages of the processing.

It should be appreciated that since, as noted, the client 1103 may itself be another component of the CDN (e.g., a cache or a control core, etc.), the CDN itself may have CCSs associated therewith. That is, from the point of view of request/response processing, the CDN may be considered to be a customer of itself.

With reference again to FIG. 11, the server 1102 will need the CCS for the customer associated with the request from the client 1103. The CCS is stored in the database 1106, in the customer-specific data 1110. If the server does not have that customer's CCS stored locally at the time it is processing the client's request, the server 1102 will attempt to obtain the CCS from another data source 1110, typically from a control core 1116. If a CCS is found, any customer-specific handlers (or sequences) specified in the CCS will be included in the appropriate locations (hooks) during request/response processing. In summary, the CCS generally is run once. It sets up the customer-specific sequences, which are then cached in their compiled form. If those sequences are present and valid, they are used without re-running the CCS (see the "Valid sequences?" decision in the flow chart in FIG. 20A).

Adding a New Cache to the CDN

When a new cache machine is to be added to the CDN, the control core needs to get information about that new cache (e.g., what group/region it is in, its IP address, its VIP, some capacity information, etc.). Similarly, in order to operate within the CDN, the new cache machine needs to get the current customer configuration data and other configuration data from the control core. A new cache can be pre-configured so that when it connects to the network (e.g., to the Internet) it sends a request to the control core for the resources that it needs. These requests can be made of the control core using standard HTTP requests. The new cache may, e.g., request a single configuration object from the control core, and that configuration object may, itself, include the URLs of other configuration objects needed by the cache. The control core may be configured to similarly request configuration data from the new cache, also in the form of one or more HTTP requests, although preferably the new cache provides needed information to the control core as part of one of its requests. It should be understood that appropriate security and encryption may be used to prevent unauthorized connection to the CDN. Once it has sufficient customer data (global data 1108), the new cache machine can then begin to function as a CDN cache machine. In some cases the new cache machine may go through a warming phase in which it may query its neighbors and preemptively pull the GCO and some CCS data (e.g., of popular customers at the neighbor) before accepting any incoming client connections. The cache may, in some cases, pre-fetch popular content. In some cases the new cache machine may also influence local load balancing, so that for a period of time it gets less traffic than other members of the cluster (e.g., until its cache miss rate is substantially the same as the rest of the cluster of which it is a member).

Figure 15A:
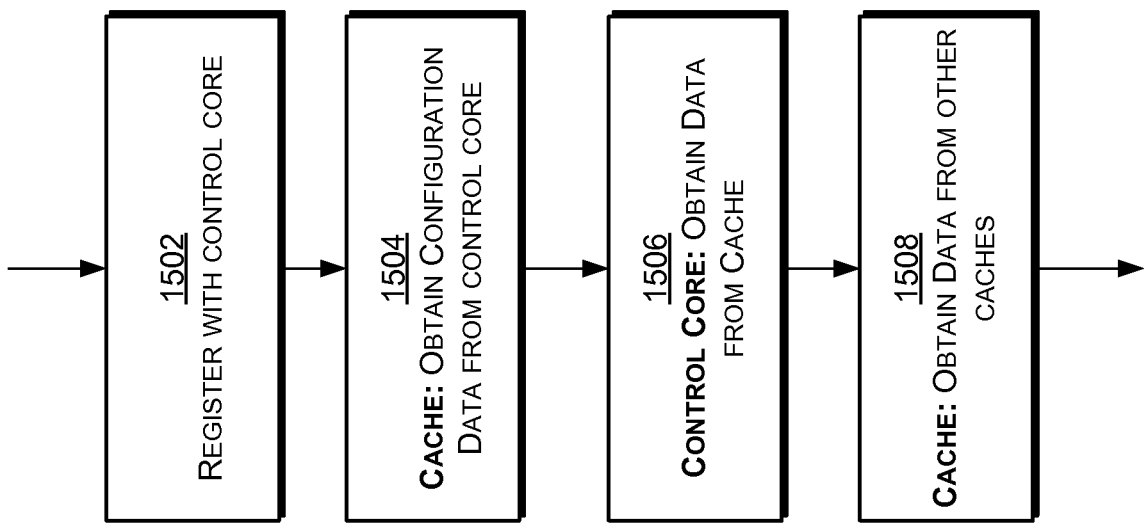
FIG. 15A is a flow chart showing a process of adding a cache server to a CDN.

The addition of a cache to a CDN is summarized with reference to the flow charts in FIG. 15A. With reference to FIG. 15A, a cache newly added to the CDN preferably first registers with the control core (at 1502). The cache is preferably configured with a hostname of the control core (e.g. control.fp.net), and upon being connected to a network (e.g., the Internet), the cache contacts the control core and performs some initial registration. This process allows the control core to determine whether the cache is authorized to participate in and be a part of the CDN. The registration process is preferably automated and performed by programs running on the cache and on the control core. Those of skill in the art will realize and understand, upon reading this description, that a new cache may be one that has never been connected to the CDN before or one that has been disconnected for some reason.

Once registered, the cache obtains configuration data from the control core (at 1504). The cache may request the configuration data using one or more HTTP requests. In some cases, e.g., as noted above, the new cache may request a single configuration object from the control core, and that configuration object may, itself, include the URLs of other configuration objects needed by the cache.

It should be appreciated that the registration (at 1502) may be combined with the process of obtaining the configuration data (at 1504).

Some of the configuration data obtained during this process may correspond to the global data 1108 in FIG. 11, and preferably include the GCO. Since the CDN components essentially serve content to each other (e.g., the control core serves CDN configuration content to the new cache (and vice versa)), from the point of view of the CDN components, as noted, the CDN may sometimes be considered a customer. As such, the CDN may itself have one or more CCSs associated therewith. Preferably the configuration data obtained from the control core by the cache (at 1504) includes one or more CCSs associated with the CDN. These CDN CCSs will allow the cache to perform the appropriate processing when serving CDN content to other CDN components.

The control core may obtain data from the new cache (at 1506). While the cache may provide some information to the control core during the initial registration process, the control core may also obtain additional information from the new cache after registration. This information may include information, e.g., relating to the capacity and type of the new cache.

The new cache will also preferably verify that it is up to date as far as system/application software. This may require a bootstrap process to pull new software packages, e.g., in the form of RPMs from caches/control core, verifying them, installing them and restarting (up to and including rebooting the server to pick up new operating system components for instance).

At this time the new cache is ready to begin serving content on behalf of the CDN. However, it may be desirable in some cases for the new cache to "warm up" by obtaining information from other caches (at 1508). In particular, the new cache may obtain customer data (e.g., CCSs) from nearby caches in anticipation of serving content on behalf of those customers. Preferably the new cache will query members of the cluster to obtain the popular CCSs and popular content.

It should be appreciated that since the cache is using a hostname to connect to the control core, the CDN rendezvous mechanism can rendezvous the cache to a control core machine that is "best" or "optimal" for that cache. In some cases, once the cache has discovered (or been told) which other caches are members of its cluster and its peers, it may issue requests destined for the control core to them instead. This will reduce direct load on the control core and accelerate retrieval of such data.

A CDN component's handling of a resource request is described with reference to the flowchart in FIG. 15B. It should be appreciated that the CDN component may be a cache (e.g., an edge cache, a parent cache, an origin cache, a control core, etc.), and the requested resource may be any resource, including resources requested by clients external to the CDN on behalf of customers or subscribers to the CDN and those resources that are requested by other CDN components and comprise CDN data (e.g., log files and the like).

Figure 15C:
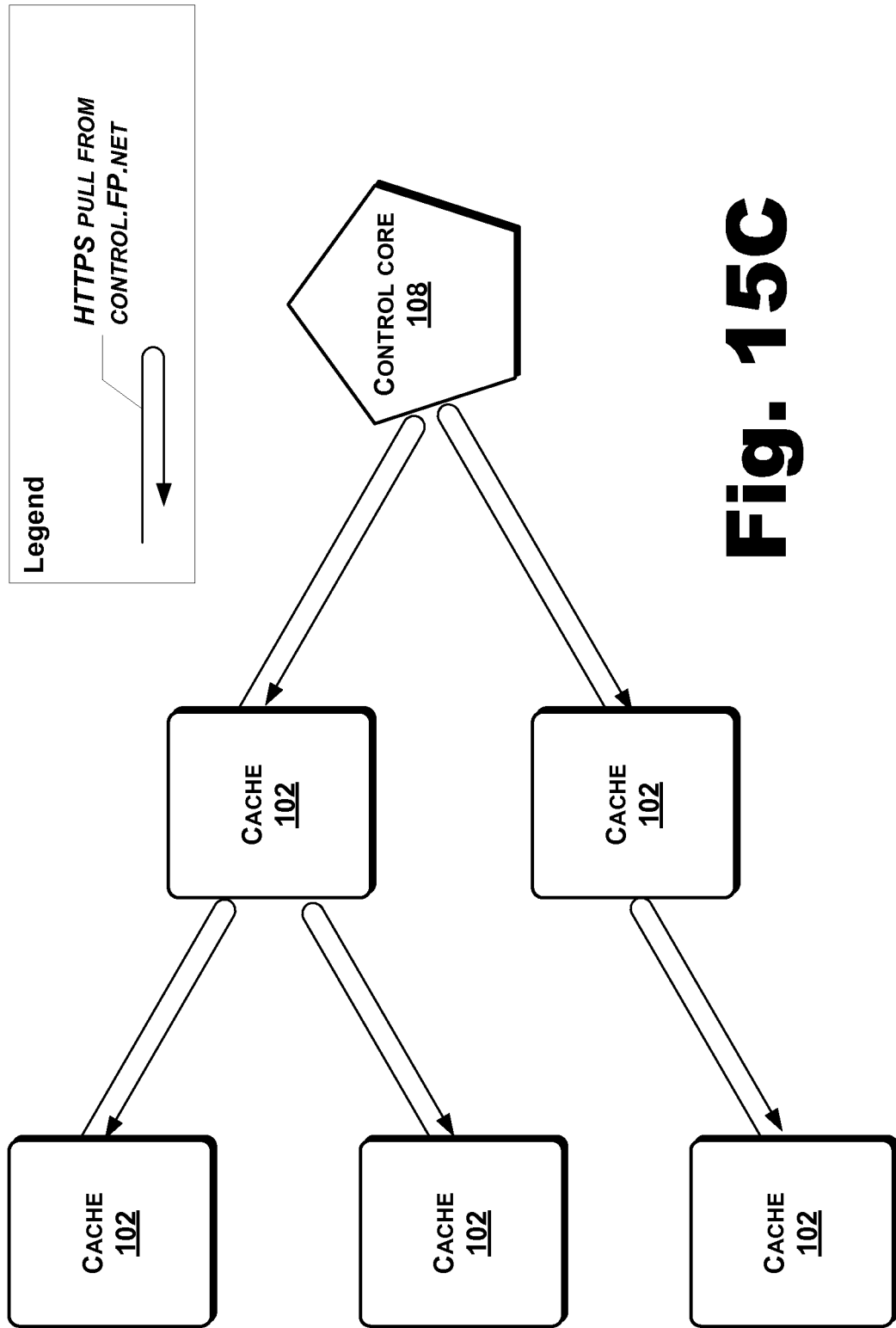
FIG. 15C shows operation of various caches in a CDN.

First, the cache obtains a resource request (at 1510). The request may be using an HTTP request, and include information in an HTTP header. The cache needs the GCO in order to determine whether the requested resource can be served. The GCO includes information that will allow the cache to determine whether the requested resource corresponds to a resource of a customer of the CDN (or to a CDN resource). The cache therefore obtains a current version of the GCO (at 1512) and determines (at 1514) whether or not the resource can be served. If the cache needs the GCO or other information from the control core, the cache can request that information using appropriate HTTP (or FTP) requests, and the cache may obtain the GCO and/or other needed information from other caches or other locations in the CDN. For example, FIG. 15C shows various caches (102) pulling data from the control core 108 using an HTTPS pull. In order to initiate such a pull, a cache would make an HTTPS request for the data (using a URL of that data) and identifying the control core 108 as the source of the data.

The cache server should serve a particular customer's resource to a client in accordance with the processing requirements (e.g., scripts, etc.) set by that particular customer, the cache therefore needs the CCS (if any) associated with that customer. Accordingly, at 1516, the cache server obtains the CCS (if any) associated with the requested resource (i.e., with the customer on behalf of whom the requested resource is being served). It should be appreciated that the CCS should be pulled prior to obtaining the resource (since the CCS may influence where/how to retrieve the resource).

If the cache determines (at 1514) that the requested resource can be served (i.e., that the cache is authorized to serve the resource), the cache may need to obtain a copy of the resource (at 1518). The CCS (and possibly information associated with the request, e.g., HTTP header information) provides the cache with sufficient information for it to locate a copy of the resource, if needed. The cache server may obtain the requested resource from another cache or from an origin server. In some embodiments the cache server may redirect the client to another location from which to obtain the content.

Having obtained the appropriate CCS (if one exists), the cache server then serves the resource (at 1520) using information in the CCS. As explained, the CCS runs before the cache even obtains the resource to serve, since the CCS may program handlers at hook points which affect the request itself, and therefore which affect which resource is going to be served.

Example

Figure 16:
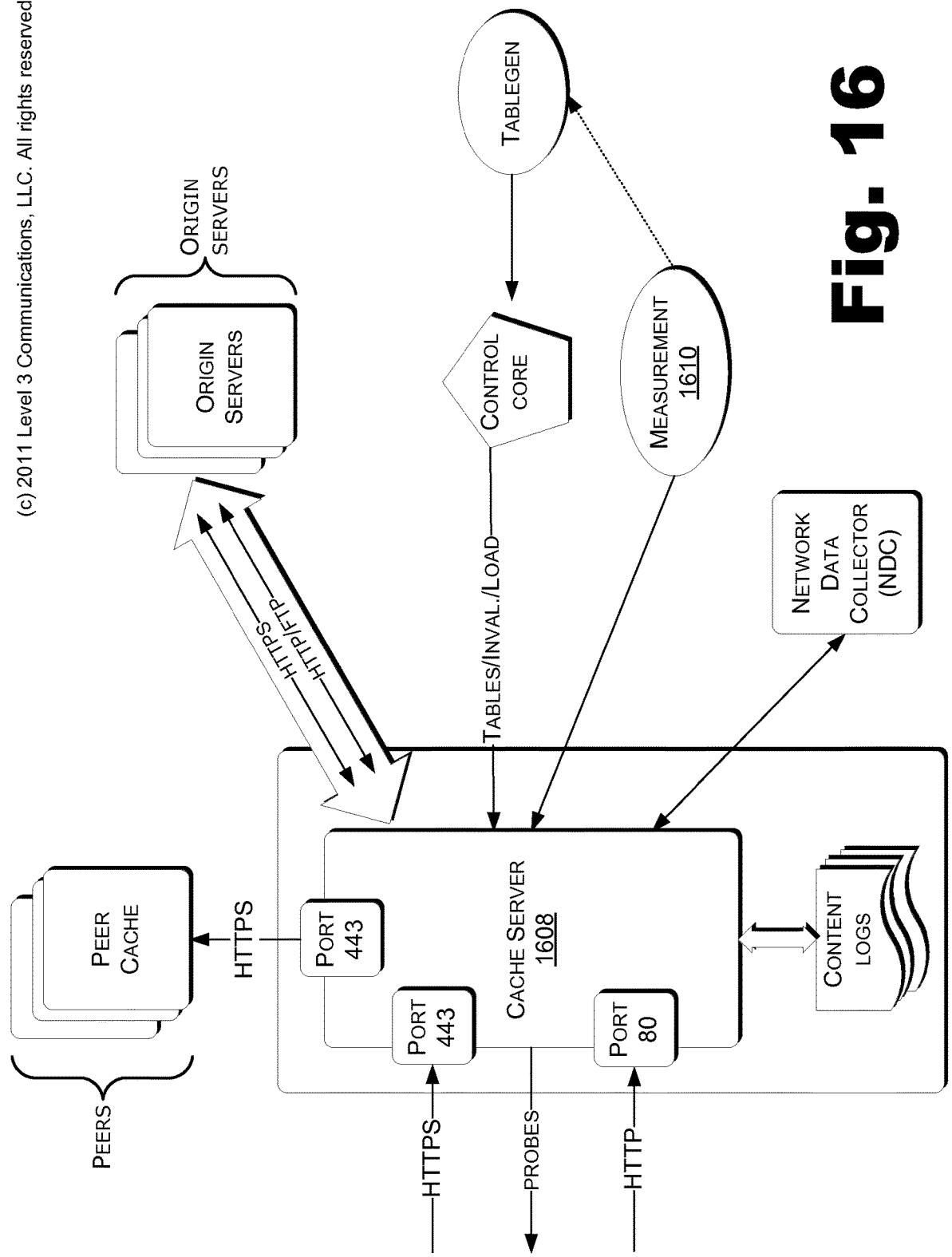
FIG. 16 shows an exemplary cache server operating within a CDN.

FIG. 16 shows an exemplary cache (or streaming) server 1608 operating within a CDN 100. In operation, the server 1608 may obtain resources from one or more origin servers, using, e.g., the HTTP, FTP, or HTTPS protocols. These origin servers in FIG. 16 correspond to the origin server(s) 1114 in FIG. 11. These resources may be resources to be served to clients (not shown). In addition, the server 1608 may obtain resources from other caches (corresponding to the cache(s) 1112 in FIG. 11), e.g., from peer caches (e.g., using the HTTP protocol). The server 1608 may generate log information, and the collector may obtain that log information and other information from the server 1608. The collector may obtain the log information using, e.g., HTTP, and request that log information using an appropriate URL that identifies the log information on the server 1608. Essentially the server 1608 serves the log information as a resource to the collector.

The server 1608 needs certain information in order to function properly within the CDN. In particular, the server 1608 may need information about other servers (e.g., its peers, parents, etc.); it needs information about content providers (e.g., subscribers or CDN customers) on behalf of whom it may serve content; it needs information about invalid (e.g., stale) content, load information, etc. As to the load information, it should be appreciated that a regular cache does not need load info from the control core—it would send it to a control core (NDC). A cache could, however, make use of load info from the other machines in the cluster. The server 1608 obtains the required information using one or more HTTP requests from the control core 108 or other locations in the CDN (e.g., peer caches). This information corresponds, at least in part, to the global data 1108 and/or the customer-specific data 1110 shown in FIG. 11 and described above.

Since the control core has at least one domain name associated therewith (e.g. control.fp.net), each object/resource that the server 1608 needs from the control core 108 can be named with a URL and can be requested from the control core 108 using that URL and an appropriate protocol (e.g., HTTP). As the control core 108 is preferably a distributed system consisting of more than one machine, the server 1608 will be directed (e.g., by the DNS system) to one of the machines that comprise the control core 108, preferably to a "best" or "optimal" control core machine for the cache server 1608. The server 1608 can then request the control information it needs from the control core 108 using an HTTP request. As is well known, and as shown in the drawing, HTTP, HTTPS, and FTP use the following well-known port numbers: 80 for HTTP; 443 for HTTPS; and 21 for FTP. Those of skill in the art will realize and understand, upon reading this description, that different and/or additional ports may be used. It should be appreciated that the selection of the "best" or "optimal" control core component to serve the cache server 1608 may be made with the same rendezvous and selection mechanism(s) used to direct client requests to servers in the CDN.

As shown in FIG. 1, a CDN 100 includes operation/measurement/administration mechanisms 109. These include mechanisms to obtain and measure load on the caches 102 and other system components and to measure and maintain information about the state of the network. Some of this information is used, e.g., to generate tables and other data that are used to determine a "best" or "optimal" location for resource requests. A measurement mechanism 1610 measures and collects load and other information from the cache 1608 and provides that information to a table generation mechanism. Measurement mechanism 1610 may use dynamic and static measurement tests, including ping, traceroute, and the like. An exemplary table generation mechanism is described in U.S. Pat. No. 6,185,598, the entire contents of which have been fully incorporated herein for all purposes.

As noted above, from the point of view of a client (any entity that wishes to access the control core cluster 108 or information in the control core cluster), the control core 108 is considered a single entity accessible, e.g., by its domain name (e.g., control.fp.net). While a particular client is likely to always get content from the same control core cluster component, there is no requirement for that to occur. For example, if there are five control core cluster components and one of the five control core cluster components fails or is otherwise unavailable, a client will access the control core transparently at one of the other control core components. Those of skill in the art will realize and understand, upon reading this description, that, as used herein, the term "client" refers to any entity trying to obtain a resource from the control core 108, and, as such, a client may be a cache 102 or some other component of the CDN 100. Additionally, as with content from content-providers' origin servers, resources that originate at the control core may be served to a cache by a peer or parent rather than requiring that each cache pulls directly from the control core 108. (The control core may be considered to be an "origin server" for the content for which it is authoritative, e.g., for CDN control and configuration data.)

Control Core

The control core 108 (FIG. 1) keeps the authoritative database of the current CDN configuration. Data are replicated across all machines in the cluster, and the cluster uses a method such as voting to ensure updates and queries are consistent. In the presently preferred implementation (with a cluster of five machines), the commits only occur if three of the five cluster machines agree to commit, and queries only return an answer if three of the five cluster machines agree on the answer. The use of voting is given as an exemplary implementation, and those of skill in the art will realize and understand, upon reading this description, that different techniques may be used in conjunction with or instead of voting on queries. For example, techniques such as using signed objects to detect corruption/tampering may be adequate. In some cases, e.g., the system may determine that it can trust the answer from a single server without the overhead of voting.

The control core 108 comprises multiple databases that are used and needed to control and operate various aspects of the CDN 100. These databases include databases relating to: (i) system configuration; and (ii) the CDN's customer/subscribers. The control core data are described in greater detail below.

Information in these databases is used/needed by the caches in order to serve resources on behalf of content providers. E.g., each cache needs to know when content is still valid and where to go to get requested content that it does not have, and the rendezvous mechanism needs data about the state of the CDN (e.g., cluster loads, network load, etc.) in order to know where to direct client requests for resources.

In some embodiments the control core 108 uses a distributed consensus algorithm—an approach for achieving consensus in a network of essentially unreliable processors.

As described in U.S. Pat. No. 7,921,169 to Jacobs et al.:

In a Paxos algorithm, one example of a distributed consensus algorithm, a server can be selected to act as a host or lead server by a network server, the network server leading a series of "consensus rounds." In each of these consensus rounds, a new host or lead server is proposed. Rounds continue until one of the proposed servers is accepted by a majority or quorum of the servers. Any server can propose a host or lead server by initiating a round, although a system can be configured such that a lead server always initiates a round for a host server selection. Rounds for different selections can be carried out at the same time. Therefore, a round selection can be identified by a round number or pair of values, such as a pair with one value referring to the round and one value referring to the server leading the round. The steps for one such round are as follows, although other steps and/or approaches may be appropriate for certain situations or applications. First, a round can be initiated by a leader sending a "collect" message to other servers in the cluster. A collect message collects information from servers in the cluster regarding previously conducted rounds in which those servers participated. If there have been previous consensus rounds for this particular selection process, the collect message also informs the servers not to commit selections from previous rounds. Once the leader has gathered responses from at least half of the cluster servers, for example, the leader can decide the value to propose for the next round and send this proposal to the cluster servers as a "begin" message. In order for the leader to choose a value to propose in this approach, it is necessary to receive the initial value information from the servers. Once a server receives a begin message from the leader, it can respond by sending an "accept" message, stating that the server accepts the proposed host/lead server. If the leader receives accept messages from a majority or quorum of servers, the leader sets its output value to the value proposed in the round. If the leader does not receive majority or quorum acceptance ("consensus") within a specified period of time, the leader can begin a new round. If the leader receives consensus, the leader can notify the cluster or network servers that the servers should commit to the chosen server. This notification can be broadcast to the network servers by any appropriate broadcasting technology, such as through point-to-point connections or multicasting. The agreement condition of the consensus approach can be guaranteed by proposing selections that utilize information about previous rounds. This information can be required to come from at least a majority of the network servers, so that for any two rounds there is at least one server that participated in both rounds. The leader can choose a value for the new round by asking each server for the number of the latest round in which the server accepted a value, possibly also asking for the accepted value. Once the leader gets this information from a majority or quorum of the servers, it can choose a value for the new round that is equal to the value of the latest round among the responses. The leader can also choose an initial value if none of the servers were involved in a previous round. If the leader receives a response that the last accepted round is x, for example, and the current round is y, the server can imply that no round between x and y would be accepted, in order to maintain consistency.

In presently preferred implementations, the core control cluster uses the Paxos algorithm of Lamport and Gray as its distributed consensus algorithm. Implementations of this distributed consensus algorithm are described, e.g., in one or more of: U.S. Pat. No. 7,856,502, titled "Cheap Paxos," U.S. Pat. No. 7,797,457, titled "Leaderless Byzantine Consensus," U.S. Pat. No. 7,711,825, titled "Simplified Paxos," U.S. Pat. No. 7,698,465, titled "Generalized Paxos," U.S. Pat. No. 7,620,680, titled "Fast Byzantine Paxos," U.S. Pat. No. 7,565,433, titled "Byzantine Paxos," U.S. Pat. No. 7,558,883, titled "Fast Transaction Commit," U.S. Pat. No. 7,555,516, titled "Fast Paxos Recovery," U.S. Pat. No. 7,249,280, titled "Cheap Paxos," U.S. Pat. No. 6,463,532, titled "System And Method For Effectuating Distributed Consensus Among Members Of A Processor Set In A Multiprocessor Computing System Through The Use Of Shared Storage Resources," the entire contents of each of which are hereby incorporated herein for the purpose of describing the Paxos algorithm.

Various commercial implementations of the Paxos algorithm exist and are available. For example, Google uses the Paxos algorithm in their Chubby distributed lock service (see, e.g., The Chubby lock service for loosely-coupled distributed systems, Burrows, M., OSDI'06: Seventh Symposium on Operating System Design and Implementation, Seattle, WA, November, 2006) in order to keep replicas consistent in case of failure. Chubby is used by Google's Bigtable (Bigtable: A Distributed Storage System for Structured Data, Chang, F. et al, in OSDI'06: Seventh Symposium on Operating System Design and Implementation, Seattle, WA, November, 2006) and other products. Microsoft Corporation uses Paxos in the Autopilot cluster management service from its Bing product. Keyspace, an open-source, consistently replicated key-value store uses Paxos as its basic replication primitive.

Those skilled in the art will realize and understand, upon reading this description, that other approaches and algorithms may be used instead of or in conjunction with the Paxos algorithm.

Logging

Caches may write their logs to files on their machines. Logs may also be streamed from the caches in addition to or instead of being kept as journal-style resources. The inventors realized that logs can be treated as ordinary cache resources, retrievable via HTTP or HTTPS using a standard URL. Thus caches may save logs using the same mechanisms they would use to save any cached resource, with the difference being that the source of the data is internal rather than external.

The logging system uses the hierarchical network data collector to gather, sort and efficiently merge logs.

Logs are internally generated resources that are cached and pinned until released. Logs are preferably stored in a format that is space-efficient and easy to parse and interpret. They are also preferably stored in a way or on a device that is suitably fault tolerant. Log access is by normal HTTP requests to the caches, so that the CDN can be used to collect logs from the caches.

Different views and subsets of the same log data are possible, based on the request. For efficiency, generated responses can be cached for a short time.

Logs are collected as necessary by the network data collector (NDC). In case of crashes, logs are accessible using a general offline cache content access mechanism. It should be appreciated that this may lead to a QoS issue, in that some data are more valuable than others and may require different retention mechanisms. For instance, data that are sourced locally may not be re-constructible in case of loss (as opposed to a publisher's resource, which may be able to be reloaded). So log data may be considered more valuable than a publisher's resource. Billing data (a specialized version of a log file) is likely most valuable. In some cases, log data may be sacrificed for space reasons, but billing data should persist until pulled.

Network Data Collector (NDC)

The network data collector (NDC) is essentially a reverse CDN. It preferably uses the normal HTTP or HTTPS channels, with one key extension: a single request may result in multiple fills that get merged. Flexible fan-in and merge options are supported. The fan-in and merge operations are defined by a script. The script is itself a resource. The script is an example of the Executable Resource mechanism described below. The root of each collection operation in the NDC is a single "origin client," analogous to an origin server in the CDN.

Component Roles

Certain components of the CDN system may act as clients of the CDN and/or as content providers to the CDN. For example, as noted above, the core control cluster maintains information used/needed by the caches in order for them to deliver content to clients. When caches obtain control-related content (resources) from the control core cluster, the control core cluster is acting as a content provider and the caches are acting as clients. Similarly, when a collector mechanism obtains log and other information from a cache cluster, the collector mechanism is acting as a client and the cache cluster is acting as a content provider. And when the control core cluster obtains information from a collector mechanism, the control core cluster is acting as a client and the collector mechanism is acting as a content provider. When content is being delivered by the CDN to clients on behalf of a content provider, the caches obtain that content from origin server sites associated with the content provider. In some cases, as noted above, a cache server site may try to obtain requested content from another cache server site (e.g., from a peer cache server site or from a parent cache server site). In those cases the peer (or parent) cache server sites are acting as content providers.

Hierarchy

The CDN preferably uses tree-like hierarchical communication structures to pull data from the control core and origin servers to the edge, and to pull data from the edge to specialized gatherers and monitors. These tree-like structures are preferably dynamic, i.e., they can change with time, requirements and circumstances. These structures are preferably also customized, i.e., different communication operations can use different hierarchies, and different instances of a communication operation may use a different hierarchy (e.g., different parents for different origin servers).

For pulling data to the edge, each node needs to know its parent or parents. For pulling data to the root, each node needs to know its children. Lists of parents or children can themselves be resources. Using domain names instead of IP addresses for parents and children allows the rendezvous system to be leveraged.

Executable Resources, Customization Hooks and Scripts

Caches 102 in the CDN 100 are able to process and deliver (serve) executable resources, and CDN users (e.g., content providers, the CDN itself) are able to provide extensions to resources via these executable resources. Executable resources provide a general and useful extension that may replace and/or enhance several ad hoc mechanisms and HTTP extensions in a CDN. Executable resources allow suitably authenticated HTTP servers to respond to an HTTP request with a new type of reply (possibly identified by an extension status code such as "600 Exec" or a new Content-Type, e.g., say "application/x-fp-exec"). The contents of such a reply are a script to be executed by an interpreter in the response path of the cache, in order to generate the actual reply. Examples of things the interpreter may do are:

Fill the request from an alternate location.
Fill the request from multiple locations and merge the results.
Perform authentication.
Pre-fill one or more other resources.
Perform manipulations on the body of a resource (e.g., compression, transcoding, segmentation, etc.)

If the reply is cacheable, it may be retained by the cache, and executed each time the resource is requested.

The NDC may use this feature to gather logs.

The system provides a way to distinguish between requesting the script itself, and requesting the result of executing the script. Scripts are subject to pinning, expiration, invalidation and revalidation just like any other resources.

Customer-specific code can be added at numerous hook points in the processing. Such customer-specific code may be used, e.g., for:

request manipulation after parsing;
calculation of cache key for index lookup;
coarse and fine details of authentication;
content negotiation choices, variants, and encodings;
policies for range handling;
deciding which peers to contact or migrate to;
which host(s) to contact for fills;
contents of fill request;
manipulation of fill response;
handling of origin server errors;
caching policy;
manipulation of response to client;
logging effects.

A wide variety of hook points enable CDN users (customers) to modify existing algorithms; pre- or post-process algorithms; and/or completely replace algorithms. In a presently preferred embodiment, these are the customer-specific sequences which are set at various hook points by the CCS.

In a present implementation, scripts can be used for:
Configuration
Customer-specific event handling and HTTP rewriting
Network Data Collection operations
Rapid prototyping of new features Scripts are preferably cached objects (like other objects in the CDN). They are preferably compiled into byte code and executed in a sandbox by a virtual machine. Scripts are preferably measured for CPU usage and are effectively preemptible.

In a presently preferred implementation scripts are implemented using the Lua scripting language. Lua compiles into bytecodes for a small register virtual machine. Lua's primary data type is a table (which is implemented as a hybrid between a hash table and an array), but it also has other types (string, number, Boolean, etc.). Lua's interface to the rest of the system is via various function bindings which are a means for a Lua function call to cause a system function (instead of another Lua function) to be called. The details of a particular binding, including the data it operates on and the results it returns to the Lua script, are specific to the binding in question and may involve tables (e.g., hash table objects) or other types of objects.

Those of skill in the art will realize and understand, upon reading this description, that a different scripting language could be used. However, it should be appreciated that any scripting language should run (e.g., be interpreted) quickly with a small interpreter, have a relatively small implementation, (be lightweight—have a small memory footprint and be easily sandboxed for secure execution) and provide sufficient control to allow customer-derived scripts to be used. It should be noted that "script" does not necessarily imply interpreted at run time, but rather it is used in a broader sense to mean loadable code.

It should be appreciated that basic cache functionality requires no scripts, and the CDN will operate without them to serve content. Hooks allow script execution at various points in the cache's processing path and may be used (if permitted) to enhance and modify content delivery.

Hooks may be either:
Customer-visible. Monitored, accounted, billable.
Ops-visible. Monitored.
Development-visible. Minimally restricted.
At hook points, one can specify either:
A canned (predefined) algorithm name; or
An expression (e.g., an in-line script or an expression in the script language); or
A handler or series of handlers; or
The name of a script In some implementations, scripts used in request processing may:
Inspect the request
Modify the request
Generate a response (including replacing an already generated response)
Provide a short static body
Provide a function to incrementally generate longer response body
Provide a function to filter a response body
Inspect an already generated response
Modify an already generated response
Launch any number of helper requests
Synchronously—wait for and inspect response
Asynchronously—"fire and forget"
Cacheable or non-cacheable Configuration variables similarly support script execution, e.g., a variable can have an immediate value, be a parameter reference, or determined by an inline expression. For example, the variable fill_host is shown here with different types of values:
fill_host="origin.customer.com"—immediate value
fill_host=$host1—parameter reference
fill_host="origin".domain($request_host)—inline expression
fill_host=http://origin.customer.com/scripts/pick_origin.lua—reference to a script It should be appreciated that these values are given only by way of example of the type of values. These expressions will preferably be in the script language (e.g., Lua).

Cache Organization

Figure 17:
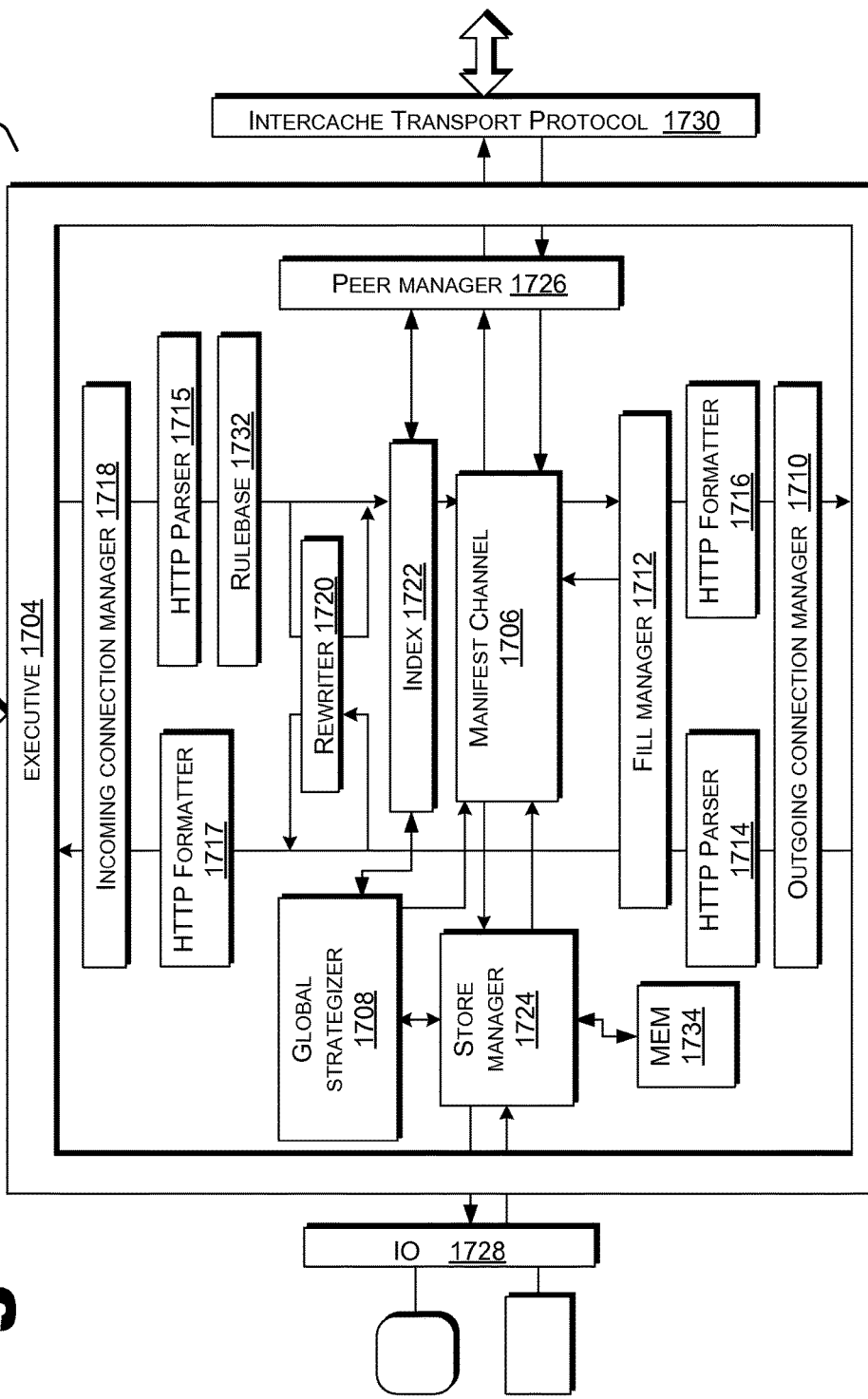
FIG. 17 is a block diagram showing the major functional modules for request-response processing in an exemplary cache server.

FIG. 17 is a block diagram showing the major functional modules (collectively 1700) in an exemplary cache. These modules include Executive 1704, manifest channel 1706, global strategizer 1708, outgoing connection manager 1710, fill manager 1712, HTTP parsers 1714, 1715, HTTP formatters 1716, 1717, incoming connection manager 1718, rewriter 1720, index 1722, store manager 1724, peer manager 1726, IO 1728, intercache transport protocol 1730, and rulebase 1732. These modules and their operational connectivity are shown by way of example, and it should be appreciated that a cache may include different and/or additional modules, and that the modules in a cache may have different operational connectivity.

The Executive 1704 is the basic executive controlling all activities within the cache. The Executive's responsibility is to maintain a prioritized list of runnable tasks, and execute them in a priority order. A high-priority "system" task repeatedly checks for ready file descriptors, and moves their waiting "user" tasks onto the run list. The Executive may also support abstracting a task or group of tasks as an asynchronous service called a channel, and may provide a clean way for tasks and channels to communicate. Cache subsystems discussed below are implemented as tasks and channels.

When a new client connection is detected on one of the listener file descriptors, the Incoming Connection Manager 1718 assigns a client task to handle it, and coordinates the process of accepting the connection, completing any TLS (Transport Layer Security) handshake, and assigning a priority and connection-level policy. The Incoming Connection Manager 1718 continues to monitor and manage the connection throughout its lifetime.

Although the Incoming Connection Manager 1718 is described here as a single component, it should be appreciated that this is merely one logical depiction of functionality in the cache. E.g., in a present implementation there is a listener task which, after receiving a new connection, runs a sequence of handlers which are configured for that particular listener. Those handlers may apply policies, perform a TLS upgrade if appropriate, etc.

The client task invokes the HTTP Parser 1715 to read data from the connection, locate the message boundaries, and parse the HTTP into a request object with a convenient internal format. Messages remain in this internal format as long as they are within the cache system (the CDN), even if they are migrated to another cache. It should be appreciated that cache-to-cache messages may be in other formats, e.g., in some cases, messages may be sent from cache-to-cache in their standard text format.

The request object may next be processed by the rulebase 1732, to assign customer-specific handling policies and normalize the URL associated with the request. The policy might indicate, e.g., that the request requires manipulation by a customer-defined script. In that case, the request rewriter 1720 executes the script. In a present implementation a table (the GCO) is used which, in conjunction with the apparent target of the request, to decide whether or not it is worth it to continue further processing at all (i.e., whether the request is associated with a valid customer). At this point, the system checks whether there is a programmed sequence of handlers appropriate for that customer. If not, the system retrieves and runs the Customer Configuration Script, whose function it is to program the sequence of handlers. Then the handlers are run to process the request.

The next step is to determine if the cache has any information about the requested object. The request is presented to a manifest channel which then inspects the request and uses the information it has internally (a manifest) to determine how best to handle the request, including by providing a reference to a cached object, requesting a fill or a refresh, etc. The manifest channel maintains the manifest data and also provides the intelligence to use the manifest data. The URL is looked up in the cache index 1722, which is essentially a database listing the objects already in the cache. The result of the index lookup is either null, or a manifest listing all the data, metadata and ongoing activities that might be relevant in responding to the request.

At this point, the request processing engine has a set of request-specific information, comprising the parsed request, a set of policies for handling the request, and a manifest of pertinent cache information. As noted, a manifest channel 1706 is responsible for determining how to respond to the request. In general, the decision will depend on the request-specific information, the object-specific information, the current state of the machine, the global state of the CDN, and the set of capabilities implemented in the cache. There may be one strategizer instance running for each actively referenced manifest in the cache, and that strategizer handles all clients and activities referencing that manifest. In a current implementation the strategizer is the manifest channel.

The manifest channel 1706 has at its disposal a variety of modules, implementing services, the services including the storage service, fill service and peering service. Other modules may be available for error message generation, authentication, logging, throttling, etc. The role of the strategizer is to orchestrate these services to construct a reply to the request, and preferably to fully process the request (since logging is part of the processing but not necessarily part of the reply).

The manifest channel 1706 contains much of the intelligence in the cache. New capabilities may be added and special handling provided in the manifest channel 1706 for new classes of resources. For this reason, the architecture is designed to provide clean separation of mechanism and policy. Machinery/mechanisms implementing individual services are encapsulated into separate modules, and the manifest channel 1706 essentially acts as a conductor, supervising the construction of a response.

The most common scenario is expected to be a simple cache hit, where the cache has an easily accessible copy of the requested object. In this case, the manifest channel 1706 invokes the storage service (store manager 1724) to retrieve the object, which may be in memory, or on solid-state or hard disk (generally denoted 1734). In the process, the manifest channel 1706 may also provide guidance to the storage service (store manager 1724) on what type of future access is expected, so that the object can be optimally placed in the appropriate type of store.

Another common scenario involves a dynamically-generated response, such as a response to a control command, a statistics report, or an error message.

When a request is received, an initial sequence of handlers is assembled to handle the request (based on the target of the request and the listener it came in on). The handlers either generate a response because the request is directed at them, add some value by performing a request or response manipulation, or take themselves out of that instance of the sequence because they are not relevant to the request at hand. A handler may be a script handler, and that script can perform any number of functions (as outlined previously) to generate a response or to manipulate a request or response. The "manifest channel" is one component used by a series of handlers, but it is concerned with dealing with cachable resources. It is generally not involved in determining whether, e.g., pre-authentication needs to be performed (which could be handled by a handler in the cli-req hook or similar).

As noted earlier, an important aspect of the architecture is that essentially all data items, including machine configuration, customer policies, logs, billing data and statistics, are simply web objects, which appear in the index and are retrieved through the strategizer just like customer web resources. As critical resources, they do have policies engaging specific authentication, persistence and prefilling services, but the machinery of these services is also available to ordinary resources when necessary.

A feature of Unix file I/O is that read and write operations on standard files are synchronous, and will block the calling thread if the data needs to be physically retrieved from or written to disk. Since the cache likely has plenty of other work to do while disks are being accessed, the IO library 1728 provides a way for the cache to hand off disk I/O to a separate thread that can block without holding up the cache activities. In addition, the IO library 1728 provides a richer, more efficient API to the physical disks than the normal open/read/write/close interface.

If the request is not a cache hit, the manifest channel 1706 will typically invoke the peering service (peer manager 1726) to see if a nearby cache has the requested object. Since other services may also need to communicate with neighboring caches, and it is inefficient to open or operate multiple TCP connections to multiple neighbors, an intercache transport protocol module 1730 multiplexes various types of intercache communication over a single general-purpose link. For instance, the peering service might offer to migrate the client connection to a neighbor that has the resource; the strategizer could choose to use this option, in which case it would invoke the migration service, which would use the intercache transport protocol to transfer the client connection state. As before, it should be appreciated that one or more handlers perform this function.

If the request is not a hit, or internally serviced or migrated, the resource needs to be fetched via the network, and the fill service (fill manager 1712) is invoked. The fill manager's role is to balance and prioritize the outgoing network activity between all strategizers, and operate protocol handlers for the supported set of protocols. In particular, for HTTP fills, the strategizer will create an HTTP fill request in internal format, and the fill service will format that request using the HTTP formatter 1716, send it to the appropriate target host, and manage the data transfer. For efficiency, connections are created and managed by an outgoing connection manager 1710, which maintains a pool of connections to frequently accessed hosts, tracks responsiveness, implements traffic shaping, etc. In a current implementation, the manifest channel creates the fill request.

Some fill operations will be peer fills from other caches, and these likely constitute the main class of intercache communication not using the Intercache Transport Protocol. Such fills may use the internal message format and bypass unnecessary HTTP formatting and parsing steps.

Fill responses arriving from the network are handed back to the manifest channel 1706, which decides whether to cache the object, and how to process it before replying to waiting clients.

It should be appreciated that the manifest channel 1706 would not invoke a "reply rewriter." Rather, such a rewriter (if any) would exist at one of the hook points on the response path, e.g., client-resp, and would be used regardless of whether a manifest channel was involved in generating the response. Such a rewriter may inspect the response to determine if it came from cache, however it is not up to the manifest channel to invoke this rewriter. The manifest channel would not generally be involved in a request which was a priori known to be non-cacheable. On the other hand, a "reply rewriter" may well be involved in such a request.

As on the input path, the manifest channel 1706 invokes appropriate services to do the actual work, and supports optional processing by a reply rewriter 1720 just prior to final formatting and output to the client. Those of skill in the art will realize and understand, upon reading this description, that this type of processing (final formatting, etc.) is performed by one or more handlers on the way "out" of the processing sequence.

The manifest channel 1706 is responsible for handling a single URL, and optimizing the experience of the clients currently requesting the resource associated with that URL. The global strategizer 1708 is responsible for optimizing the overall cache behavior, and the behavior of the CDN as a whole. The global strategizer 1708 comprises a set of permanently running background tasks and services that monitor and manage the cache, performing operations such as discarding old objects, prefetching latency-sensitive objects, and enforcing quotas. Like the manifest channel, global strategizer is preferably architected to cleanly separate policy and mechanisms, thereby allowing for future enhancement and adjustment.

The global strategizer 1708 influences the manifest channel 1706 by adjusting a variety of modes and levels which the manifest channels consult when making their decisions. In turn, the global strategizer monitors the effects of the mode and level changes, and adjusts them as necessary to achieve the desired global conditions. Thus, the global strategizer is the module in charge of the various feedback loops in the cache. For instance, by adjusting the maximum allowed object age, it can control the amount of data in the cache, and by adjusting the maximum size of objects allowed in the memory store, it can influence the amount of memory in use. In some implementations there may be no global strategizer and the storage system will manage its own resources, etc.

Implementations and embodiments of various components are described in greater detail below. Those skilled in the art will realize and understand, upon reading this description, that the details provided below are exemplary and are not intended to limit the scope of the invention.

The Manifest Channel 1706

The manifest channel 1706 handles issues related to a single resource. Its job is to deliver an optimal response to each client based on various factors such as, e.g., request details, policy settings, cache contents, state of devices, peer caches, origin server, network, etc. The manifest channel 1706 consists of an extensible collection of efficient mechanisms, e.g., for retrieval from disk; connection migration; filling from origin; checking peers; etc. A control module orchestrates the mechanisms, using canned algorithms for common situations and providing hooks for introducing variations to these canned algorithms. The Manifest channel 1706 may be completely scriptable, if necessary. The manifest channel 1706 may provide clean separation of mechanism and policy and may be more general than a pipeline. In a present implementation, the manifest channel 1706 is sequence (a pipeline of sorts), although each of the steps of the sequence may be arbitrarily intelligent (including being a script).

At any moment, there is one instance of the manifest channel 1706 running for each manifest being actively accessed. The role of the manifest channel is to coordinate all activities associated with the manifest, ensure that each client requesting the object is sent an individualized response meeting the policy constraints, and that this is done as efficiently as possible and without violating other constraints imposed by the global strategizer.

The manifest channel 1706 preferably includes a set of mechanisms with associated logic to perform some or all of the following (this is essentially a potential list of "handlers."):

| Mechanism | Functionality |
| --- | --- |
| Authentication | Performs authentication handshakes with the client and queries internal databases or external servers as necessary for permission to serve the resource to the client. These are typically synchronous operations. Internal databases are cached web objects, and may also need to be refreshed periodically. |
| Referer Checking | Handles cases where the reply depends on the HTTP referer header. General functions in the rulebase and rewriter will classify the referrer, and this module implements the consequences of that classification (this is essentially an example of authentication) |
| Browser Identification | Handles cases where the reply depends on the HTTP User-Agent header and potentially on other headers. |
| Hot Store | Allow objects to be identified as high-popularity and worth keeping in fast storage such as application memory, the OS page cache or solid-state disks, and for communicating that fact to the storage manager. |
| Cold Store | Allow objects to be identified as low-popularity and suitable for archiving to more extensive but higher latency un-indexed mass storage. |
| Peering | Checking for information about which peers are likely to have an object, and for directly querying peers via the peering service. |
| Migration | Deciding when to migrate a connection to a neighboring cache, and for marshalling the state to be transferred. |
| Connection Splicing | Handling non-cacheable traffic such as POST requests, by delegating further interaction with the client to the operating system, so that it can efficiently relay raw data between the client and the remote server. Also monitor the progress of such relays for logging and diagnostic purposes. |
| Longtail | Dealing with resources making up working sets that exceed the size of the cache. The module includes counters for determining the popularity of such resources, and support for special types of filling and redirection that allow the CDN to handle them efficiently. |
| Fill Target Selection | Support for filling resources in a flexible way, e.g., from load balanced clusters, from various locations, or with a variety of protocols. |
| Range | Dealing with range requests, for deciding whether it is worth fetching the entire object, and for formatting HTTP Partial Content (206) replies. |

| Mechanism | Functionality |
|---|---|
| Partial Object Handling | Assembling separately-fetched parts of the same object into a complete object, either logically or physically. |
| Error Message Construction | Formatting of informative and appropriate HTTP error messages for the client when the request fails in some way. |
| Redirection | Efficiently redirecting clients to other locations. |
| Command Handling | Acting upon requests to the command, monitoring and logging subsystems, and for constructing a variety of internally generated responses. |
| Vary | Content negotiation is defined in Network Working Group, Request for Comments 2616, Hypertext Transfer Protocol - HTTP/1.1 (hereinafter "RFC2616"), the entire contents of which are fully incorporated herein by reference for all purposes.<br>The Vary field value indicates the set of request-header fields that fully determines, while the response is fresh, whether a cache is permitted to use the response to reply to a subsequent request without revalidation. For uncacheable or stale responses, the Vary field value advises the user agent about the criteria that were used to select the representation. A Vary field value of "*" implies that a cache cannot determine from the request headers of a subsequent request whether this response is the appropriate representation. RFC2616 section 13.6 describes the use of the Vary header field by caches. According to RFC2616, an HTTP/1.1 server should include a Vary header field with any cacheable response that is subject to server-driven negotiation. Doing so allows a cache to properly interpret future requests on that resource and informs the user agent about the presence of negotiation on that resource. According to RFC2616, a server may include a Vary header field with a non-cacheable response that is subject to server-driven negotiation, since this might provide the user agent with useful information about the dimensions over which the response varies at the time of the response. According to RFC2616, a Vary field value consisting of a list of field-names signals that the representation selected for the response is based on a selection algorithm which considers only the listed request-header field values in selecting the most appropriate representation. According to RFC2616, a cache may assume that the same selection will be made for future requests with the same values for the listed field names, for the duration of time for which the response is fresh. The field-names given are not limited to the set of standard request-header fields defined by the RFC2616 specification. Field names are case-insensitive and, according to RFC2616, a Vary field value of "*" signals that unspecified parameters not limited to the request-headers (e.g., the network address of the client), play a role in the selection of the response representation. According to RFC2616, the "*" value must not be generated by a proxy server; it may only be generated by an origin server.<br>In some cases it may be desirable to have a communication channel between the CDN and the origin server, in order to ingest policy information about variant selection performed at the origin so that the same can be directly replicated within the CDN rather than being inferred from a series of responses from the origin. |
| Content Encoding | Content negotiation as defined in RFC2616. |
| Transforms | Converting from one content encoding to another within the cache, as a service to customers. |
| Logging | Controlling the amount and type of logging information generated by the request processing, and for saving that information in internally generated objects for later retrieval by special HTTP requests and/or remote logging. |
| Tracing | Enabling diagnostic tracing of the processing, either globally or for a specifiable subset of requests or resources. |
| Billing | Collecting a variety of billing-related information while the request is being processed. |
| Throttling | Allow certain types of actions to be delayed based on advice from the global strategizer. |
| Keepalive | Checking various factors that influence the decision to allow connections to persist, and methods for conveying or delegating the final decision to the connection manager. |

-continued

| Mechanism | Functionality |
|---|---|
| Transfer Encoding | Deciding what transfer encoding to apply, and for applying it. |
| Shaping | Deciding on what bandwidth to allocate to a network activity, and for conveying this information to the connection managers. |
| Prefetch | Allows a request for one resource to trigger prefetching of other resources, from disk, peers or the origin. |
| Refresh | Implementation of the HTTP "GET If-Modified-Since" etc., and "304 Not Modified" mechanism, as well as the background refresh feature. |
| Retry and Failover | Allow failed fills to be retried from the same or a different fill target. |
| Cachability | Decides if, where and for how long an object should be cached by the Storage Service. |
| Script execution | Execute requests and replies that are CDN internal scripts. |
| Replacement | Decide which objects in the manifest are no longer sufficiently useful and can be destroyed. |

Global Strategizer 1708

The global strategizer 1708 is the subsystem responsible for overseeing the operation of the cache as a whole, and the cache's relationship to other parts of the CDN. The global strategizer is preferably running at all times, and keeps track of extrinsic parameters such as the amount of storage used, the number of clients, etc. In turn, it controls operation of the cache by adjusting intrinsic parameters like the LRU (Least Recently Used) Aggression and the listener poll and accept rates.

Invalidation. The global strategizer is responsible for fetching, preferably roughly once per second, updates to the primary invalidation journal from the CDN control core, fetching updates to any secondary journals that the primary indicates have changed, and invalidating the resources that the secondary journals indicate have been invalidated. It should be appreciated that the control core for customer invalidations may not be the same control core as used for configuration data (and invalidations associated with it). Different groups of customers may be put onto different such control cores for invalidation.

Automatic Refresh. This mechanism allows selected resources to be refreshed even when they are not being requested externally, so that they are always up to date. The invalidation journal mechanism is essentially a special case of this.

Load Metrics. The global strategizer is in charge of measuring the total load on the machine, and responding to requests for load status.

Platform Configuration and Control. Mechanism to act upon configuration information from the control core.

Listener and IO Event Rate Control. Controls the rate at which new connections are accepted, and the rate at which file descriptors are polled for readiness.

As with the other components/mechanisms described herein, the functions described here are not necessarily performed by a single entity or mechanism but by multiple tasks or sequences. However, those of skill in the art will realize and understand, upon reading this description, that the set of tasks which perform these functions could be considered as making up the "global strategizer."

Control Core Data

Figure 18:
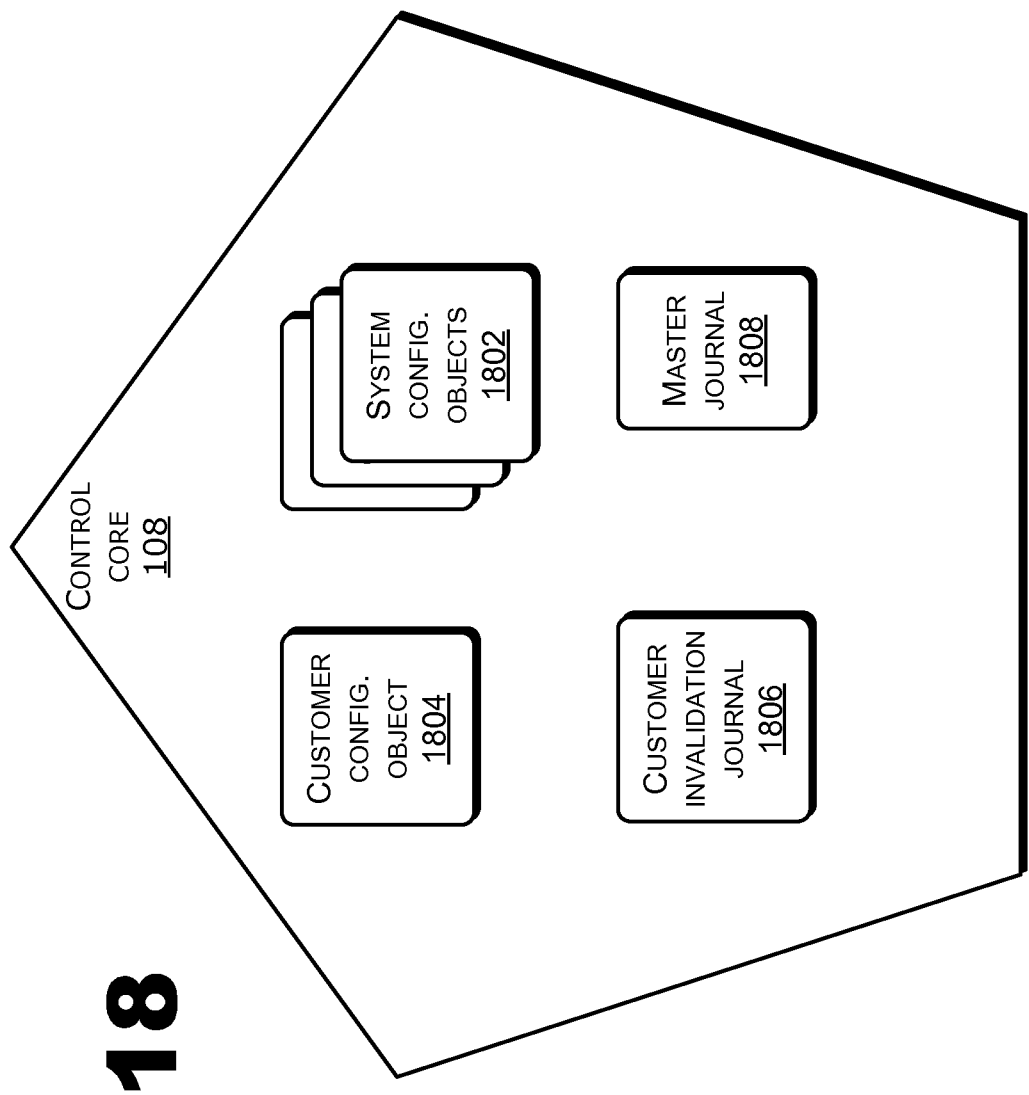

As noted above, the control core 108 maintains the authoritative database of the current CDN configuration and of information needed to operate the CDN. The database includes various interconnected tables that are used to describe and/or manage the CDN. With reference to FIGS. 18-19, the database includes system configuration objects 1802, customer configuration objects 1804, a customer invalidation journal 1806, and a master journal 1808. Those of skill in the art will realize and understand, upon reading this description, that different and/or other objects may be maintained in the database.

In a presently preferred implementation, the control core 108 maintains and stores some or all of the following information (as part of the system configuration objects 1802 or customer configuration objects 1804), some of which may be used for rendezvous, and some of which is used by cache machines:

Global Configuration Object (GCO) (1912)

The GCO is described in connection with request response processing.

Customer Configuration Scripts (CCSs)

Customer Configuration Scripts are described in connection with request response processing.

HostTable (1902)

The HostTable 1902 is a list of all machines in the network. This list is maintained in a table (HostTable) that includes, for each machine, its network address (IP address), and preferably its bandwidth capacity.

The HostTable preferably stores a Bandwidth Capacity value (BWcap). A BWCap value is also stored in the cluster table, described below. An actual value for Bandwidth Capacity value is derived from these two values according to the following table in which clusterBW represents the bandwidth capacity value set on the cluster, hostBW represents the bandwidth capacity value set on the cache and nhosts represents the number of machines in the cluster:

| clusterBW | HostBW | BandwidthCapacity |
|---|---|---|
| 0 | 0 | 0 |
| >0 | 0 | clusterBW/nhosts |
| 0 | >0 | hostBW |
| >0 | >0 | min(clusterBW/nhosts, hostBW) |

While it should be sufficient to use just one of these tables to set BandwidthCapacity, as described here, this is not always the correct approach. Specifically, the calculated BandwidthCapacity variable is preferably not used by the server selector (SS) mechanism (of the rendezvous mechanism), rather the server selector directly uses the value from the ClusterTable for shedding based on cluster-total bandwidth, and the value from the HostTable for shedding based on per-host bandwidth. The BandwidthCapacity is set in both tables, since the HostTable entry tracks the uplink from host to switch whilst the BandwidthCapacity at the cluster is the uplink from switch into the network fabric.

The reason that the server selector does not use the calculated per-host BandwidthCapacity is that it is generally wrong for purposes of controlling shedding to avoid saturating a per-host uplink. That is, if BandwidthCapacity is set only in the ClusterTable, then the system calculates a per-host value as clusterBW/nhosts (see above table). But e.g., if there are twenty machines sharing a 10G uplink, that value is 0.5G, which is too small: each machine should be able to individually burst to 1G (or higher, depending on the connection from each server to the switch) before causing shedding (assuming the overall cluster uplink is not saturated, i.e., not all machines using 1G at the same time). Or, e.g., if there are five machines sharing a 10G uplink, the system would calculate 2G, which would be too large if the individual machines only have a 1G link.

Therefore the BWcap values should generally be set both in the HostTable and ClusterTable.

As there should be an entry in the HostTable for every machine in the network, non content serving machines should have their BWCap value set to zero.

Each type of machine at a location should be grouped into one or more clusters, with a corresponding entry in the ClusterTable (1904).

SMED Table (1908)

The SMED Table 1908 is a list of "measurement equivalent" caches in a table (SMEDTable). In practice, this list equates to a rack of hardware; i.e., the set of machines plugged into a single router. Each entry includes one or more clusters.

Cluster Table (1904)

The Cluster Table 1904 describes each cluster. Recall that a cluster is not the same as a site (all of the machines that are plugged into a given switch), but the subset of those machines that share the same set of VIPs. As such, there may be multiple ClusterTable entries for a given site. The Cluster Table stores information about the region(s) that each cluster is in.

Each cluster contains a number of HostTable entries, one for each physical machine, and one or more VIPs (each of which is represented by an entry in the VIPTable).

All machines on the network should be represented in this ClusterTable (and directly in the HostTable). To be able to identify which are content serving machines, there is a flavor column in the ClusterTable.

As with the HostTable, non content serving clusters should have BWCap set to zero. Having these machines represented in these tables allow for infrastructure components such as the measurement components to make use of processes on non-content serving machines.

VIP Table 1906

A VIP is the locally load-balanced address, handed out as the target of rendezvous. If this VIP is used for secure traffic, it contains a reference to a node in the SSLTable, otherwise the sslKey is set to NULL (indicating HTTP traffic).

As such, there is one entry for each VIP address in the network. Non content-serving clusters do not need to have VIPs defined.

SSL Table 1910

An entry in the SSLTable describes one "secure" property; it identifies the mapping between super-name and certificate.

Flavors Table 1912

The Flavors Table 1912 describes characteristics that are shared by all machines of a certain flavor (e.g., content serving). The term "flavor" is used here to distinguish between machines that perform different functions within the CDN (e.g., content serving, etc.).

CoServers Table 1916

As used herein, a co-server, with respect to a particular resource, is an origin server—the authoritative source of the particular resource. The CoServers Table contains descriptions of all CoServers (origin servers) and Alias Nodes defined in the system. This table holds information about all customer origin servers registered with the CDN. This table is used to associate incoming requests to these entries, and describes how, and from where, the resource needed to satisfy that request is to be retrieved. Note that as CDN objects are also handled by the CDN, some CDN servers may function, at times, as co-servers.

Alias Nodes are associated with a Base CoServer, and provide a way to separately report and log traffic associated with a particular alias attached to a CoServer without needing to cache the same resource multiple times.

The CoServers table preferably includes the following fields:

| Field | Description |
| --- | --- |
| IsActive | Flag indicating whether or not the entry is considered to be active. |
| SubID | A numerical subscriber ID number; a key into the Subscriber Table (1918). |
| CosID | The unique ID number associated with this entry (this value is also a key into this table). When adding an entry to the table, this is set to the value of NextCosID. |
| Port | The port number over which the origin server associated with this entry should be contacted for cache fill purposes. |
| Alt WebRoot | The Alternate Web Root, the location within the content tree of the origin server where the 'root' associated with this property is configured to be. That is, when performing a cache fill the value of this is prepended to the incoming URI path on the request (see Extended Aliases). Defaults to '/' (although any trailing '/' on this value is removed during the conversion process, making the default effectively ''). |
| Hostname | The name of the origin server associated with this entry. Can be specified as either a FQDN or as an IP address. If no AltOrigin specification is in place, this is used to both find the address of the origin server to contact for a cache fill, and specifies the value of the Host: header when filling over either the HTTP or HTTPS protocol This field also provides the root name of any log files associated with this entry. |
| IsAlias | A Boolean flag (1 or 0) which indicates whether this entry is an Alias or not. An entry can be either an Alias or CoServer. It is not possible to have both this and IsCoserver set. This flag may be combined with IsCoserver into a single flag since only one of these two flags can be set. |
| CSWFlags | A list of CoServer-Wide Flags that specify properties or configuration options that apply to the CoServer as a whole. |
| IsCoserver | A Boolean flag (1 or 0) which indicates whether or not this entry is a CoServer. This flag may be combined with IsAlias into a single flag since only one of these two flags can be set. |
| Protocol | Which protocol to use when contacting the origin server associated with this entry. In presently preferred implementation, options are 'HTTP', 'HTTPS' and 'FTP'. |
| AliasList | A list of aliases associated with this entry. An incoming request is compared to the list of these aliases when determining which entry is associated with that request. As such, each alias needs to be unique, and so these form an additional key. |
| SeqNum | As for all transaction tables, this indicates the table sequence number which last updated this row. |

Subscriber Table 1818

The Subscriber Table 1818 includes information about subscribers to the CDN (e.g., the CDN's customers).

Aliases

An Alias is a name by which a CoServer is known to the network, and is used to identify that CoServer during request processing. The term alias can refer to both the format of this identifier, as well as certain attributes of the identifier. A list of ways that the term is used follows:

| Term | Meaning |
| --- | --- |
| Simple Alias | a FQDN (Fully Qualified Domain Name); the value of the Host: provided to the CDN by the client, e.g., fp.example.com |
| Extended Alias | an alias may include a top-level directory, in which case a match requires that both the presented Host: header and initial path element match the alias, e.g., fp.example.com/dir. This allows behavior to be specified for different top-level directories of URLs presented to the CDN; for instance, a particular directory could be filled from a different origin server. In some cases this may include an arbitrary amount of path. |
| Wildcard Alias | the initial element of the hostname portion of an alias can be a '*' in which case it will match any subdomains. e.g., *.example.com will match fp.example.com and fp.subdir.example.com, as well as the unadorned example.com.<br>Note: that a Wildcard Alias may also be an Extended Alias; e.g., *.example.com/dir.<br>The wildcard character has to be a complete hostname element; i.e., it is not possible to have *fp.example.com. |
| Primary Alias | The first alias in the list associated with a given CoServer. Any request using a Secondary Alias is rewritten early on in request processing so that it seems to the system that it was actually using the Primary Alias.<br>As such, if the Primary Alias is a Wildcard Alias, then there cannot be any Secondary Alias.<br>Also, each matching Host: header presented will cause a separate resource to be resource (i.e., the system will behave as if all the resources for that CoServer included a Vary: Host). |
| Secondary Alias | Any non-Primary Alias on the list associated with a given CoServer. When a request is received that matches a Secondary Alias, the URL is internally converted so that it seems that the request was requested using the Primary Alias instead. This means that the list of Secondary Aliases is treated as synonyms of the Primary Alias. See also AltID Aliases below. |
| AltID Aliases | A Secondary Alias (qv) that is associated with an alias node, this allows traffic received over specific Secondary Aliases to be tracked (for both logging and reporting/billing purposes) separately. The Alt ID reErs to the ID number of the alias node under which the request should be logged/tracked. |
| Alias Node | This is an additional entry in the ReflectorTable that is associated with a given CoServer (which is then referred to as the Alias Node's Base CoServer). This must belong to the same Subzone as the Base CoServer, and should be configured to have the same hostname, etc. The CoServer ID associated with this Alias Node is then used when logging/tracking traffic for this AltID Alias. The Primary Alias of the Alias Node should be set to the same value as the AltID Alias of the Base CoServer (but without the AltID itself). This value is used as the Nickname when displaying data for this alias in the Reporting Portal |
| Request Processing | The complete set of active aliases (i.e., those associated with active CoServers), be they Simple, Extended, AltID, Primary or Secondary, are used to populate a hash table within the agents of the network. This hash table provides a mapping from each alias to the CoServer ID associated with that alias.<br>When a request is received, the first path element of the request is joined to the value of the Host: header, and a lookup into this hash table performed. If no match is found, a second lookup is performed of just the Host: If a match is then found, processing completes since the appropriate CoServer has then been found. In some embodiments the initial lookup is done with the Host: header only, and if an extended alias exists, a flag is set that indicates so and then a second lookup performed.<br>If no match is found, then a second hash table is inspected, which contains down cased versions of the directory element of each extended alias (the Host: value always being processed down case). If a match is then found, and this CoServer has the ncurl = CSWFlag set, then a match is declared, and processing completes.<br>If however no match is yet found, a search for a possible Wildcard Alias match then begins. The most significant two hostname elements (e.g., example.com) are looked for in another hash table; if an entry there exists, then the next hostname element is added and another check performed. This continues until an entry marked with an hasWildcard flag is set, indicating that a matching Wildcard Alias exists.<br>If the matching entry is marked as having a directory extension, then a check of the top-level path element from the URL is then made, similar to the processing for a normal Extended Alias. If no such match is found, then a match on the Wildcard Alias is only declared if a Simple Wildcard Alias is defined. |

Request-Response Processing

FIG. 13 showed the logical structure of a cache and its various components. The processing performed by some or all of these components may be performed by sequencers. A sequencer uses a sequence control object which is made up of an ordered list of handlers. In a presently preferred implementation, a sequencer is an Executive task (preferably a channel), and the handlers associated with a sequencer (task) are implemented by events. It is necessary for the task to be an Executive channel so that it can use the submit (potentially asynchronous) model.

Request-Response Processing Flow

Figure 20A:
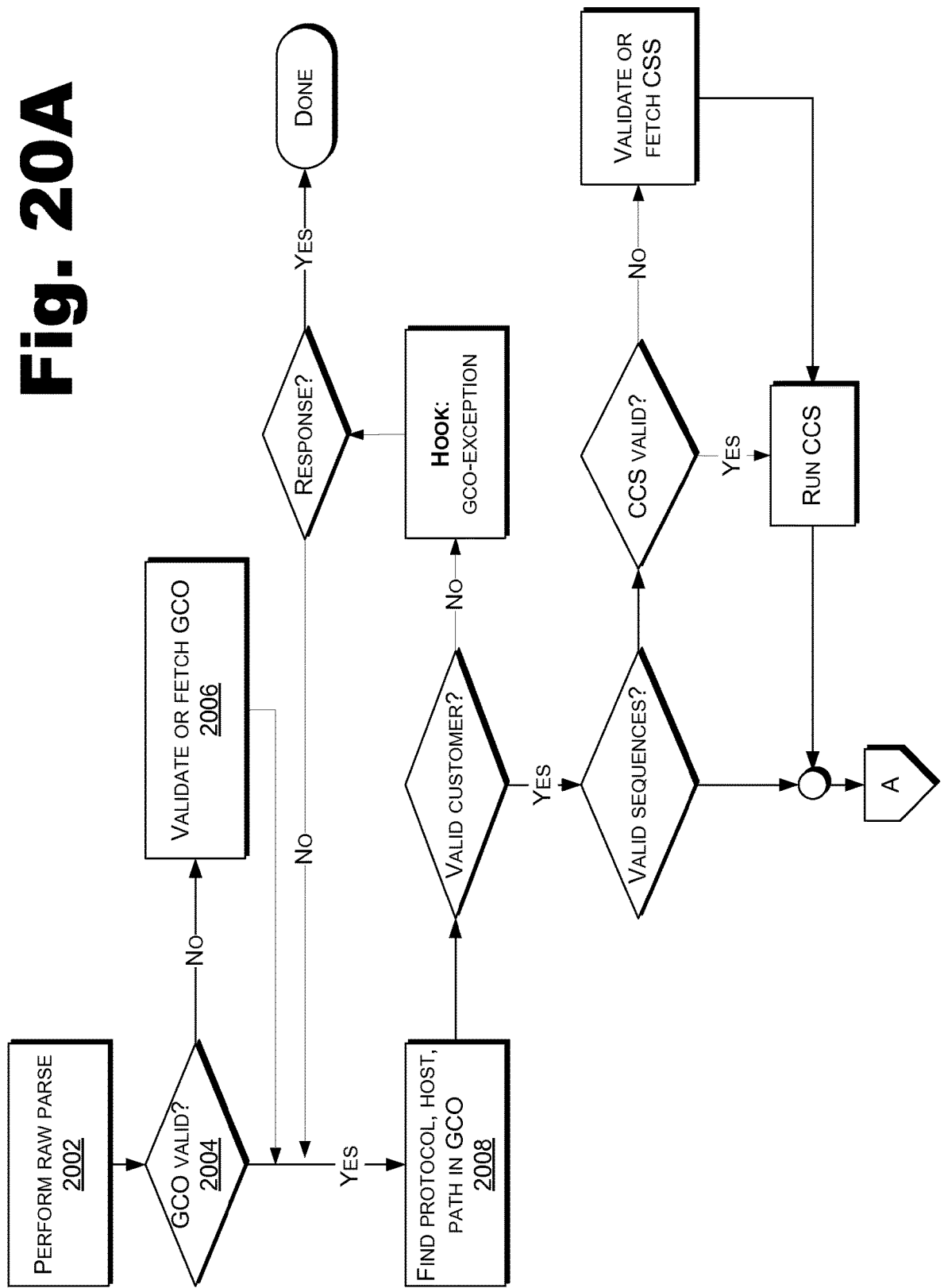

Request-response processing flow is described now with reference to FIGS. 20A-20C. For the purposes of this description, assume that the processing is being handled by a cache server such as server 1102 (FIG. 11) in a CDN.

The cache server obtains data (an incoming connection) at a port and parses sufficient incoming data (at 2002) to determine that the data correspond to an appropriate type of request (e.g., HTTP). The incoming data will include sufficient information to allow the cache to determine whether or not it can serve the requested resource. E.g., in the case of an HTTP request, the incoming data will include HTTP header information, including (a version of) the URL that was used to make the request.

In order to determine whether or not it can serve the request, the cache server needs to compare information associated with the request with information in the global configuration object (GCO). The cache server therefore needs to determine whether it has a valid GCO (at 2004). If necessary, the GCO is retrieved by the cache from the control core (at 2006). If the current GCO is valid then it can be used, otherwise the GCO must be validated or a new one obtained. It should be appreciated that if the if the cache is unable to obtain a valid GCO after some predetermined number of tries then it should not serve the requested content and should fail (and take itself out of rotation for selection until it is able to retrieve a valid GCO).

In a current implementation the GCO acts as a "white list" carrying valid protocols, hostnames and path prefixes. In some cases, for certain reseller properties, customer identification can also be performed based on the VIP on which the request came in. Such a technique may also be used to provide a simple transparent proxy implementation. The GCO maps the protocol, hostname and path prefix to a customer identifier (Customer ID). The following table shows an example GCO (the numbers in the left column are provided for purposes of description, and are not intended to be limiting in any way.)

|    | String                                | Customer ID |
| -- | ------------------------------------- | ----------- |
| 1  | http://customer1.com/                 | 1.1         |
| 2  | http://customer2.com/                 | 2.1         |
| 3  | http://*.customer3.com/               | 3.1         |
| 4  | http://*.special.images.customer3.com/ | 3.2        |
| 5  | http://*.images.customer3.com         | 3.3         |
| 6  | http://images.customer3.com           | 3.4         |
| 7  | http://customer4.com/                 | 4.1         |
| 8  | http://customer4.com/topd1/           | 4.2         |
| 9  | http://customer4.com/topd1/subd/      | 4.3         |
| 10 | http://customer4.com/topd2/           | 4.3         |
| 11 | http://customer5.com/                 | 5.1         |
| 12 | https://customer5.com/                | 5.2         |
| 13 | *://customer6.com/                    | 6.1         |
| 14 | http://customer7.com/                 | 7.1         |
| 15 | http://customer7.com:8080/            | 7.2         |

The string in a GCO is some or all of a URL. Wildcards may be used, but are limited. Recall that (for the purposes of this description) a URL has the form:

<<protocol>>://<<domain>>/<<path>> where <<protocol>> may be, e.g., "http", "https", "ftp", and so on; <<domain> is a domain name and path specifies a location. A formal URL description is given in RFC 1738, Uniform Resource Locators (URL), by T. Berners-Lee et al., URIs are described in Network Working Group RFC 2396, "Uniform Resource Identifiers (URI): Generic Syntax," by T. Berners-Lee et al., August, 1998, the entire contents of each of which are fully incorporated herein for all purposes.

The "protocol" may be replaced with a label for the listener the on which the request came in. The reason is that a given customer may have a dedicated SSL listener which presents their server certificate, so the cache will only want to satisfy requests for that particular customer on that listener. In that case, the GCO may have, e.g., "https-CUST" (e.g., if CUST is a customer with a customer SSL VIP) as the "protocol."

In the GCO, the protocol may be replaced by an "*" (a wildcard character), indicating all supported protocols map to the same Customer ID (see, e.g. no. 13 in the table above). A wildcard character (e.g.,"*"). may also be used as first component (only) of hostname (e.g., nos. 3, 4, 5). Thus, "http://a1.customer3.com" and "http://a2.customer3.com" will both match entry number 3 in the table above. In order to simplify the rules for resolving ambiguities, in some implementations wildcards may not be used anywhere else.

Having completed the raw parse (at 2002), the cache knows the URL that was used to make the request.

Once the cache has a valid GCO it tries to find a match for the input URL in the GCO (at 2008). Preferably a "Best match wins" strategy is used. The hostname is checked first, and an exact match wins, otherwise, a wildcard match is used with greatest number of literal matches wins. For example, for customer3.com: the string "special.images.customer3.com" maps to 3.2 (more literal matches than 3.3); images.customer3.com maps to 3.4 (exact match). Next the port and protocol are looked up, then, longest path prefix wins.

The flow chart in FIGS. 20A-20C shows a potential loop from the GCO-Exception hook if no response is generated. To prevent a loop from occurring the system may only try the GCO lookup a limited number of times, e.g., up to two times. The point of the GCO-Exception hook is to allow inspection/correction of the request such that it can be found in the GCO. However, the system preferably only gets one shot at correction.

Each customer may have corresponding scripts (sequences) that are to be used to process that customer's requests. These Customer Configuration Scripts (CCSs) are associated with the customer ids, and, if the request (the URL) relates to a valid customer (at 1610) (based on the lookup in the GCO), then processing continues to determine whether there are CCS (Customer Configuration Scripts) corresponding to that customer. The CCS is checked for validity and a new CCS is fetched (from the control core) if needed. As noted previously, the CCS is used to assemble sequences, which are then cached and used until they become invalid (due, e.g., to a new CCS being retrieved). It should be appreciated that scripts and sequences are not the same thing, although as mentioned previously, a particular handler may invoke a script to perform its function.

In presently preferred implementation the CCS is a Lua script retrieved from the Control Core. The name of the script may be based on the customer's ID, e.g., for Customer ID 4.2 the script may be obtained at: https://core.fp.net/ccs/ccs-4.2.luac The script sets up customer-specific subsequences at various hook points in the main processing sequence. Results of setup are preferably cached, and the CCS is not run on every request. It is re-run if the script is reloaded or if conditions change. For example, if results of script are cached persistently, then agent revision could change. The compiled script is an object consumed by the caches, but the script itself is generated from customer configuration description in a database.

Once the CCS is configured (loaded and validated), processing continues with a hook (denoted "cli-req"—client request) to handle any corresponding custom processing. That is, "cli-req" is a hook point where a subsequence of customer-specific handlers (which may include a script) is inserted. As an example, suppose that a certain customer requires:

Set www.customer1.com as canonical hostname
Strip sessionid parameter from all query strings These actions may be taken in cli-req (client request) hook, for which exemplary CCS source would be:
hook["cli-req"].add("set-host('www.customer1.com')")
hook["cli-req"].add("strip-query('sessionid')")
where both set-host and strip-query are simple one-shot handlers, inserted into a larger sequence.

As another example, suppose the customer has the same client-side requirements as above, but also wants to set the fill target to be origin.customer1.com The corresponding CCS source would be:
hook["cli-req"].add("set-host('www.customer1.com')")
hook["cli-req"].add("strip-query('sessionid')")
hook["fill-req"].add("set-target('origin.customer1.com')")
where set-host, strip-query, and set-target are simple one-shot handlers, inserted into a larger sequence.

This CCS adds an action to the fill-req (fill request) hook.

As another example of a configuration script, suppose that a customer requires proxy authentication using auth.customer1.com for remote authentication. The customer's CCS would include:
hook["cli-req"].add("proxy-auth('auth.customer1.com')")

The proxy-auth handler launches a sequence of its own to perform the actual authentication request and waits for the response. This is an example of a blocking handler which launches a helper request. Based on the response to the authentication request, the proxy-auth handler may generate a 401 response immediately or allow processing to continue.

Another way to handle this with CCS (if a native proxy-auth handler is not always available) may be:

```
if handlers["proxy-auth"] == nil then
  hook["cli-req"].add(
    "lua-txn('proxy-auth.luac', 'auth.customer1.com')")
else
  hook["cli-req"].add(
    "proxy-auth('auth.customer1.com')")
end
```

This logic is part of CCS builder, not the configuration writer. A single network-wide CCS can make these decisions based on local environment. CCS can use arbitrarily complex logic to assemble the building blocks for the customer, including making additional requests, etc. "Native" handlers could also be built-in scripts behind the scenes, but prefer-ably native handlers are expected to be efficient C code. It should be appreciated that the CCS is a per-customer object. It should also be appreciated that a human configuration writer does not need to deal with this detail; they just need to know that they want authentication.

In addition, it should be appreciated that the CCS is not necessarily run on every request. Rather, the CCS is used to configure the agent to handle a given customer's requests by setting up the appropriate handlers at the various hook points. Those handlers themselves may invoke a script or scripts, but they do not have to and it is expected that a typical customer's requests will be handled without using scripts (e.g., Lua) at all in the main request processing path. The fact that the CCS is a script rather than a simple list of handlers to install at hook points means it can be flexible in inspecting its surroundings to determine the proper handlers for the environment (software revision, region, etc.) in which it is running.

As can be seen from the flow diagram in FIGS. 20A-20C, hooks are available at numerous points in the processing sequence. In a present implementation there are hooks available for, amongst other things:
client requests
cache fills
GCO exceptions
cache misses
fill responses
fill pump
client responses
client pump Those of skill in the art will realize and understand, upon reading this description, that different and/or additional hooks may be available and used in a particular implementation.

As noted earlier, default processing is available, and the cache will service requests without any customer-specific sequences, provided the customer is valid (e.g., found in the GCO) and requires no customer-specific processing.

As the various elements of the CDN are themselves potential clients (and sources of resources), the CDN may provide a CCS for CDN resources. From an implementation perspective, the CDN may be treated as a customer, with entries in the GCO and with its own CCS.

Example

Figure 21A:
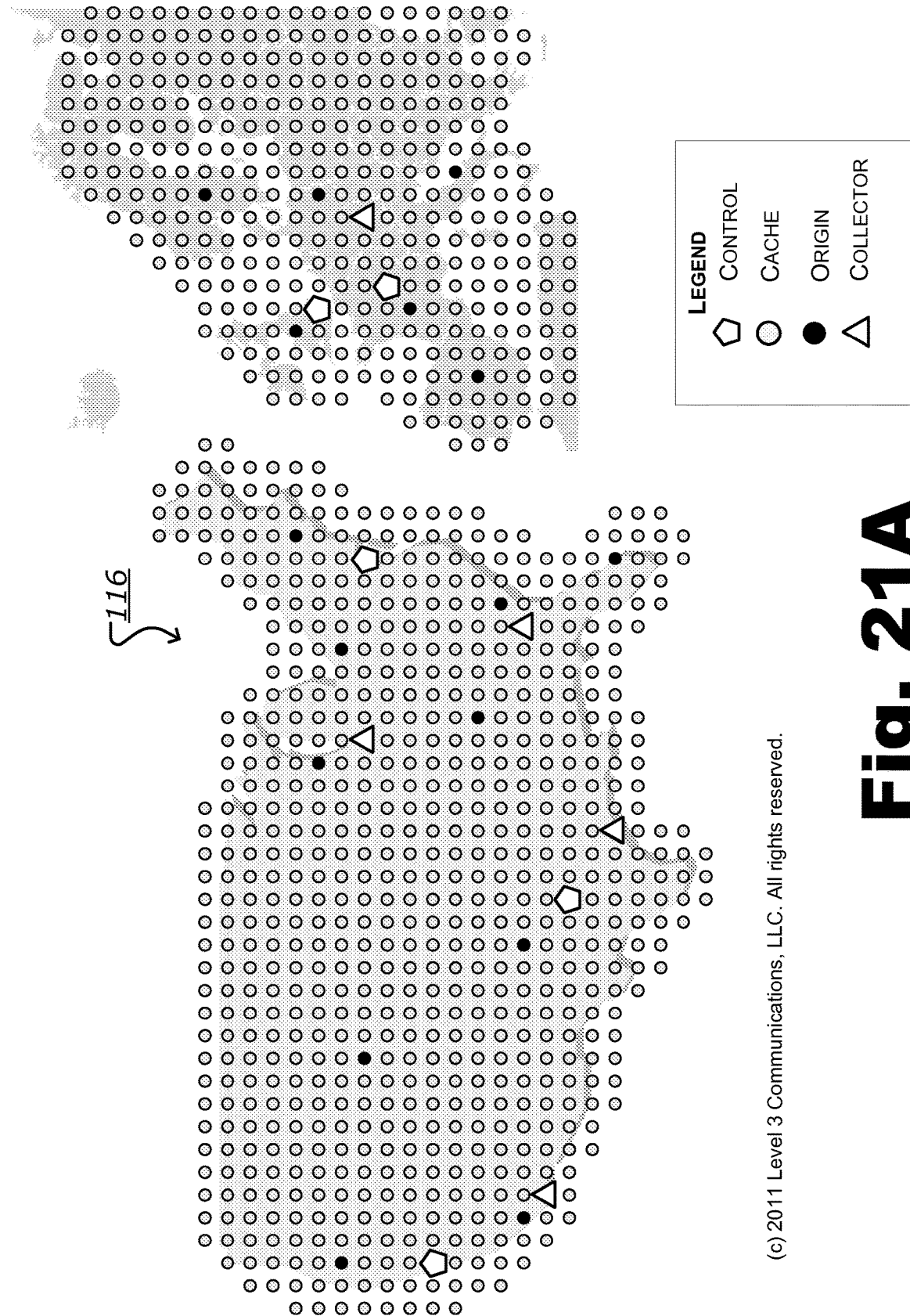

FIG. 21A depicts an exemplary CDN, including multiple caches (corresponding to the caches 102 in FIG. 1), forming a cache cloud, and associated components (collectively 116). Each cache (e.g., a cache cluster site) is depicted by a shaded circle in the drawing in FIG. 21A. Other components of the CDN system/framework are shown, including core control mechanisms (denoted by pentagon shapes in the drawing, corresponding, collectively, to control core 108 in FIG. 1), collector mechanisms (denoted by triangle shapes in the drawing and corresponding to collectors 106 in FIG. 1), and origin servers/server sites (denoted by black circles in the drawing). While the various components are shown in FIG. 21A, by way of example, overlaying maps of the United States and Europe, those of skill in the art will realize and understand, upon reading this description, that these overlays are merely exemplary and are not intended to limit the actual locations of components or the number of components.

Figure 21B:
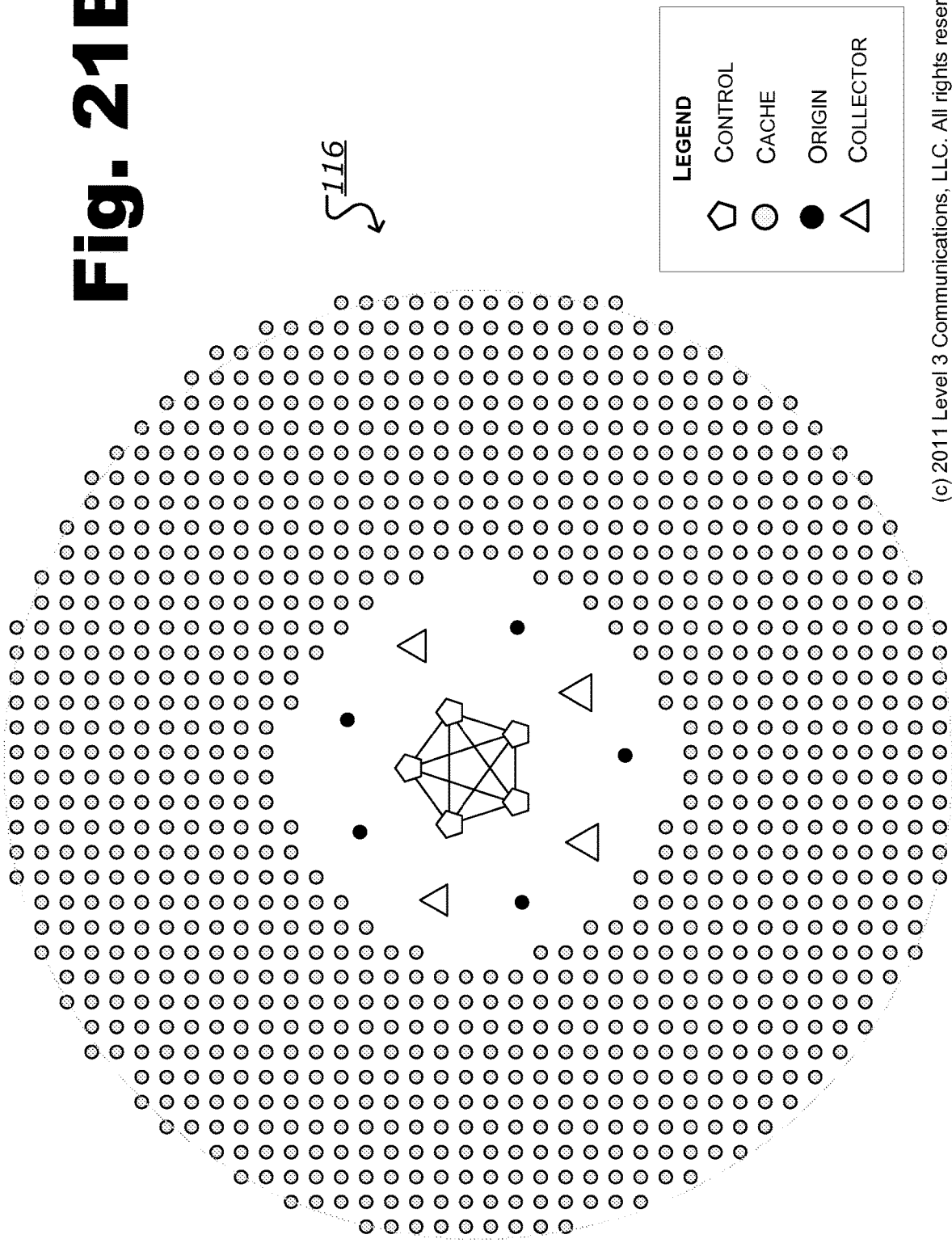

With reference to FIG. 21B (and again to FIG. 21A), the caches (which correspond, e.g., to the caches 102 in FIG. 1) correspond to locations in the CDN 100 from which client 110 can obtain resources that the CDN is providing (e.g., serving) on behalf of content providers (such as content provider 112). The origin servers/server sites correspond to locations from which the CDN cache servers/server sites can obtain content provider content. The origin servers/server sites may be part of the CDN (e.g., if content provider content is preloaded into the CDN by content providers), or they may be operated by the content providers independently of the CDN.

The collector mechanisms (denoted with triangles in the drawing and corresponding to the collectors 106 in FIG. 1) are distributed around the system and collect information regarding resources delivered on behalf of content providers (e.g., logs and performance data) from the caches. The collector mechanisms may provide the collected information (in a raw or processed form) to content providers regarding resources delivered on their behalf Information provided to content providers may be provided through a separate administrative entity that collects and maintains data collected by the collector mechanisms.

Figure 21C:
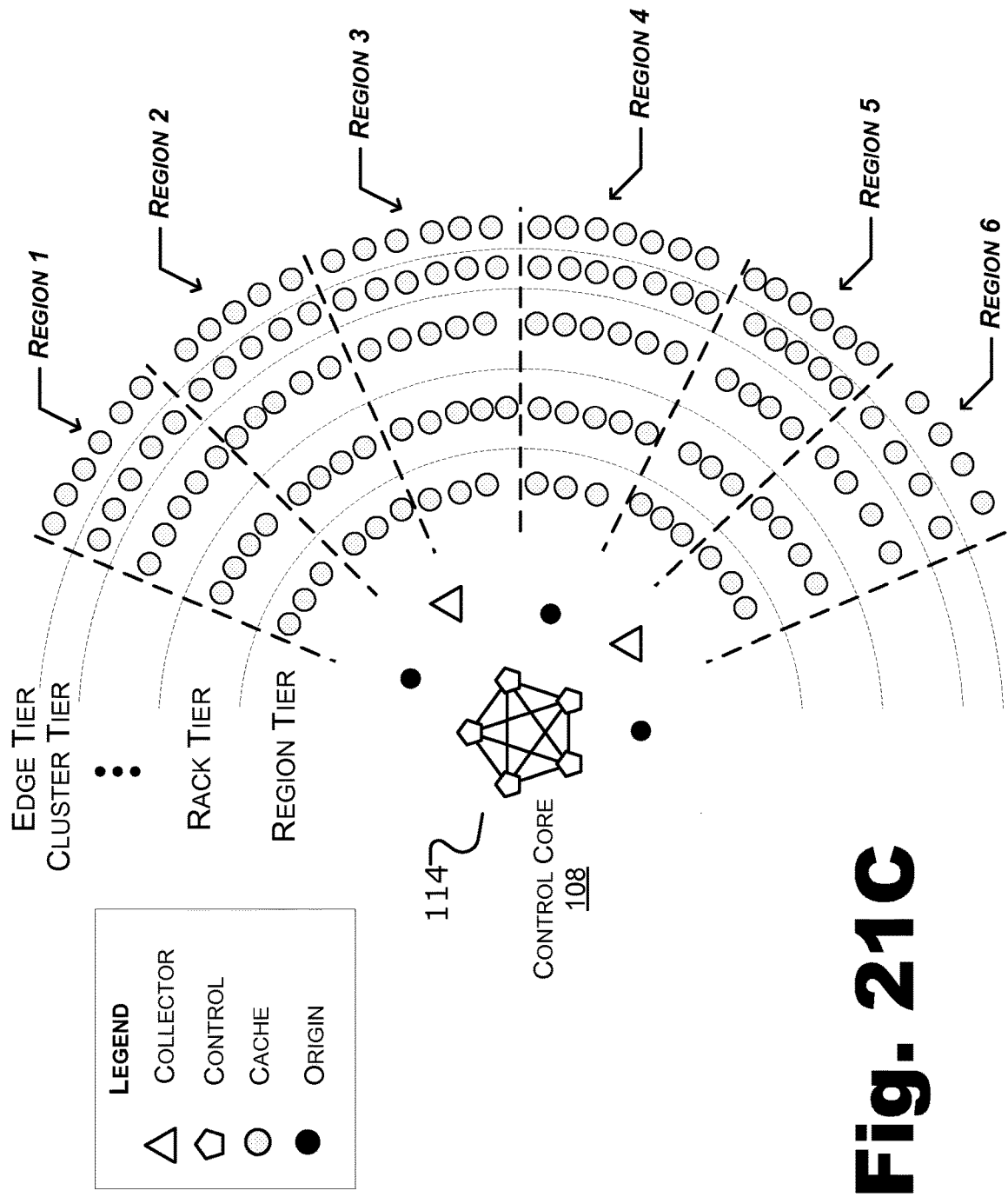

FIG. 21C shows an exemplary logical organization of a portion of CDN caches shown in FIGS. 21A and 21B. As shown in FIG. 21C, the CDN caches may be arranged in one or more tiers (denoted in the drawing as "Edge Tier", "Cluster Tier", . . . , "Rack Tier", and "Region Tier"). These tiers correspond to the "Edge Tier," "Parent Tier (tier 2)", "Tier 3," and so on in FIG. 8. The caches in the so-called "Edge Tier" are preferably "closest" to clients (by some measure(s) of network distance), and so resources served to clients from caches in the edge tier will likely provide the most efficient delivery of those resources to those clients. A particular CDN may have only one tier. From the point of view of caches in any tier, the caches in the next inner tier are considered their parent caches. So, e.g., in the example in FIG. 21C, the caches in the cluster tier are parent caches to the caches in the edge tier. Similarly, the caches in the region tier are parent caches to the caches in the rack tier. In general, if there are n tiers denoted $T_1$ to $T_n$, with $T_n$ being the outermost or edge tier, the caches in tier $T_i$ are parents of the caches in tier $T_{i+1}$. Caches in the same tier are referred to as peer caches.

In the example in FIG. 21C, the tiers are as follows:

| Tier | Tier Name |
| --- | --- |
| $T_0$ | Region Tier |
| T1 | Rack Tier |
| $T_{n-1}$ | Cluster Tier |
| $T_n$ | Edge Tier |

Organization of the caches into tiers may correspond to physical aspects of the caches, including, e.g., their relative locations, how they are connected to the network and to other networks, their speeds, capacities, types, etc.

The caches may also be organized into one or more regions (denoted "Region 1", "Region 2," etc. in the drawing). The regions in FIG. 21C correspond to the groups in FIG. 9. Regional/group organization may also be made based on physical aspects of the caches (e.g., the geographical locations), but it may be made for other organizational reasons (e.g., to implement policies). While six exemplary and distinct regions/groups are shown in the drawing, those of skill in the art will realize and understand, upon reading this description, that any number of regions/groups may be used, including overlapping regions. Those of skill in the art will also realize and understand, upon reading this description, that regions may be of different sizes and that some regions may not include caches in all tiers.

For example, the caches in a particular country may be treated as being in a region in order to implement content delivery policies for that country. Those caches may also be treated as being in one or more regions in order to implement content delivery policies on behalf of content providers. These regions (country regions and content provider regions) may overlap.

Figure 21D:
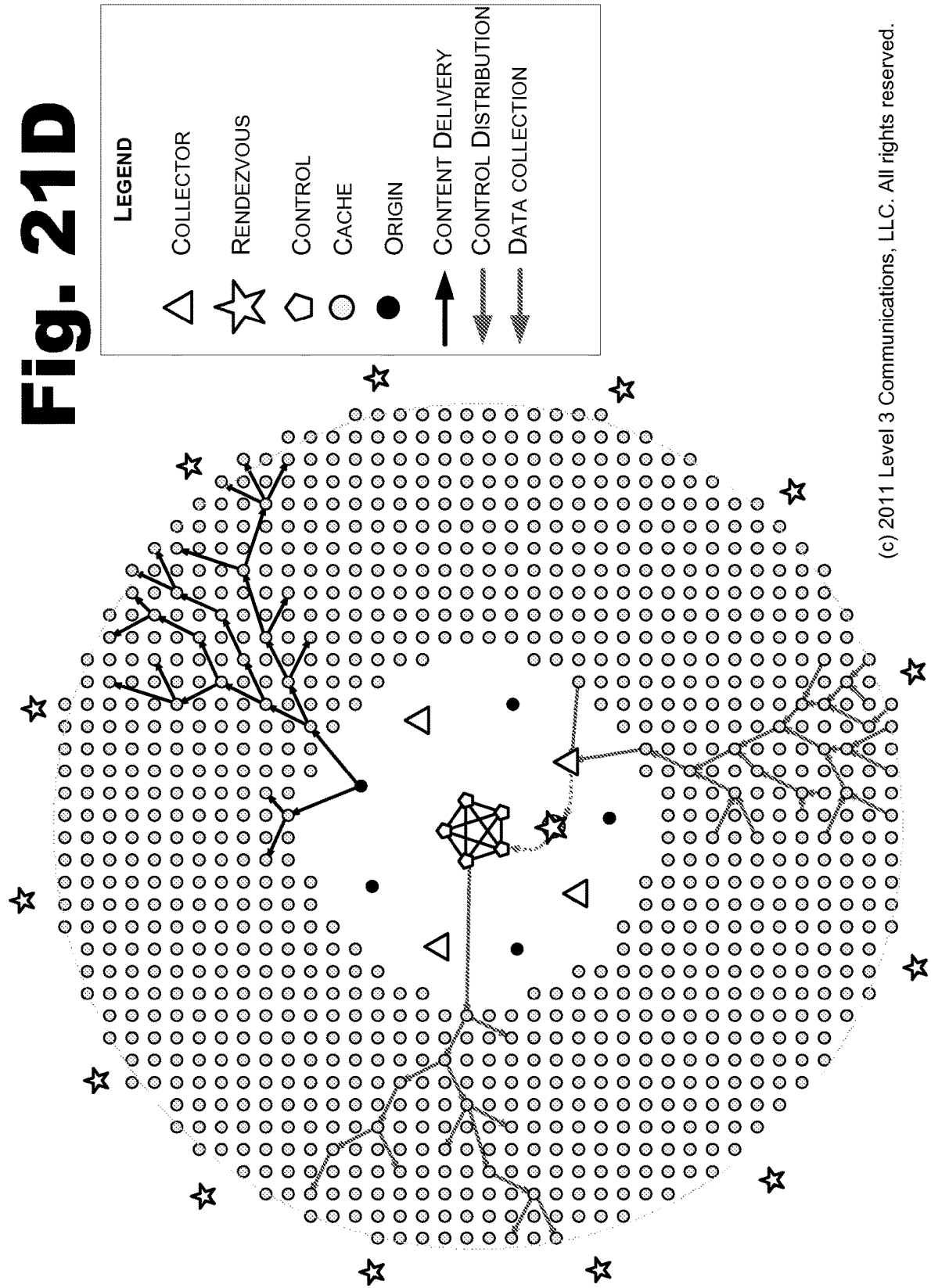
Figure 21E:
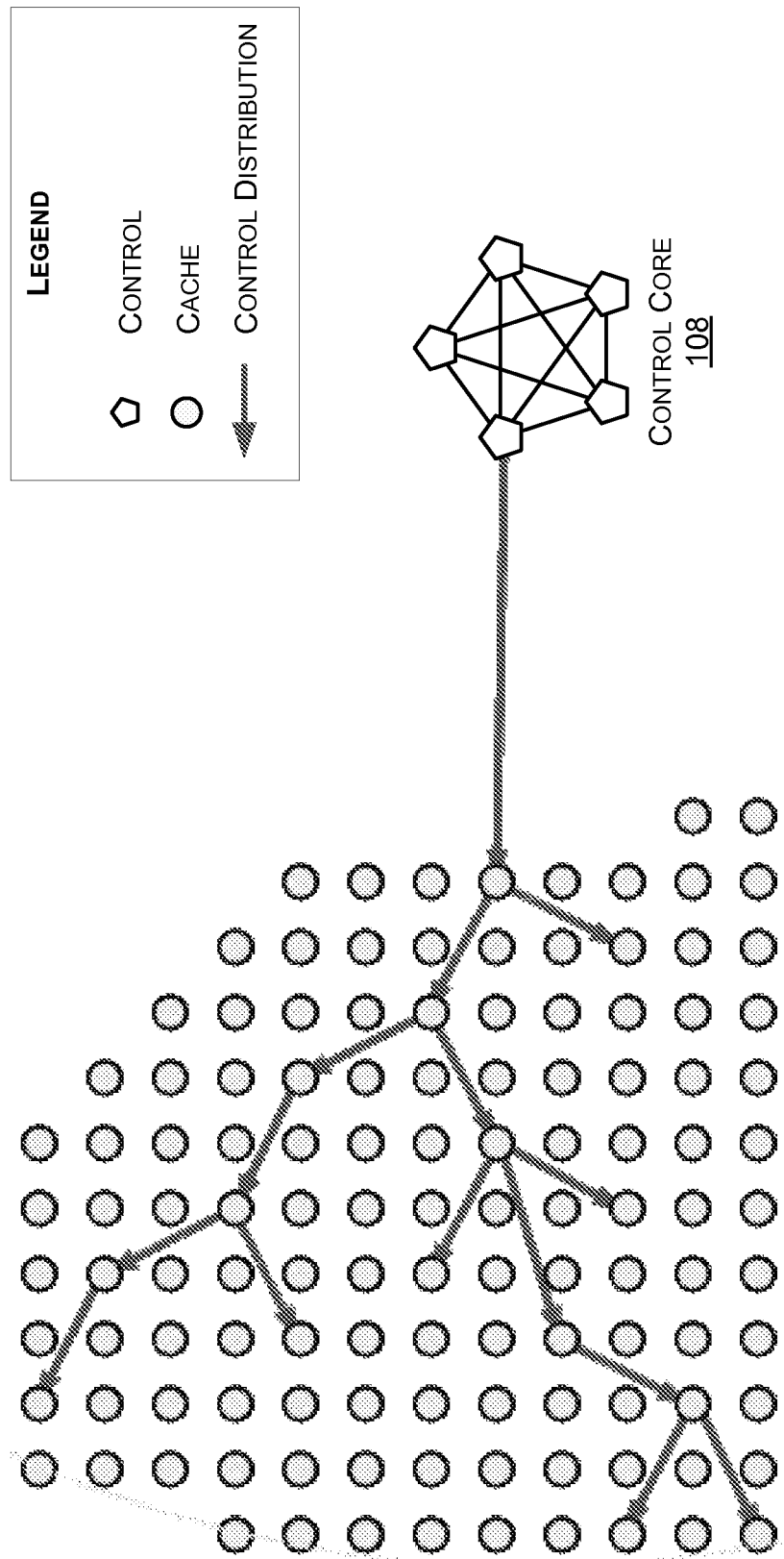
Figure 21F:
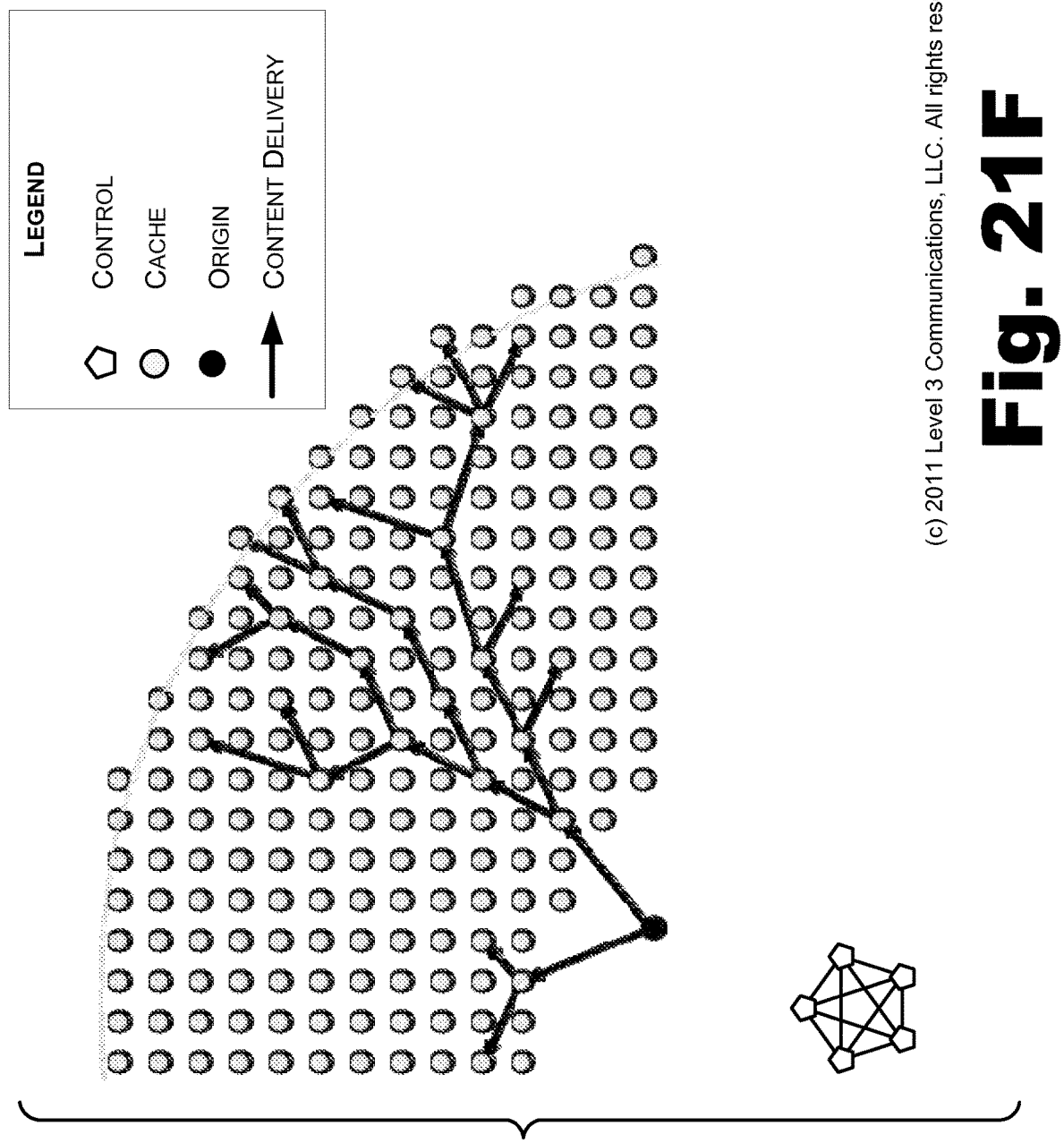

FIG. 21D shows various components of the CDN system of FIG. 21A operating in their various roles. FIG. 21D includes the rendezvous mechanisms (denoted using stars in the drawing). As noted earlier, the presently preferred rendezvous mechanism is implemented using the DNS system, and preferably acts to select or identify a "best" or "optimal" cluster from which to serve a given client. Preferably "best" cache selection happens at DNS lookup time. FIG. 21D shows three typical operations occurring in the CDN. On the left side of the drawing (and shown in greater detail in FIG. 21E), the control core cluster performs distribution of control data to various cache clusters (preferably in response to an hierarchical pull of the data from the cache clusters). On the top right of the drawing(and shown in greater detail in FIG. 21F), cache clusters are performing content delivery. On the bottom of the drawing (and shown in greater detail in FIG. 21G), the collector mechanism is collecting information from cache clusters.

FIG. 21H shows the hierarchical operation of caches (A00, A02, A03) in the edge tier, pulling resources from the origin servers and control/traffic data from the control core via caches in the CDN hierarchy. Similarly, the collectors pull traffic (essentially in the other direction) from the edge caches, via the CDN hierarchy.

FIG. 10 showed the general process of content delivery to clients outside the CDN. FIG. 22 shows the same process within the CDN. As can be seen, and as was noted above with respect to FIG. 10, the processing of resource requests is the same inside and outside the CDN. A client 2210 (which could be any CDN component, including a cache, a collector, the control core, etc.) wants an object from a source (which could also be any CDN component, including a cache, a collector, the control core, etc.). The client request is directed to a location in the CDN that should have that resource. That location could also be any CDN component, including a cache, a collector, the control core, etc. If that location does not have the requested resource, it gets a copy from the co-server for that resource (i.e., from the authoritative source for that resource).

While the client 2210 and the co-server 2212 are shown outside the box labeled CDN 100, in this example they are within that box (they are shown outside to aid in the description).

Computing

The operations and acts shown and described above are implemented, at least in part, by software running on one or more computers of CDN 100.

Figure 23:
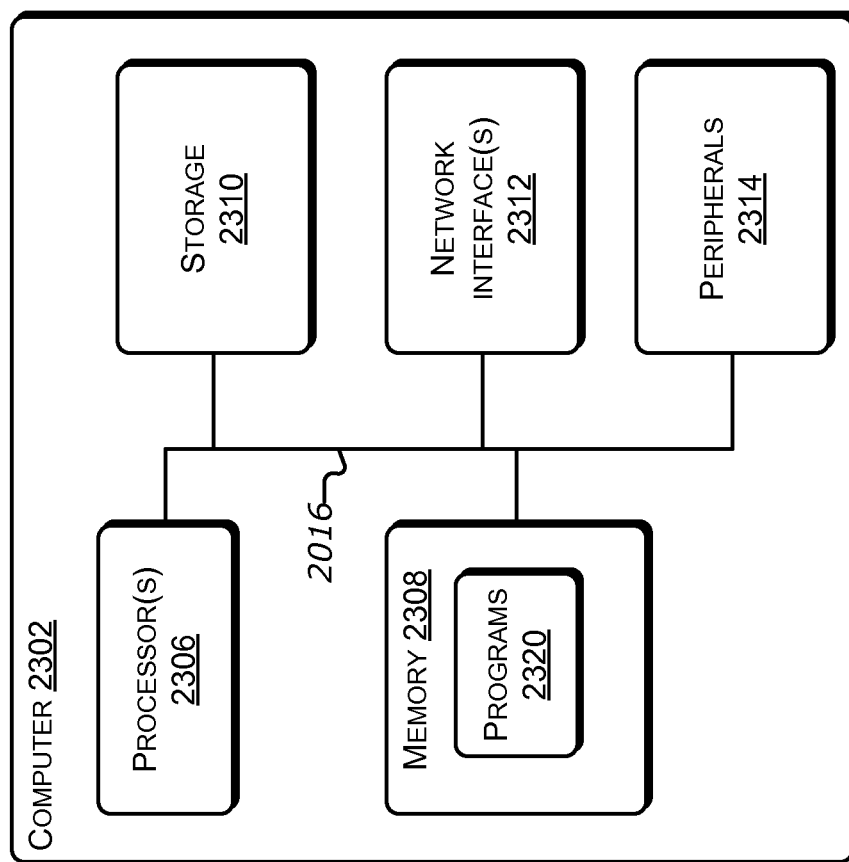
FIG. 23 shows a typical computer system.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system (as noted above, FIG. 23 illustrates a typical computer).

A computer 2302 includes one or more processors 2306, memory 2308, storage (e.g., disk storage) 2310 connected via bus 2316 or the like. The computer 2302 may also include peripheral devices 2314 such as a keyboard, display monitor, printer and the like. The computer 2302 can connect to a network or other computers or devices via network interface(s) 2312.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

The various programs described herein will typically reside as programs 2320 in the memory/memories 2308 of one or more computers.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

As used herein, the term "computer-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory 2308, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a disk, magnetic tape, any other magnetic medium, a CD-ROM, DVD, any other optical medium, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements which are appropriate to perform the method.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

The Executive

It is anticipated that in a CDN a cache machine with a 10 Gb/sec link, serving about 1 Mb/second per client, should be able to serve on the order of 10,000 concurrent clients, with about ten (10) activities per client. This requires on the order of 100,000 concurrent activities. The inventors realized that in order for a cache machine (and thus a CDN) to operate efficiently and to take advantage of new multi-core computer architectures, the cache machine would have to implement some efficient form of concurrency.

More specifically, and based on their experience with CDNs, the inventors realized and understood that network applications (e.g., serving and distributing content in a CDN) typically involved long wait periods. They therefore realized that it would be useful to perform many small jobs in order to be efficient (i.e., in the case of a CDN cache, it would be beneficial to do tens or even hundreds of thousands of things concurrently). They also realized that it would be useful and beneficial to keep all processors (CPUs) active simultaneously. The inventors realized that the handling of an individual request in this type of application generally consists of small amounts of computation separated by relatively long wait times (long here being relative to the speed of modern CPUs). Therefore, while requests are in the waiting stage, other requests can be in the compute stage, thereby keeping the CPUs busy. However, the inventors also realized, based on their experience with CDNs, that not all requests required long wait times, and that a concurrency scheme that assumed that there would always be long wait times would disadvantage those requests where there were no long wait times.

The inventors also realized that a concurrency scheme used in caches could take advantage of the type of work that caches were expected to perform in order to improve performance. For example, most network applications have similar structure and most network operations take on the order of milliseconds. A cache could perform useful operations while waiting for relatively slower network operations or disk operations to complete. (Disk operations sometimes take longer than milliseconds.) In addition, networking (and the timing in large networks such as the Internet) is inherently and largely unpredictable and unreliable. To deal with these aspects, a preferred concurrency scheme should support asynchrony (to deal with unpredictable timing) and organized exception handling (to deal with lots of potential failure modes and unreliability of networks).

The inventors considered approaches such as one thread per client to be too limiting for challenges of real-world caches in operational CDNs. In a thread-per-client model each client consumes an inordinate amount of system resources while spending most of their time waiting (for network or disk I/O). A thread-per-client approach has other drawbacks. E.g., pthreads require a minimum 16 KB stack per thread, implying 1.6 GB used for an anticipated 10,000 concurrent clients.

Those of skill in the art will realize and understand, upon reading this description, that these other approaches to concurrency may work for smaller caches or CDNs, but they do not scale well. Thus, while the disclosed executive approach is preferred, other approaches are contemplated and may be used.

The presently preferred version of the Executive assumes a 64-bit CPU with 64-byte cache lines. Basic data structures are all cache-line sized and aligned. While this approach improves efficiency with respect to retrieving data, moving it around, and storing it, it may force some overloading of data fields within data structures. Those of skill in the art will realize and understand, upon reading this description, that other implementations may be used.

Tasks, Events, and Vcores

Figure 24B:
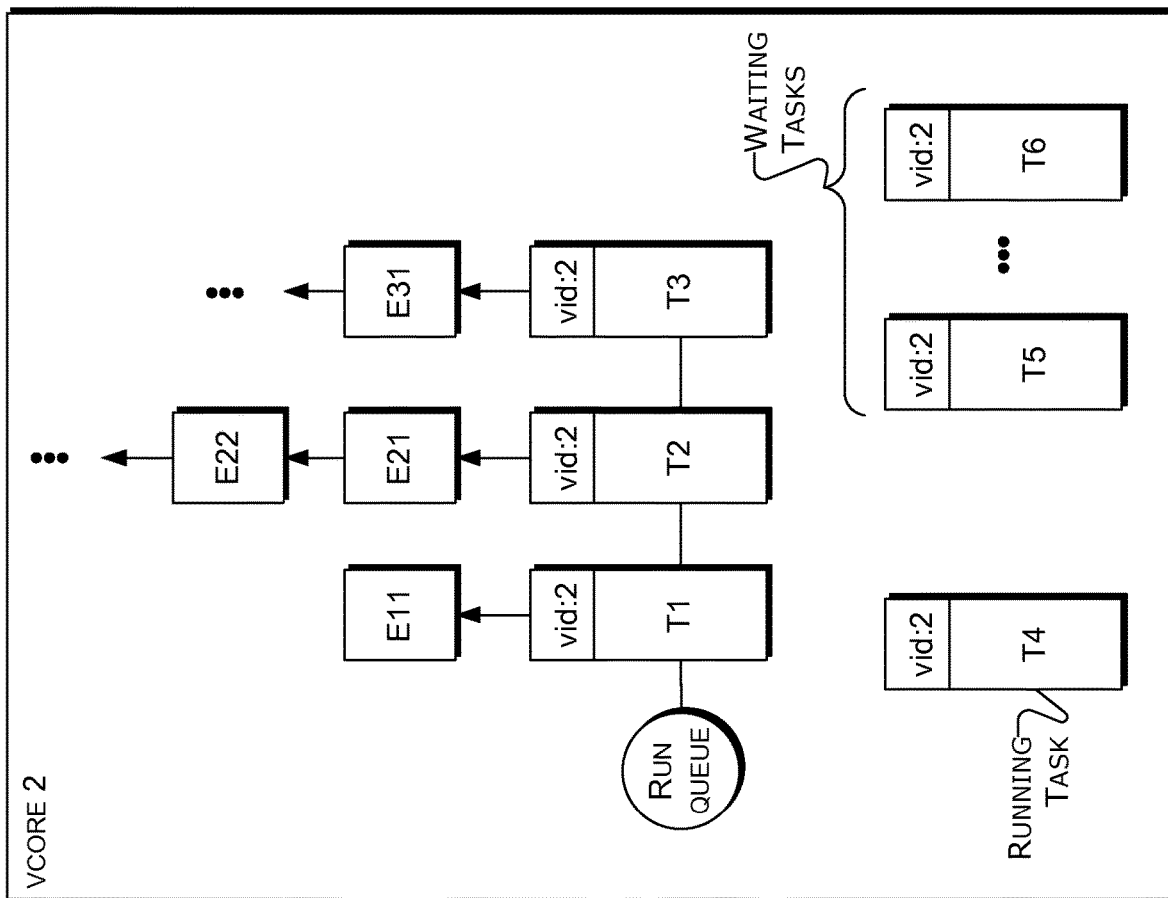

The basic objects in the Executive are tasks, events, and vcores (Virtual CPU cores). FIGS. 24A-24B show relationships between the Executive's tasks, events and vcores.

A virtual CPU core or vcore may be considered, in some aspects, to be like a pthread with some data. There may be any number of vcores, although the Executive is expected to be most efficient when there is one vcore per physical core, with each vcore bound to or associated with a fixed physical core.

In order to support synchronization, each vcore is assigned a vcore identifier (vid), and each task has a vid field that specifies the vcore to which that task belongs.

Each task has a corresponding input event list. For example, as shown in FIG. 24A, the task block T has a list of three events (denoted E1, E2, E3 in the drawing).

Each vcore has a prioritized list of tasks called its run queue. E.g., FIG. 24B shows vcore no. 2 with a run queue comprising a number of tasks (denoted T1, T2, T3), each with a corresponding event list (E11 for task T1, E21 and E22 for task T2, and E31 for task T3). One task (T4) is currently running, and a number of tasks (T5 . . . T6) are waiting. The task block T in FIG. 24A is shown with VID=2 (i.e., that task is associated with vcore no. 2).

Figure 24C:
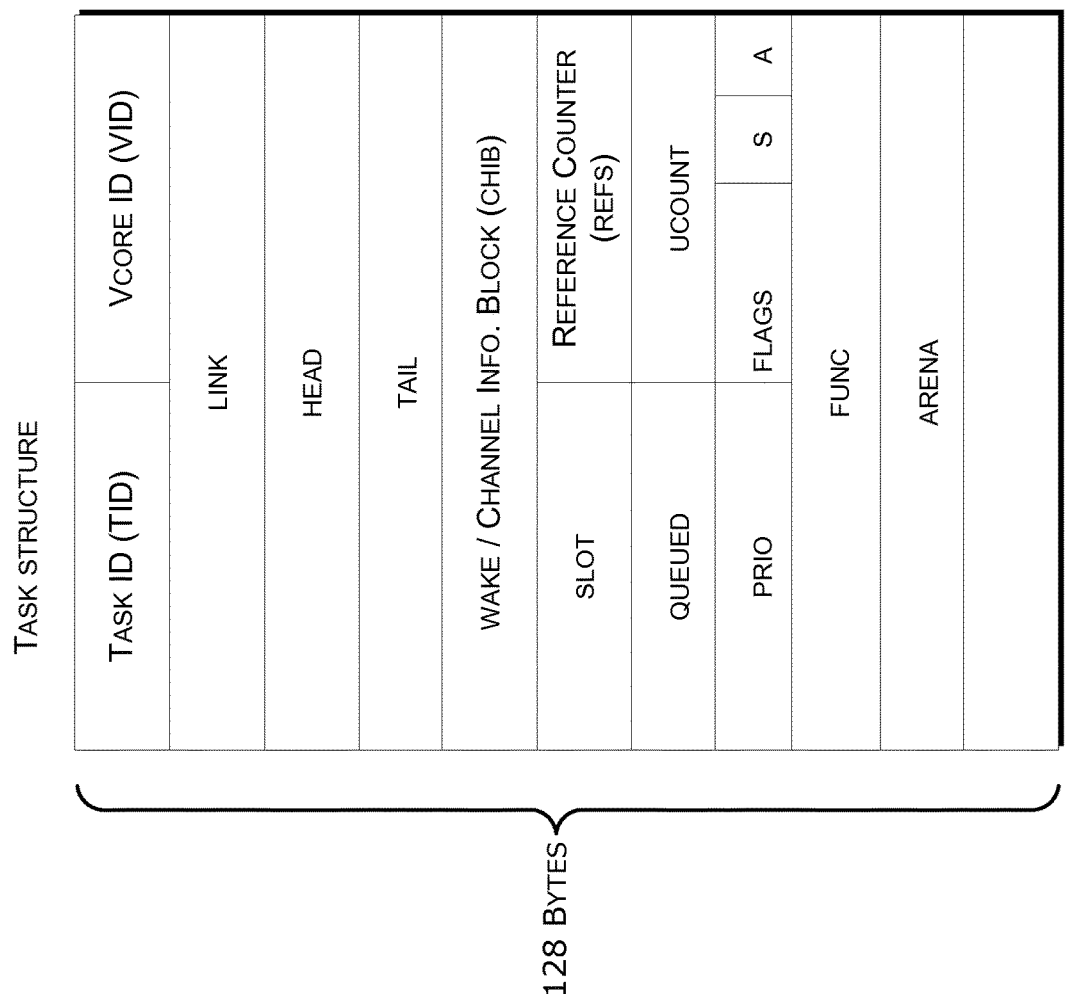

An Executive task is described by a function pointer (ƒ), a data pointer (d), and some other (e.g., task accounting) information. A task may be run by invoking the function on the data (e.g., ƒ(d)). Each task has a task identifier or handle (tid). With reference to the exemplary task structure in FIG. 24C, preferably a task is packed into a 128-byte structure, and is identified by a 4-byte integer task handle ("tid" or task id).

Channels are a special type of Executive task. A channel task contains pointer to "Channel Information Block" (chib). Each chib is channel-type-specific, and contains methods for:

dropoff (asynchronous), submission (maybe synchronous) and return (deliver) of events (where the events being returned are being returned to a channel from another channel)
timeout
close, destroy
migrating
create entry point
and various others.

Channels have flags set and wake/chib points to a chib. User tasks have no flags, wake/chib points to wakeup predicate (this is an example of the field overloading referred to earlier). Prio determines where a task gets placed on the run queue.

The following channel types are presently supported:

| Network | |
|---|---|
| serv | passive listener |
| conn | active connection |
| udp | datagram |
| resolv | DNS resolver |

| Async I/O | |
|---|---|
| aios | aio slave |
| aio | aio master |

| HTTP | |
|---|---|
| fpnsh_conn | HTTP parser and formatter |

Application Specific, e.g., for cache:

the sequencer channel (manages running of handlers)
various Lua-related channels (handle dealing with Lua engines and running them)

In some embodiments, the Async IO channels may be performed by the IO library. Aaios and aio may not be used, and a separate non-Executive library (libfpio) will handle asynchronous I/O.

As used herein "cid" refers to a "channel id" and "tid" means a "task id". In practice, the "cid" field may be used as the "to" address and the "tid" field is used as the from address of an event. There are cases of both task-to-task and channel-to-channel communication where a "cid" may actually be a task id, and vice versa.

The task structure is preferably cache aligned. In the drawing, the function pointer is denoted func. A task structure has an additional 64 bytes for use as scratch space. There are 48+64 bytes free for task use, although a given task is always free to allocate more memory for itself and keep track of it by placing a pointer in the task structure.

Every task contains a reference counter (refs), and a task dies if it is dispatched with its reference counter set to zero (refs==0). A reference (also known as "cid" or channel id, also known as "tid") is a copy of the integer id of a task and is created when the task is created, or when a task itself calls ns_tid_alloc( ). A reference is destroyed when returned to task during close or discard or the task itself calls ns_tid_free( ).

Reference are capabilities that should not be duplicated or destroyed and should be carefully tracked. They are used in tid and cid fields of events.

The Executive uses counting references to prevent stale references (they are an Executive analog of locks).

An event is a message block (preferably 128 bytes, including 64 bytes for scratch space) and contains two task references (two tids), one for the initiator task (tid) and the other for the target task (cid). The 64-byte scratch space may be divided into internal and external scratch space. Events may be linked.

In operation, each vcore thread runs an endless loop and:
retrieves (e.g., pops) the highest priority task t from its run queue;
calls t->ƒ(t);
calls ns_dispatch(t) to requeue, destroy or abandon the task t.

The following two rules should ensure memory consistency:
Access rule: If another task has the same vid as you, you can safely access its data.
Migration rule: Only vcore n can change a vid value to or from n.

The Executive is started on a host by creating an appropriate number of vcores for that host and then starting the first task. E.g., to start the Executive with n vcores, call:
ns_begin(first_task_func, n);
The first task creates and launches more tasks and channels, e.g., as follows:

```
first_task_func( )
{
    t = ns_task( );
    ns_launch(t);
    cid1 = ns_chan(foospec, 0);
    ...
}
```

Tasks and channels create events and communicate with each other:

```
e = ns_event( )
e->cid = cid1
ns_dropoff(e)
```

Tasks, channels and events are created and die as necessary.

ns_task( ); ns_chan( ); ns_event( ); return ns_die( );

In a preferred implementation, the Executive will exit when the last task exits.

There are two styles of communication within the Executive, namely guaranteed asynchronous communication and potentially asynchronous communication.

Guaranteed asynchronous communication puts an event on the input queue of a destination task, and wakes the destination task, i.e., puts it on the run queue. The destination task runs (later) and an event arrives back on the input queue of the source task. It should be appreciated that the source task may choose to send the event "anonymously" (that is, without a tid), in which case no response will return. Another option is for the source task to provide the tid of some third task to which the event will be delivered once the destination task is done with it. This type of communication is lightweight and non-blocking. E.g., ns_event_dropoff(e) uses e->cid as destination; ns_event_deliver(e) uses e->tid as destination. Basically, ns_event_dropoff is used by tasks to drop an event off to a channel, and ns_event_deliver is used by tasks to return events to whoever sent them.

Potentially asynchronous communication is invoked, e.g., by e=submit(e).

This approach works as follows:

| S1 | Passes event to destination task |
| S2 | Suspends current task |
| S3 | Executes destination task instead |
| S4 | Event pointer returned as function return value |
| S5 | Resumes current task. |

Potentially asynchronous communication can go asynchronous by returning null pointer in step S4, and delivering event later.

Communication reverts to asynchronous if, e.g., the destination task is not on the same vcore, or there is too much work to do in one run, or the task needs to wait for internal asynchronous operations.

The destination does not know/care if it was called via dropoff( ) (i.e., as Guaranteed asynchronous) or submit( ) (i.e., as Potentially asynchronous). Events always arrive on the input queue, which is accessed via ns_next_event( ). Events are returned by channels using ns_event_deliver( ). If the destination is a channel, it can know whether an event was dropped off or submitted, since these are separate chib entry points which can be overridden.

Events can be transferred, e.g., using the following code:

```
ns_event_t *e = ns_event( );
e->tid = ns_tid( );
e->cid = some_cid;
some_cid = 0;
e->opcode = Executive_OP_READ_BUFFER;
e->timeout = 5.0;
e->ns_buf_arg = malloc(1024);
e->ns_buf_count = 1024;
e = ns_submit(e);
```

This example demonstrates care about reference counting. Since some_cid represents a reference and that reference has been transferred to e->cid, the value of some_cid gets zeroed.

This event transfer may be wrapped in a function, e.g., as:

```
ns_event_t *e = ns_event( );
e->tid = ns_tid( );
e->cid = some_cid;
e = ns_submit_1k_read(e, 1024);
```

Event Driven Programs

The following code shows a basic "loop-switch" skeleton for an Executive task function presented in a 'C' like language:

```
task_func(t)
{
    while((e = ns_next_event( ))) {
        switch(event_type(e)) {
            case TYPE0:
            ...
            break;
                ...
            case TYPEn:
            ...
            break;
        }
        ns_return(e);
    }
    return ns_wait( );
}
```

The following example code shows a basic "loop-switch" skeleton for an Executive task function with submit( ):

```
task_func(t)
{
    e = 0;
    while(e || (e = ns_next_event( ))) {
        switch(event_type(e)) {
            case TYPE0:
            e = submit(e);
            continue;
                ...
            case TYPEn:
            ...
            break;
        }
        ns_return(e);
    }
    return ns_wait( );
}
```

FIGS. 25A-25B compare the Executive stack of the Executive submit operation to that for C procedure calls. The Executive Submit operation (e=submit(e)) is analogous to a C procedure call, with the important difference that there is the option to go asynchronous when an event is submitted. The Executive's task blocks are analogous to C stack frames. The Executive's event blocks are analogous to C's arg and return address areas; and the Executive's tid & tag are analogous to C's return address.

However, in the Executive multiple calls can be active simultaneously and frames can live on after the call. This allows writing a potentially asynchronous hook, e.g., e=submit_op_foo(e, args);

Channels may be created using a parameter block called a spec, e.g.:

```
ns_foo_t *spec = ns_foo( );    /* create spec for foo channel */
spec->param1 = val1;           /* set parameter */
spec->param2 = val2;           /* set parameter */
cid = ns_chan(spec, 5);        /* create foo chan, return 5 refs*/
ns_foo_(spec);                 /* destroy spec */
```

A channel may be closed by returning the refs, e.g.:

```
ns_close_cid(cid, 4);/* Explicit close, 1 + 4 refs */
ns_discard_cid(cid, 1);/* Return 1 + 1 refs */
ns_discard_cid(cid, 2);/* Return 1 +2 refs, implicit close */
```

A channel will not be destroyed until all refs have been returned.

Figure 26:
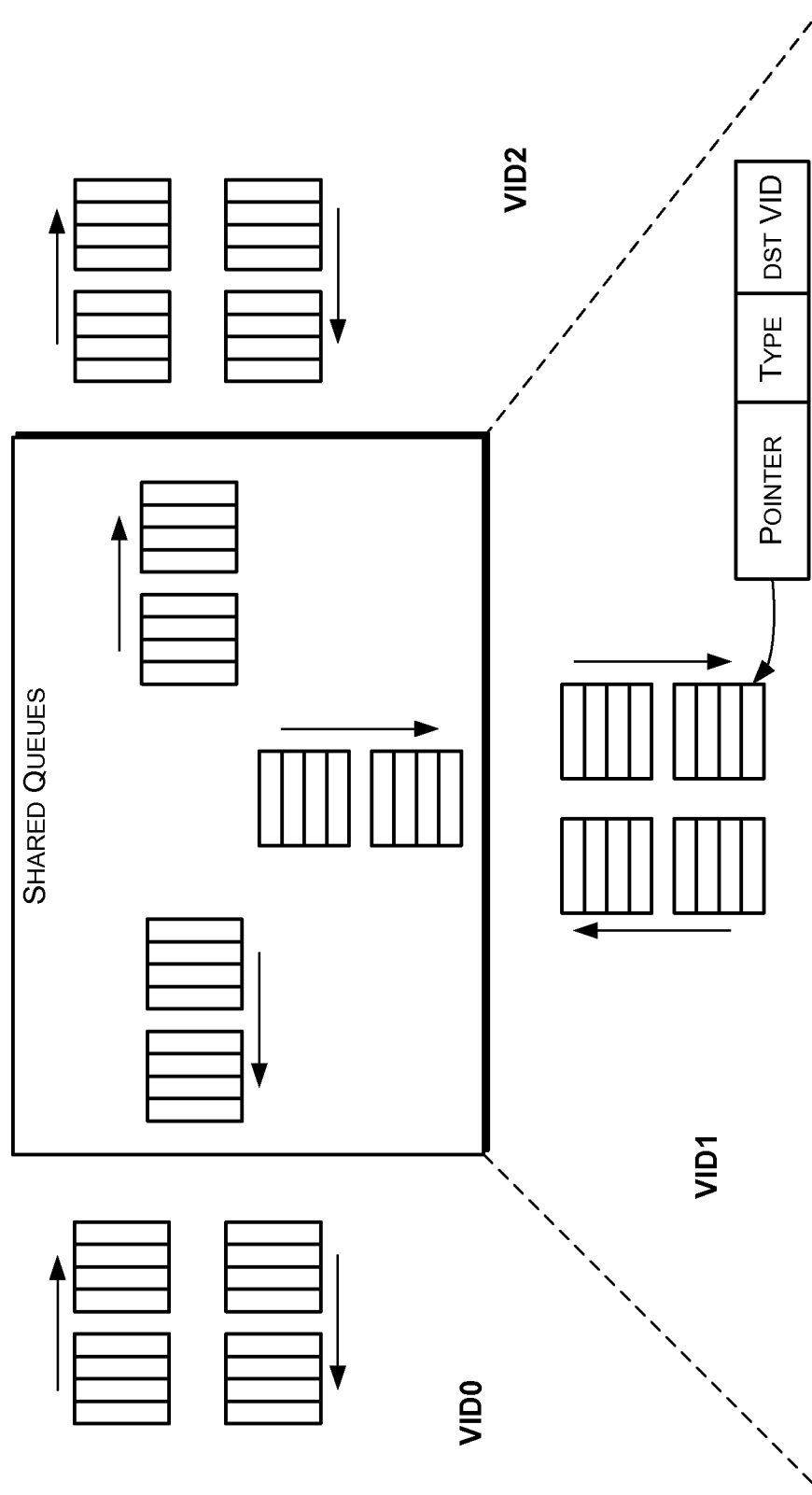

A global exchange (see FIG. 26) may be used to transfer pointer ownership between vcores. Typed pointers are packed into cache lines which are used to transfer the pointers efficiently, via mutex-protected queues. While various techniques are used to make the global exchange efficient, e.g., amortization of lock cost by transferring multiple messages with a single lock transaction, lock-free inspection of a queue to see if there may be data (only need the lock if data is seen), etc, it should be appreciated that a "direct exchange" is preferable, and that the queues involved may be created using lock-free techniques.

The following example shows synchronization in task migration. In this example, task t wants to migrate from vid=2 to vid=3.

Initially t->vid=2.

t func sets t->vid=1003 and returns Executive_RUN.

ns-dispatch( ) notices t->vid !=2 and puts (t, RUN, 3) on global exchange.

Global exchange transfers the triple to vcore 3.

Vcore 3 sets t->vid=3 and adds task to its run queue.

Note that t->vid is set to 1003.

The Executive provides a multi-core solution in which each processor (CPU) has a queue of tasks which can run on that processor (in a vcore—virtual core on that processor). Processes can check if other processes are running on the same core and then determine/share information with those processes.

In prior concurrency/parallel processing systems, tasks or processes get spawned off and return when they are complete. An important aspect of cache processing, especially in the context of a CDN, is that some tasks may be able to complete right away. In those cases there is no reason to delay the return. In other words, if we know that a task might complete its processing right away (i.e., relatively quickly), we can have that task provides its result without delay.

One example of the use of this technique is when a Lua script is executed: in many cases, the script may perform such a small operation that it can complete essentially right away, which saves the overhead of needing to schedule it as a task unless that becomes necessary. Another example of this technique is in the sequencer channel: If a series of handlers runs quickly, then calling the sequencer is essentially a function call. Only if a handler needs to wait for data or if too much computation needs to get done will the sequencer become a scheduled task.

This may be achieved by the following:

```
if(event = submit(event)) == null)
    return ns_wait( ) ;
    // if non-null then done, otherwise wait.
```

This approach (do it right away if you can, otherwise give me the answer later) provides a potentially asynchronous solution to cache specific problems.

Additionally, programming in a "potentially asynchronous" style means that if it is later determined that some feature or aspect (which was synchronous previously) needs to go asynchronous, this can be done without having to rewrite other code. Those of skill in the art will realize and understand, upon reading this description, that there are costs/risks to this approach, e.g., if only the synchronous path is taken in a given situation, the asynchronous path may be untested or the performance of the application may degrade if a previously synchronous operation becomes asynchronous. However, these risks can be mitigated, e.g., by forcing everything to be asynchronous for testing purposes.

In some preferred embodiments, the Executive is implemented using a system sometimes referred to as Shell or NetShell. It should be appreciated that the Executive and NetShell described herein are unrelated to any products or tools of any other entity. In particular, as used herein NetShell does not refer to Microsoft Corporation's scriptable command-line tool, nor does executive or NetShell refer to a Unix shell-like user interface.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A content delivery network (CDN) comprising:
   a plurality of CDN components including at least one CDN rendezvous mechanism and at least one control core,
   wherein the plurality of CDN components are controlled by control core data from the at least one control core,
   wherein at least some particular CDN components are constructed and adapted to obtain CDN resources from at least some other CDN components,
   wherein the CDN components use the CDN rendezvous mechanism to select one or more CDN components from which to obtain CDN resources
   wherein the CDN has a current CDN configuration,
   wherein the at least one control core keeps an authoritative database of the current CDN configuration, and
   wherein the control core uses voting to maintain consistency of the authoritative database.

2. The CDN of claim 1, wherein the at least one CDN rendezvous mechanism rendezvous a particular CDN component of the plurality of CDN components to a control core machine that is best or optimal for that particular CDN component.

3. The CDN of claim 1, wherein at least some particular CDN components are controlled by control core data from the at least one control core.

4. The CDN of claim 3, wherein the control core data comprises resources distributed by the control core.

5. The CDN of claim 1, wherein the plurality of CDN components comprise:
a plurality of cache servers, each constructed and adapted to deliver resources associated with at least one customer of the CDN.

6. The CDN of claim 5, wherein said cache servers are customers of the CDN.

7. The CDN of claim 1, wherein the plurality of CDN components are controlled by control core data from the at least one control core.

8. The CDN of claim 7, wherein the control core data comprises resources provided by the control core in response to requests from internal CDN components.

9. The CDN of claim 1, wherein the at least one control core comprises a distributed control core.

10. The CDN of claim 1, wherein the control core comprises a distributed system comprising a plurality of machines.

11. The CDN of claim 10, wherein the control core uses a distributed consensus algorithm to achieve consensus among the plurality of machines.

12. The CDN of claim 1, wherein the plurality of CDN components access at least one control core via one or more control core domain names.

13. The CDN of claim 12, wherein the plurality of CDN components use the at least one CDN rendezvous mechanism to resolve the one or more control core domain names.

14. The CDN of claim 1, wherein said control core data comprises control objects.

15. The CDN of claim 14, wherein the CDN comprises one or more tiers of CDN components, organized hierarchically and wherein the at least one control core comprises an origin tier for said control objects.

16. The CDN of claim 1, wherein a particular CDN component of said plurality of CDN components obtains CDN data using the CDN.

17. The CDN of claim 1, wherein at least some CDN components of said plurality of CDN components obtain CDN control core data using the CDN.

* * * * *